(12) United States Patent
Uegami et al.

(10) Patent No.: US 7,220,366 B2
(45) Date of Patent: *May 22, 2007

(54) PROCESS FOR PURIFYING CONTAMINATED SOIL OR GROUNDWATER WITH IRON PARTICLES

(75) Inventors: Masayuki Uegami, Ube (JP); Junichi Kawano, Onoda (JP); Tomoko Okita, Hatsukaichi (JP); Yasuhiko Fujii, Otake (JP); Kenji Okinaka, Ube (JP); Koji Kakuya, Ube (JP); Soichi Yatagai, Ube (JP)

(73) Assignee: Toda Kogyo Corporation, Hiroshima-ken (JP)

( * ) Notice: Subject to any disclaimer, the term of this patent is extended or adjusted under 35 U.S.C. 154(b) by 38 days.

This patent is subject to a terminal disclaimer.

(21) Appl. No.: 11/324,369

(22) Filed: Mar. 7, 2006

(65) Prior Publication Data

US 2006/0163172 A1 Jul. 27, 2006

Related U.S. Application Data

(62) Division of application No. 10/308,175, filed on Dec. 3, 2002, now Pat. No. 7,022,256.

(30) Foreign Application Priority Data

| Dec. 4, 2001 | (JP) | 2001-370685 |
| Jun. 7, 2002 | (JP) | 2002-167841 |
| Jun. 27, 2002 | (JP) | 2002-187705 |
| Jul. 3, 2002 | (JP) | 2002-195289 |
| Aug. 27, 2002 | (JP) | 2002-247372 |
| Oct. 25, 2002 | (JP) | 2002-311957 |

(51) Int. Cl.
*B01J 23/74* (2006.01)
*B09C 1/08* (2006.01)
*C02F 1/72* (2006.01)

(52) U.S. Cl. ............... 252/181; 210/722; 405/128.75; 502/338
(58) Field of Classification Search ............... 252/181
See application file for complete search history.

(56) References Cited

U.S. PATENT DOCUMENTS 6,271,168 B1 8/2001 Imai et al.

(Continued)

FOREIGN PATENT DOCUMENTS

JP 2001 198567 7/2001

(Continued)

OTHER PUBLICATIONS

U.S. Appl. No. 10/862,899 filed Jun. 8, 2004.

(Continued)

*Primary Examiner*—Randy Gulakowski
*Assistant Examiner*—Timothy J. Kugel
(74) *Attorney, Agent, or Firm*—Nixon & Vanderhye P.C.

(57) ABSTRACT

Iron particles for purifying soil or ground water of the present invention comprise a mixed phase of α-Fe phase and $Fe_3O_4$ phase, and having a BET specific surface area of 5 to 60 $m^2/g$, an Fe content of not less than 75% by weight based on the weight of the iron particles and a sulfur content of not less than 1,000 ppm. The iron particles are capable of decomposing or insolubilizing harmful substances such as organohalogen compounds and/or heavy metals, cyanogen, etc. contained in the soil or ground water in efficient, continuous and economical manners.

28 Claims, 12 Drawing Sheets

U.S. PATENT DOCUMENTS

| | | |
|---|---|---|
| 6,276,287 B1 | 8/2001 | Imai et al. |
| 6,459,012 B1 | 10/2002 | Imai et al. |
| 6,596,190 B1 | 7/2003 | Igawa et al. |
| 6,663,840 B2 | 12/2003 | Imai et al. |
| 6,800,587 B2 | 10/2004 | Imai et al. |
| 7,022,256 B2 | 4/2006 | Uegami et al. |
| 2003/0039857 A1 | 2/2003 | Zhang et al. |
| 2003/0217974 A1 | 11/2003 | Uegami et al. |
| 2004/0226404 A1 | 11/2004 | Ozaki et al. |
| 2006/0070958 A1 | 4/2006 | Kakuya et al. |
| 2006/0081811 A1 | 4/2006 | Matsui et al. |
| 2006/0113255 A1 | 6/2006 | Kakuya et al. |
| 2006/0151398 A1 | 7/2006 | Uegami et al. |

OTHER PUBLICATIONS

U.S. Appl. No. 10/998,194 filed Nov. 29, 2004.
U.S. Appl. No. 11/072,638 filed Mar. 7, 2005.
U.S. Appl. No. 11/236,871 filed Sep. 28, 2005.

◆ : EXAMPLE 1

☐ : COMPARATIVE EXAMPLE 5

▲ : COMPARATIVE EXAMPLE 6

PROCESS FOR PURIFYING CONTAMINATED SOIL OR GROUNDWATER WITH IRON PARTICLES

This application is a divisional of application Ser. No. 10/308,175 filed Dec. 3, 2002, now U.S. Pat. No. 7,022,256 B2 issued Apr. 4, 2006, which in turn claims priority of JP 2001-370685 filed Dec. 4, 2001, JP 2002-167841 filed Jun. 7, 2002; JP 2002-187705 filed Jun. 27, 2002; JP 2002-195289 filed Jul. 3, 2002; JP 2002-247372 filed Aug. 27, 2002; and JP 2002-311957 filed Oct. 25, 2005, the entire content of each of which is hereby incorporated by reference in this application.

BACKGROUND OF THE INVENTION

The present invention relates to iron particles for purifying a contaminated soil or ground water, a process for producing the iron particles, a purifying agent comprising the iron particles, a process for producing the purifying agent, and a method of purifying the contaminated soil or ground water. More particularly, the present invention relates to iron particles for purifying a soil or ground water contaminated with harmful substances such as organohalogen compounds, heavy metals, cyanogens and/or agricultural chemicals, which are capable of decomposing or insolubilizing the harmful substances contained in the soil or ground water, e.g., aliphatic organohalogen compounds such as dichloromethane, carbon tetrachloride, 1,2-dichloroethane, 1,1-dichloroethane, cis-1,2-dichloroethane, 1,1,1-trichloroethane, 1,1,2-trichloroethane, trichloroethylene, tetrachloroethylene and 1,3-dichloropropene, aromatic organohalogen compounds such as dioxins and PCB and/or heavy metals such as cadmium, lead, chromium (VI), arsenic and selenium as well as cyanogen or the like, in an efficient, continuous and economical manners; a process for producing the iron particle; a purifying agent comprising the iron particles; a process for producing the purifying agent; and a method of purifying the soil or ground water contaminated with the harmful substances such as organohalogen compounds, heavy metals, cyanogens and/or agricultural chemicals.

In the present invention, the "purifying" used herein means that in case of organohalogen compounds as harmful substances, the organohalogen compounds contained in a soil or ground water are decomposed, thereby purifying a soil or ground water contaminated with the organohalogen compounds, or in case of heavy metals or cyanogens as harmful substances, the heavy metals or cyanogens contained in a soil or ground water are insolubilized, thereby purifying a soil or ground water contaminated with the heavy metals or cyanogens. Further, in the present invention, the "purifying agent" used herein means an agent which decompose the organohalogen compounds contained in a soil or ground water, or insolubilize the heavy metals or cyanogens contained in a soil or ground water.

Aliphatic organohalogen compounds such as trichloroethylene, tetrachloroethylene or the like have been extensively used for cleaning in semiconductor factories and for degreasing metals to be machined.

Also, waste gases, fly ashes or main ashes discharged from an incineration furnace for combusting municipal garbage or industrial wastes, contain dioxins as aromatic organohalogen compounds having an extremely high toxicity to human bodies though the amount thereof is trace. The "dioxins" are a generic name of compounds obtained by substituting hydrogen atoms of dibenzo-p-dioxine, dibenzofuran, etc., with chlorine atoms. The waste gases or fly ashes continuously stay around the incineration furnace, resulting in residual of dioxins in soil of surrounding regions.

In addition, PCB (polychlorinated biphenyl) had been used in many application as insulating oils, plasticizers or heating medium for transformers, capacitors, etc., because of high chemical stability, thermal stability and excellent electrical insulating property thereof. Since the PCB is very harmful, the production and use thereof has been presently prohibited. However, any effective method of treating PCB past used has not been established until now and, therefore, a large part thereof has still been stored without treatment or disposal.

The above-described aliphatic organohalogen compounds and aromatic organohalogen compounds are hardly decomposable, and further exhibit carcinogenesis as well as a strong toxicity. Therefore, there arises such a significant environmental pollution that soil or ground water is contaminated with these organohalogen compounds.

More specifically, upon discharge of such organohalogen compounds, the aromatic organohalogen compounds such as dioxins and PCB which are hardly decomposable and exhibit a strong toxicity, cause significant environmental problems such as contamination of soil and ground water. In the case where such hardly-decomposable aromatic halogen compounds are accumulated in soil, the soil is contaminated therewith and as a result, the contaminated soil then cause contamination of ground water by the organohalogen compounds. Further, the contaminated ground water runs out from the contaminated soil to surrounding regions, so that pollution by the organohalogen compounds expands over much wider areas.

The land in which soil is once contaminated with the organohalogen compounds, cannot be reused and developed again. Therefore, there have been proposed various techniques or methods of purifying the soil and ground water contaminated with the organohalogen compounds. However, since the organohalogen compounds are hardly decomposable and a large amount of soil and ground water must be purified, any efficient and economical purifying techniques or methods cannot be fully established until now.

Alternatively, the contamination of soil or ground water by another harmful substances including heavy metals such as cadmium, lead, chromium (VI) and arsenic as well as cyanogen, etc., adversely affects human bodies and ecosystem. Therefore, the purification and removal of the above harmful substances have been urgently required.

As the method of purifying soil contaminated with the organohalogen compounds, there are known a purifying method using various catalysts; a method of absorbing and removing vapors of the organohalogen compounds by a volatility thereof; a thermal decomposition method of heat-treating excavated soil to render the soil harmless; a method of purifying soil by microorganism; or the like. In addition, as the method of purifying ground water contaminated with the organohalogen compounds, there are known a method of extracting the contaminated ground water from soil to treat the ground water into harmless one; a method of pumping the contaminated ground water to remove the organohalogen compounds therefrom; or the like.

Among these conventional methods of purifying soil or ground water contaminated with the organohalogen compounds, there have been proposed many methods of purifying soil or ground water contaminated with the organohalogen compounds into harmless ones by mixing and contacting the soil or ground water with a purifying agent composed of iron-based particles. Also, there are known methods of decomposing and removing the organohalogen compounds using iron-based particles such as mill scale, granular iron and sponge iron particles produced in iron and steel-making industries (Japanese Patent Application Laid-Open (KOKAI) Nos. 10-71386(1998), 11-235577(1999), 11-253908(1999), 2000-5740, 2000-225385, 2000-237768, 2000-334063, 2001-38341, 2001-113261, 2001-198567 and 2002-161263).

Here, general iron and steel-making processes are described.

The iron and steel-making processes are generally classified into an indirect process of first reducing iron ore into molten pig iron and then oxidation-refining the pig iron into steel, and a direct process of directly converting iron ore into steel through no production of pig iron.

In the pig iron production step of the indirect process (in which iron ore is reduced into pig iron), the iron ore together with lime stone ($CaCO_3$) and coke are used as raw materials. The iron ore used in this process contains a gangue composed of hematite (mainly $Fe_2O_3$), magnetite (mainly $Fe_3O_4$), $SiO_2$ and $Al_2O_3$ as main components. These raw materials are charged into a blast furnace where coke is burned by blowing a heated hot air thereto to produce a high-temperature mixed gas of CO and $N_2$ by which the iron ore is reduced. The solid iron produced by the reduction reaction absorbs C while dropping downward in the blast furnace, and is melted into pig iron. Further, the molten pig iron absorbs C, Si, Mn, etc., to form a final composition. The pig iron is usually composed of 3.0 to 4.5% by weight of C, 0.2 to 2.5% by weight of Si, 0.02 to 0.5% by weight of Mn, 0.01 to 0.5% by weight of P, and 0.01 to 0.5% by weight of S. The gangue in the iron ore and ashes in the coke are chemically reacted with lime stone to form molten slag which is then separated from the molten pig iron by the difference in specific gravity therebetween. The thus separated pig iron is subjected, if required, to hot metal process.

The hot metal process for the molten pig iron includes desulfurizing, dephosphorizing and desiliconizing treatments. As the desulfurizing fluxes, there may be used CaO; $CaF_2$, $CaCl_2$ or the like. As the dephosphorizing fluxes, there may be used mill scale, iron ore or the like. Also, as the desiliconizing agent, there may be used iron oxide, manganese ore or the like.

Untreated molten pig iron or pig iron subjected to the hot metal process is then subjected to oxidation refining in a steel-making furnace using pure oxygen (steel-making step). Most of the steel-making furnaces are in the form of a composite converter. The steel-making furnace is charged with raw materials including the molten pig iron, scraps, and lime stone and fluorite as fluxes together with, if required, manganese ore. Upon supplying pure oxygen into the steel-making furnace, SiO2, FeO, CaO, $CaF_2$, etc., are produced as slag, and then C is oxidized into CO (decarbonization), resulting in production of steel. Thereafter, the thus obtained steel is subjected, if required, to secondary refining process, and then, in most cases, formed into slab, bloom, billet, etc., by continuous casting process.

On the other hand, in the direct reduction process, iron ore, a reducing agent and a slag-forming agent are used as raw materials, and heat-treated in a crude iron-making furnace using fuel or electric heating to obtain solid granular iron or sponge iron through no production of pig iron. Then, the obtained solid iron is melted in an electric furnace, and subsequently cast into slab, bloom, billet, etc., by the same method as used in the indirect reduction process.

In any of the above-described processes, the iron compound produced in the steel-making step contains various impurities derived from the raw materials or additives. In particular, the inclusion of impurities becomes more remarkable in the steel-making step of the direct reduction process. In the case where soil or ground water contaminated with the organohalogen compounds are purified into harmless ones by mixing and contacting with a purifying agent composed of iron-based particles, in particular, in the case where the soil or ground water contaminated with the organohalogen compounds are treated using iron-based particles such as mill scale, granular iron or sponge iron particles produced in the steel-making step, attention must be paid to impurities remained in the iron-based particles.

In Japanese Patent Application Laid-Open (KOKAI) No. 10-71386(1998), there is described the method of drilling a bore in contaminated soil, blowing compressed air and iron particles into the bore to form a dispersion layer composed of the iron particles, and contacting the iron particles in the dispersion layer with the ground water to render harmful substances contained in the soil and ground water harmless. However, since detailed properties and specific amount of the iron particles used are not described, it is considered that this method fails to fully reduce the organohalogen compounds.

In Japanese Patent Application Laid-Open (KOKAI) No. 11-235577(1999), there is described the method of adding and mixing in soil, iron particles containing not less than 0.1% by weight of carbon, which are obtained by subjecting raw sponge ore-reduced iron particles to reduction-refining, sintering, pulverization and screening, to render organohalogen compounds contained in soil harmless. However, since the raw material used in this method is derived from iron ore, it is presumed that a large amount of impurities contained in most of common steel components or common cast iron components are involved therein. Therefore, the iron particles may fail to show a high purification property against the organohalogen compounds. In addition, although the specific surface area and particle size of the iron particles are described, since the particle size thereof is too large, it may be difficult to fully reduce the aromatic organohalogen compounds.

In Japanese Patent Application Laid-Open (KOKAI) No. 11-253908(1999), there is described the method of uniformly mixing PCB with metal particles and then heating the obtained uniformly kneaded material to form a metal chloride, thereby rendering the PCB harmless. However, in Examples of this KOKAI, it is essentially required to heat the kneaded material at a temperature of not less than 250° C. Therefore, this method may fail to provide an economical process.

In Japanese Patent Application Laid-Open (KOKAI) No. 2000-5740, there is described the method of rendering organohalogen compounds contained in soil harmless by using copper-containing iron particles. However, similarly to the iron particles described in Japanese Patent Application Laid-Open (KOKAI) No. 11-235577(1999), since the iron particles obtained by subjecting raw sponge ore-reduced iron particles to reduction-refining, sintering, pulverization and screening, are used as a raw material, i.e., the raw material is derived from iron ore, it is presumed that a large amount of impurities contained in most of common steel components or common cast iron components are still contained therein. Therefore, the iron particles may fail to show a high purification property against the organohalogen compounds. Further, since decomposition of the organohalogen compounds requires a long period of time, this method may fail to efficiently convert the organohalogen compounds into harmless ones.

In Japanese Patent Application Laid-Open (KOKAI) No. 2000-225385, there is described the method of subjecting halogenated hydrocarbons to reduction-dehalogenation by chemically reacting the halogenated hydrocarbons with a reducing metal in the presence of a hydrogen donating compound. However, since this method essentially requires to use amines for accelerating the dehalogenation reaction, it is difficult to fully conduct the decomposition reaction by the reducing metal.

In Japanese Patent Application Laid-Open (KOKAI) No. 2000-237768, there is described the method of contacting organohalogen compounds with iron-based metals. However, since the iron-based metals are in the form of fibers having a large fiber diameter, this method may also fail to fully reduce the aromatic organohalogen compounds.

In Japanese Patent Application Laid-Open (KOKAI) No. 2000-334063, there is described the method of contacting dioxins with an aqueous hydrochloric acid solution containing mill scale produced in the production process of hot-rolled steel plate in ironworks, at a temperature lower than 100° C. to render the dioxins harmless. However, it is presumed that the mill scale itself contains impurities such as Mn, Si, Cr, Al, P and Ca in an amount of from several hundreds ppm to several thousands ppm. Therefore, the mill scale may fail to show a high purification property against the organohalogen compounds. Also, in order to promote conversion of the organohalogen compounds into harmless ones, since the use of the aqueous hydrochloric acid solution is essentially required, the mill scale by itself may fail to sufficiently promote the decomposition reaction.

In Japanese Patent Application Laid-Open (KOKAI) No. 2001-38341, there is described a soil-purifying agent composed of a water suspension containing iron particles having an average particle diameter of 1 to 500 µm. However, since the iron particles used have a too large particle size, it may be difficult to fully decompose the organohalogen compounds.

In Japanese Patent Application Laid-Open (KOKAI) No. 2001-113261, there is described the method of contacting dioxin-contaminated soil with an aqueous hydrochloric acid solution containing an iron compound to render the dioxins harmless. However, in order to promote the conversion of dioxins into harmless ones, since the use of the aqueous hydrochloric acid solution is essentially required, the iron compound by itself may fail to sufficiently promote the decomposition reaction.

In Japanese Patent Application Laid-Open (KOKAI) No. 2001-198567, there is described the purification method using a water suspension containing spherical iron particles having an average particle diameter of less than 10 µm. The spherical iron particles contained in the water suspension are obtained by collecting dusts contained in waste gas discharged during refining process from an oxygen blowing converter for steel-making where pig iron containing C, Si, P, etc., is oxidation-refined by blowing oxygen thereinto, and removing gases from the dusts. However, it is presumed that the thus obtained spherical iron particles contain impurities such as C, Si and P in the form of oxides. Therefore, the spherical iron particles may fail to show a high purification property against the organohalogen compounds. Further, since the water suspension containing the spherical iron particles obtained by collecting dusts contained in waste gas discharged during refining process from an oxygen-blowing converter for steel-making and removing gases from the dusts, the iron particles have a broad particle size distribution and, therefore, exhibit a non-uniform penetration velocity into contaminated soil, resulting in delayed purification performance and prolonged purification time. For this reason, the water suspension may also fail to fully reduce the organohalogen compounds. In addition, although spherical iron particles having an average particle diameter of 1.3 µm were used in Examples of this KOKAI, since the metal iron content thereof is low, it may be difficult to fully reduce the organohalogen compounds.

In Japanese Patent Application Laid-Open (KOKAI) No. 2002-161263, there are described iron particles for decomposing organohalogen compounds, in which a part of the surface of the iron particles is adhered with at least one metal selected from the group consisting of nickel, copper, cobalt and molybdenum, and the remaining surface other than the surface adhered with the above metal is covered with an iron oxide layer. However, the iron particles used are either iron particles obtained by subjecting sponge iron particles obtained by reducing mill scale discharged from the production process of hot-rolled steel plate, etc., in ironworks by using coke, to finish-reduction treatment under a hydrogen flow, or iron particles obtained by atomizing molten steel with water. For this reason, since it is presumed that the iron particles usually contain a large amount of impurities derived from the mill scale or molten steel, the iron particles may fail to show a high purification property against the organohalogen compounds. Further, as is apparent from the specific surface area of the iron particles as described therein, it is considered that the iron particles have a large particle size. Thus, the iron particles may also fail to fully reduce the organohalogen compounds.

On the other hand, the other harmful substances contained in contaminated soil or ground water including heavy metals such as cadmium, lead, chromium (VI) and arsenic as well as cyanogen, agricultural chemicals or the like, are similarly harmful to human bodies and ecosystem. Therefore, the development of methods for purification and removal of these harmful substances has also been demanded.

As known in the art, technical means for treatment of soil or ground water contaminated with harmful substances such as heavy metals, cyanogen, agricultural chemicals, etc., are classified into two categories, i.e., "purification techniques" and "containment". Further, the purification techniques are classified into "in-situ purification" and "removal by excavation" for excavating and removing contaminated soil from objective land. Furthermore, the "in-situ purification" techniques are classified into "in-situ decomposition" in which heavy metals, cyanogen, agricultural chemicals, etc., contained in contaminated soil or ground water, are decomposed under the ground (in situ), and "in-situ extraction" in which contaminated soil or ground water is extracted or excavated, and then heavy metals, cyanogen, agricultural chemicals, etc., contained in the soil or ground water are removed therefrom.

Further, the "in-situ extraction" techniques are classified into "decomposition" in which compounds such as cyanogen, agricultural chemicals, etc., among objective substances, are thermochemically decomposed, and "separation" in which concentrated heavy metals are physically separated from the contaminated soil or ground water.

On the other hand, the "containment" techniques are classified into "in-situ containment" and "containment after removal by excavation". The in-situ containment techniques are techniques of solidifying contaminated soil by mixing a solidifying agent therewith, and then confining the contaminated soil in situ without removal therefrom. The techniques of containment after removal by excavation are techniques of pre-mixing an insolubilizing agent with contaminated soil to render the soil hardly soluble, drilling the contaminated soil and then confining the contaminated soil in another place.

As the working methods for performing the "purification techniques", there may be used a soil-washing method, a heat-desorption method or the like. For example, there may be used a chemical dissolution method of adding chemicals to contaminated soil or the like to dissolve heavy metals, etc., and then separating the obtained solution therefrom; a water-washing method of washing contaminated soil with water and then classifying the soil to separate fine particles containing a large amount of heavy metals therefrom; a wet soil-washing method of washing out contaminants adhered onto the surface of soil particles with a washing agent, and further classifying the soil particles into clean large particles and contaminated fine particles according to particle size and specific gravity thereof; or the like.

Also, in the "containment" techniques, as the working method for the "in-situ containment", there may be used a method of mixing a solidifying agent such as cement with contaminated soil and then confining the solidified soil by a water-impermeable layer, steel sheet pile, etc. As the working method for the "containment after removal by excavation", there may be used a method of adding chemicals to contaminated soil to change the soil into insolubilized form, and then confining the elution-free soil by insulating or water-shielding method.

However, the above conventional treatment techniques undergo high treating costs, and require a long treating time. Therefore, these techniques may fail to reduce harmful substances such as heavy metals, cyanogen, agricultural chemicals, etc., in efficient and continuous manners.

To solve the above problems, there have been developed low-cost treating techniques of decreasing a valence of the heavy metals mainly by a reducing activity of iron particles in order to convert the metals into harmless and stabilized form. For example, there are known techniques using a reducing activity of iron particles (decrease in valence of metals) (Japanese Patent Application Laid-Open (KOKAI) No. 10-71386(1998)); techniques using a reducing activity or adsorptivity of iron particles to arsenic (Japanese Patent Application Laid-Open (KOKAI) No. 10-244248(1998)); techniques using heat-treatment in combination with a reducing activity of iron particles (decrease in valence of metals) (Japanese Patent Application Laid-Open (KOKAI) No. 2000-157961); techniques using a reducing activity of iron particles (decrease in valence of metals) to chromium (VI) (Japanese Patent Application Laid-Open (KOKAI) No. 2001-198567); techniques using a reducing activity of iron particles (decrease in valence of metals) (Japanese Patent Application Laid-Open (KOKAI) No. 2002-200478); or the like.

The above-described techniques are directed to methods of converting contaminants such as heavy metals into harmless and stabilized form by using the reducing activity of iron particles (decrease in valence of metals). Therefore, with the passage of years, there arise problems such as deterioration in persistency of reducing activity of the iron particles. As a result, there is such a tendency that the heavy metals converted into harmless and stabilized ones having a low valence, are converted again into harmful metals having an increased valence. Thus, the above techniques may fail to provide a method or measure that is effectively usable for a long period of time.

In addition, as the method for treating heavy metal-containing waste water, there have been proposed a ferrite-formation method of treating the waste water by adding an iron salt thereto, and a method of stabilizing the heavy metals due to reducing activity of iron particles.

The ferrite-formation method is a method of neutralizing $Fe^{2+}$ or $Fe^{3+}$ with alkali, and oxidizing the neutralized Fe into spinel ferrite by passing air therethrough or by using an oxidizing agent under heating (or at ordinary temperature), thereby allowing heavy metals to be incorporated or adsorbed into crystals of the thus formed spinel ferrite. It is also known that some heavy metals are incorporated or adsorbed into crystals of iron oxide hydroxide such as $\alpha$, $\gamma$ or $\delta$-FeOOH ("Treatment of heavy metal-containing waste water by ferrite method" in "NEC Technical Report", Vol. 37, No. 9/1984; and Japanese Patent Application Laid-Open (KOKAI) Nos. 50-36370(1975), 50-133654(1975) and 50-154164(1975)).

The method of stabilizing the heavy metals due to reducing activity of iron particles is a method of reducing a valence of the heavy metals to convert the metals into harmless and stabilized form. Meanwhile, it is also known that some heavy metals are incorporated or adsorbed into crystals of goethite or spinel ferrite formed by dissolution of a small amount of iron particles in an acid region.

For example, in Japanese Patent Publication (KOKOKU) No. 52-45665(1977), it is described that upon adding iron particles to a heavy metal ion-containing solution whose pH value is adjusted to about 5 to 6, and stirring the resultant mixture, a part of the iron particles is dissolved and precipitated as ferric hydroxide which is then converted into goethite or lepidocrocite with the increase of pH value, whereupon a part of the heavy metals is co-precipitated with the goethite or lepidocrocite, and a large part of the heavy metals is adsorbed into the iron particles. Also, it is described that when the pH value is low, elution of the iron particles is increased, resulting in deterioration in the adsorption/removal effect thereof.

In Japanese Patent Publication (KOKOKU) No. 54-11614 (1979), it is described that when iron particles are added to a heavy metal chelate complex-containing solution whose pH value is adjusted to 2 to 6, and the resultant mixture is reacted under such a strong stirring as to entangle air therein or by blowing air thereinto under stirring to naturally increase the pH value of the solution, the surface of the iron particles is activated to adsorb the heavy metals thereonto. Also, it is described that a part of the iron particles are converted into goethite, lepidocrocite or magnetite, and the heavy metals are incorporated into crystals thereof.

In Japanese Patent Application Laid-Open (KOKAI) No. 57-7795(1982), it is described that iron particles are added to an iron cyanide complex-containing solution whose pH value is adjusted to less than 5, and the resultant mixture is stirred, thereby dissolving a part of the iron particles and allowing the iron cyanide complex to be adsorbed into iron. In addition, there are also described various reactions such as reduction reaction (decrease in valence of metals), substitution precipitation (ionization tendency), adsorption reaction onto iron particles, incorporation by formation of iron oxide, precipitation of hydroxides by neutralization, and co-precipitation reaction (ferrite formation).

In any of the above-described conventional techniques, the iron particles mainly exhibit either reduction activity or adsorptivity. Although some of the conventional techniques describe the dissolution effect of the iron particles, almost all of the conventional techniques relate to a mechanism in which the iron particles are converted via elution thereof in an acid region into goethite, lepidocrocite or magnetite to incorporate heavy metals into crystals thereof. The mechanism is, however, different from techniques based on such a phenomenon that upon treatments using iron particles, $Fe^{2+}$ or $Fe^{3+}$ is dissolved and formed into spinel ferrite while incorporating heavy metals thereinto.

In "Air Oxidation of Iron Powder Dispersed in Aqueous Solution of Sodium Hydroxide", Bull. Inst. Chem. Res. Kyoto Univ., Vol. 71, No. 2(1993), it is described that a spinel compound is produced from iron particles through dissolution thereof. However, this technique essentially requires pH adjustment by addition of alkali as well as heating and forced oxidation.

As a result of the present inventors' earnest studies for solving the above problems, it has been found that by mixing and contacting with soil or ground water containing harmful substances such as organohalogen compounds and/or heavy metals, cyanogen, etc., and iron particles obtained by heat-reducing goethite particles having an average major axis diameter of 0.05 to 0.50 μm or hematite particles obtained by heat-dehydrating the goethite particles at a temperature of 250 to 350° C., at a temperature of 250 to 600° C., thereby producing iron particles, after cooling, (i) transferring the iron particles into water without forming a surface oxidation film on surface of the iron particles in a gas phase, forming the surface oxidation film on the surface of the iron particles in water; and then drying the iron particles, or (ii) forming the surface oxidation film on the surface of the iron particles in a gas phase, it is possible to treat the harmful substances such as organohalogen compounds and/or heavy metals, cyanogen, etc. contained in the soil or ground water in efficient, continuous and economical manners. The present invention has been attained on the basis of this finding.

SUMMARY OF THE INVENTION

It is an object of the present invention to provide iron particles for purifying a contaminated soil or ground water, which are capable of decomposing or insolubilizing harmful substances such as organohalogen compounds and/or heavy metals, cyanogen, etc. contained in the soil or ground water in efficient, continuous and economical manners.

It is another object of the present invention to provide a purifying agent for a contaminated soil or ground water, which is capable of decomposing or insolubilizing harmful substances such as organohalogen compounds and/or heavy metals, cyanogen, etc. contained in the soil or ground water in efficient, continuous and economical manners.

It is a further object of the present invention to provide a process for producing iron particles for purifying a contaminated soil or ground water containing harmful substances such as organohalogen compounds and/or heavy metals, cyanogen, etc.

It is a still further object of the present invention to provide a process for producing a purifying agent for purifying a contaminated soil or ground water containing harmful substances such as organohalogen compounds and/or heavy metals, cyanogen, etc.

It is a still further object of the present invention to provide a method of purifying a contaminated soil or ground water containing harmful substances such as organohalogen compounds and/or heavy metals, cyanogen, etc.

To accomplish with the aims, in a first aspect of the present invention, there are provided iron particles for purifying soil or ground water, comprising a mixed phase of α-Fe phase and $Fe_3O_4$ phase, and having a specific surface area of 5 to 60 $m^2/g$ as measured by the Brunauer-Emmett-Teller (BET) method, an Fe content of not less than 75% by weight based on the weight of the iron particles and a sulfur content of not less than 1,000 ppm.

In a second aspect of the present invention, there are provided iron particles for purifying soil or ground water, comprising a mixed phase of α-Fe phase and $Fe_3O_4$ phase, and having a BET specific surface area of 5 to 60 $m^2/g$, an Fe content of not less than 75% by weight based on the weight of the iron particles, a sulfur content of not less than 1,000 ppm, a ratio of a diffraction intensity $D_{110}$ of (110) plane of α-Fe to a sum of a diffraction intensity $D_{311}$ of (311) plane of magnetite and the diffraction intensity $D_{110}$ ($D_{110}/(D_{311}+D_{110})$) when measured from X-ray diffraction spectrum thereof of 0.20:1 to 0.98:1, a saturation magnetization value of 60 to 200 $Am^2/kg$, a crystallite size $D_{110}$ of (110) plane of α-Fe of 200 to 500 Å, and an α-Fe content of 30 to 99% by weight based on the weight of the iron particles.

In a third aspect of the present invention, there are provided iron particles for purifying soil or ground water, comprising a mixed phase of α-Fe phase and $Fe_3O_4$ phase, and having a BET specific surface area of 5 to 50 $m^2/g$, an Fe content of not less than 75% by weight based on the weight of the iron particles and a sulfur content of not less than 1,000 ppm, and contain small particles having a particle diameter of 0.05 to 0.50 μm in an amount of not less than 20% by volume based on the volume of the iron particles and large particles having a particle diameter of 0.5 to 5.0 μm in an amount of less than 80% by volume based on the volume of the iron particles.

In a fourth aspect of the present invention, there are provided iron particles for purifying soil or ground water, comprising a mixed phase of α-Fe phase and $Fe_3O_4$ phase, and having a BET specific surface area of 5 to 60 $m^2/g$, an Fe content of not less than 75% by weight based on the weight of the iron particles, a sulfur content of 3,500 to 10,000 ppm, an average particle diameter of 0.05 to 0.50 μm, a saturation magnetization value of 90 to 190 $Am^2/kg$ and a crystallite size $D_{110}$ of (110) plane of α-Fe of 200 to 400 Å.

In a fifth aspect of the present invention, there are provided iron particles for purifying soil or ground water, comprising a mixed phase of α-Fe phase and $Fe_3O_4$ phase, having a BET specific surface area of 5 to 60 $m^2/g$, an Fe content of not less than 75% by weight based on the weight of the iron particles, an α-Fe content of 30 to 99% by weight based on the weight of the iron particles and a sulfur content of not less than 1,000 ppm, exhibiting a cadmium elution of not more than 0.01 mg/liter, no detected elution of whole cyanogens, a lead elution of not more than 0.01 mg/liter, a chromium (VI) elution of not more than 0.05 mg/liter, an arsenic elution of not more than 0.01 mg/liter, a whole mercury elution of not more than 0.0005 mg/liter, a selenium elution of not more than 0.01 mg/liter, a fluorine elution of not more than 0.8 mg/liter and a boron elution of not more than 1 mg/liter.

In a sixth aspect of the present invention, there is provided a purifying agent for soil or ground water contaminated with harmful substances, comprising a water suspension containing as an effective component, iron particles comprising a mixed phase of α-Fe phase and $Fe_3O_4$ phase, and having a BET specific surface area of 5 to 60 $m^2/g$, an Fe content of not less than 75% by weight based on the weight of the iron particles and a sulfur content of not less than 1,000 ppm.

In a seventh aspect of the present invention, there is provided a purifying agent for soil or ground water contaminated with harmful substances, comprising a water suspension containing as an effective component, the iron particles as defined in any one of the 2nd to 6th aspects.

In an eighth aspect of the present invention, there is provided a purifying agent for soil or ground water contaminated with harmful substances, comprising a water suspension containing as an effective component, the iron particles comprising a mixed phase of α-Fe phase and $Fe_3O_4$ phase, and having a BET specific surface area of 5 to 60 $m^2/g$, an Fe content of not less than 75% by weight based on the weight of the iron particles, a sulfur content of not less than 1,000 ppm, an average major axis diameter of 0.05 to 0.50 μm, an aspect ratio of from more than 1.0:1 to 2.0:1, and an α-Fe content of 30 to 99% by weight based on the weight of the iron particles, which iron particles comprises secondary particles exhibiting a particle size distribution with a single peak, and having a median diameter $D_{50}$ (particle diameter corresponding to an accumulative volume of particles of 50% as measured and accumulated with respect to respective particle diameters and expressed by percentage based on a total volume of iron particles as 100%) of 0.5 to 5.0 μm, and a ratio of $D_{90}$ to $D_{10}$ of 1.0:1 to 5.0:1.

In a ninth aspect of the present invention, there is provided a process for producing iron particles for purifying soil or ground water, comprising a mixed phase of α-Fe phase and $Fe_3O_4$ phase, and having a BET specific surface area of 5 to 60 $m^2/g$, an Fe content of not less than 75% by weight based on the weight of the iron particles and a sulfur content of not less than 1,000 ppm, comprising:

heat-reducing goethite particles having an average major axis diameter of 0.05 to 0.50 μm or hematite particles obtained by heat-dehydrating the goethite particles at a temperature of 250 to 350%, at a temperature of 250 to 600° C., thereby producing iron particles; and after cooling, transferring the iron particles into water without forming an oxidation film on surface of the iron particles in a gas phase, forming the oxidation film on the surface of the iron particles in water, and then drying the obtained iron particles; or after cooling, forming the oxidation film on the surface of the iron particles in a gas phase.

In a tenth aspect of the present invention, there is provided a process for producing the iron particles for purifying soil or ground water as defined in any one of 2nd to 6th aspects, comprising:

heat-reducing goethite particles having an average major axis diameter of 0.05 to 0.50 μm or hematite particles obtained by heat-dehydrating the goethite particles at a temperature of 250 to 350° C., at a temperature of 250 to 600° C., thereby producing iron particles;

after cooling, transferring the iron particles into water without forming an oxidation film on surface of the iron particles in a gas phase, forming the oxidation film on the surface of the iron particles in water, and then drying the obtained iron particles; or after cooling, forming the oxidation film on the surface of the iron particles in a gas phase.

In an eleventh aspect of the present invention, there is provided a process for producing the purifying agent for purifying soil or ground water contaminated with harmful substances as defined in any one of 7th to 9th aspects, comprising:

heat-reducing goethite particles having an average major axis diameter of 0.05 to 0.50 μm or hematite particles obtained by heat-dehydrating the goethite particles at a temperature of 250 to 350° C., at a temperature of 250 to 600° C., thereby producing iron particles; and after cooling, transferring the iron particles into water without forming an oxidation film on surface of the iron particles in a gas phase, forming the oxidation film on the surface of the iron particles in water; or after cooling, forming the oxidation film on the surface of the iron particles in a gas phase, and transferring the iron particles into water, thereby obtaining a water suspension containing the iron particles.

In a twelfth aspect of the present invention, there is provided a method for purifying soil or ground water contaminated with harmful substances, comprising:

mixing and contacting the iron particles comprising a mixed phase of α-Fe phase and $Fe_3O_4$ phase, and having a BET specific surface area of 5 to 60 $m^2/g$, an Fe content of not less than 75% by weight based on the weight of the iron particles and a sulfur content of not less than 1,000 ppm, with the soil or ground water contaminated with harmful substances.

In a thirteenth aspect of the present invention, there is provided a method for purifying soil or ground water contaminated with harmful substances, comprising:

mixing and contacting the iron particles as defined in any one of 2nd to 6th aspects with the soil or ground water contaminated with harmful substances.

In a fourteenth aspect of the present invention, there are provided iron particles for purifying a contaminated soil or ground water, comprising small particles having a particle diameter of 0.05 to 0.50 μm in an amount of not less than 20% by volume based on the volume of the iron particles, and having a saturation magnetization value of 60 to 200 $Am^2/kg$, a BET specific surface area of 5 to 50 $m^2/g$, a crystallite size $D_{110}$ of 200 to 500 Å and an Fe content of not less than 75% by weight based on the weight of the iron particles.

In a fifteenth aspect of the present invention, there are provided iron particles for purifying a contaminated soil or ground water, comprising small particles having a particle diameter of 0.05 to 0.50 μm in an amount of not less than 20% by volume based on the volume of the iron particles and large particles having a particle diameter of 0.5 to 5.0 μm, in an amount of less than 80% by volume based on the volume of the iron particles, having a saturation magnetization value of 60 to 200 $Am^2/kg$, a BET specific surface area of 5 to 50 $m^2/g$, a crystallite size $D_{110}$ of 200 to 500 Å, and containing substantially no Cd, Pb, As and Hg.

In a sixteenth aspect of the present invention, there are provided iron particles for purifying a contaminated soil or ground water, comprising mainly an α-Fe phase, and having a saturation magnetization value of 60 to 200 $Am^2/kg$, a BET specific surface area of 5 to 50 $m^2/g$, a crystallite size $D_{110}$ of 200 to 500 Å, an Fe content of not less than 75% by weight based on the weight of the iron particles, a sulfur content of not less than 500 ppm and an average particle diameter of 0.05 to 0.50 μm.

In a seventeenth aspect of the present invention, there are provided iron particles for purifying a contaminated soil or ground water, comprising mainly an α-Fe phase, having a saturation magnetization value of 60 to 200 $Am^2/kg$, a BET specific surface area of 5 to 50 $m^2/g$, a crystallite size $D_{110}$ of 200 to 500 Å, an Fe content of not less than 75% by weight based on the weight of the iron particles, a sulfur content of not less than 500 ppm and an average particle diameter of 0.05 to 0.50 μm, and containing substantially no Cd, Pb, As and Hg.

In an eighteenth aspect of the present invention, there are provided iron particles for purifying a contaminated soil or ground water, comprising an α-Fe phase in an amount of 30 to 99% by weight based on the weight of the iron particles and having a sulfur content of 3,500 to 10,000 ppm.

In a nineteenth aspect of the present invention, there are provided iron particles for purifying a contaminated soil or ground water, comprising α-Fe and magnetite, and having a ratio of a diffraction intensity $D_{110}$ of (110) plane of α-Fe to a sum of a diffraction intensity $D_{311}$ of (311) plane of magnetite and the diffraction intensity $D_{110}$ ($D_{110}/(D_{311}+D_{110})$) of 0.20:1 to 0.98:1 when measured from X-ray diffraction spectrum thereof and a sulfur content of 3,500 to 10,000 ppm.

In a twentieth aspect of the present invention, there are provided iron particles for purifying a contaminated soil or ground water, having a cadmium elution of not more than 0.01 mg/liter, no detected elution of whole cyanogens, a lead elution of not more than 0.01 mg/liter, a chromium (VI) elution of not more than 0.05 mg/liter, an arsenic elution of not more than 0.01 mg/liter, a whole mercury elution of not more than 0.0005 mg/liter, a selenium elution of not more than 0.01 mg/liter, a fluorine elution of not more than 0.8 mg/liter, a boron elution of not more than 1 mg/liter and comprising an α-Fe phase in an amount of 30 to 99% by weight based on the weight of the iron particles.

In a twenty-first aspect of the present invention, there are provided iron particles for purifying a contaminated soil or ground water, comprising α-Fe and magnetite, and having a cadmium elution of not more than 0.01 mg/liter, no detected elution of whole cyanogens, a lead elution of not more than 0.01 mg/liter, a chromium (VI) elution of not more than 0.05 mg/liter, an arsenic elution of not more than 0.01 mg/liter, a whole mercury elution of not more than 0.0005 mg/liter, a selenium elution of not more than 0.01 mg/liter, a fluorine elution of not more than 0.8 mg/liter, a boron elution of not more than 1 mg/liter, and a ratio of a diffraction intensity $D_{110}$ of (110) plane of α-Fe to a sum of a diffraction intensity $D_{311}$ of (311) plane of magnetite and the diffraction intensity $D_{110}$ ($D_{110}/(D_{311}+D_{110})$) of 0.20:1 to 0.98:1 when measured from X-ray diffraction spectrum thereof.

In a twenty-second aspect of the present invention, there is provided a purifying agent for purifying a contaminated soil or ground water, comprising a water suspension containing iron particles as an effective component, wherein primary particles of the iron particles have a rice-ball shape, an average major axis diameter of 0.05 to 0.50 μm and an aspect ratio of from more than 1.0:1 to 2.0:1, and an α-Fe content of 30 to 99% by weight based on the weight of the iron particles, and secondary particles of the iron particles exhibit a particle size distribution with a single peak and have a median diameter $D_{50}$ (particle diameter corresponding to an accumulative volume of particles of 50% as measured and accumulated with respect to respective particle diameters and expressed by percentage based on a total volume of iron particles as 100%) of 0.5 to 5.0 μm and a ratio of $D_{90}$ to $D_{10}$ of 1.0:1 to 5.0:1.

In a twenty-third aspect of the present invention, there is provided a purifying agent for purifying contaminated soil or ground water, comprising a water suspension containing as an effective component, iron particles comprising α-Fe phase and $Fe_3O_4$ phase, wherein primary particles of the iron particles have a rice-ball shape, an average major axis diameter of 0.05 to 0.50 μm and an aspect ratio of from more than 1.0:1 to 2.0:1, and a ratio of a diffraction intensity $D_{110}$ of (110) plane of α-Fe to a sum of a diffraction intensity $D_{311}$ of (311) plane of magnetite and the diffraction intensity $D_{110}$ ($D_{110}/(D_{311}+D_{110})$) of 0.20:1 to 0.98:1 when measured from X-ray diffraction spectrum thereof; and secondary particles of the iron particles exhibit a particle size distribution with a single peak, and have a median diameter $D_{50}$ (particle diameter corresponding to an accumulative volume of particles of 50% as measured and accumulated with respect to respective particle diameters and expressed by percentage based on a total volume of iron particles as 100%) of 0.5 to 5.0 μm and a ratio of $D_{90}$ to $D_{10}$ of 1.0:1 to 5.0:1.

In a twenty-fourth aspect of the present invention, there is provided a method for purifying a soil or ground water contaminated with harmful substances, comprising:

mixing and contacting the iron particles as defined in claim 1 with the soil contaminated with the harmful substances or with the ground water contaminated with the harmful substances.

In a twenty-fifth aspect of the present invention, there is provided a method for purifying a soil or ground water contaminated with harmful substances, comprising:

mixing and contacting the purifying agent as defined in claim 18 with the soil contaminated with the harmful substances or with the ground water contaminated with the harmful substances.

DETAILED DESCRIPTION OF THE INVENTION

Figure 1:
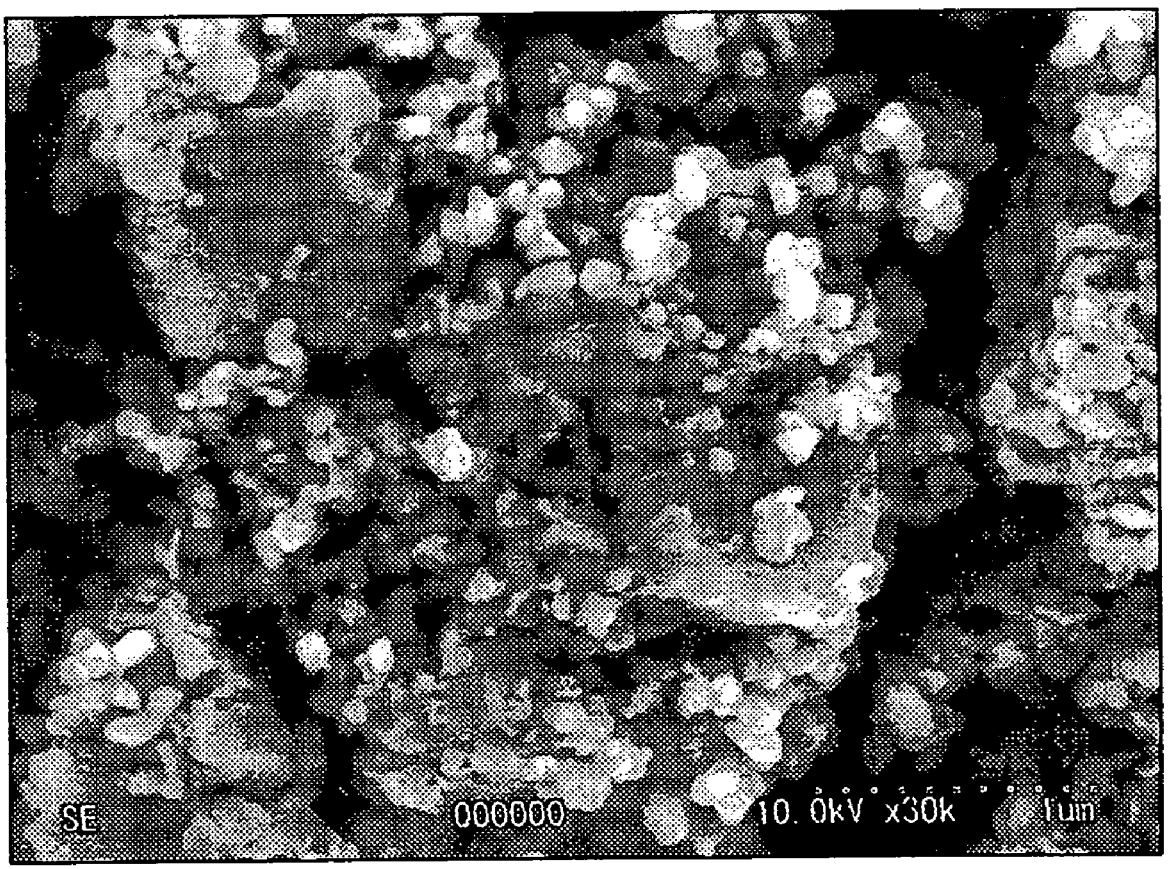
FIG. 1 is a scanning electron micrograph (×30,000) of iron particles for purification treatment obtained in Example 1.

The present invention is described in detail below.

First, the iron particles for purifying soil or ground water contaminated with harmful substances according to the present invention (hereinafter referred to merely as "purifying iron particles") are described.

The purifying iron particles of the present invention comprises a mixed phase composed of an α-Fe phase and a $Fe_3O_4$ phase, and have a BET specific surface area of 5 to 60 m²/g, an Fe content of not less than 75% by weight and an S content of not less than 1,000 ppm.

$Fe_3O_4$ enables a catalytic activity of the iron particles to be kept for a long period of time. The $Fe_3O_4$ content is not particularly restricted as long as the requirements for the Fe content and saturation magnetization of the iron particles can be satisfied. In addition, $Fe_3O_4$ (magnetite) is preferably present on the surface of the purifying iron particles.

The lower limit of the BET specific surface area value of the purifying iron particles according to the present invention is usually 5.0 m²/g, preferably 7.0 m²/g, and the upper limit thereof is usually 60 m²/g, preferably 55 m²/g, more preferably 50 m²/g. When the BET specific surface area value is less than 5.0 m²/g, the contact area of the purifying iron particles becomes small, resulting in insufficient catalytic activity thereof. When the BET specific surface area value is more than 60 m²/g, the α-Fe phase becomes unstable, resulting in formation of a thick oxidation film on the surface thereof, so that it may be difficult to increase the α-Fe content. As a result, the less α-Fe content leads to deteriorated catalytic activity of the purifying iron particles, so that it may be difficult to attain the aimed effects of the present invention.

The purifying iron particles of the present invention have an Fe content of usually not less than 75% by weight, preferably 75 to 98% by weight based on the total weight of the iron particles. When the Fe content is less than 75% by weight, the α-Fe content becomes small, resulting in deteriorated catalytic activity of the purifying iron particles, so that it may be difficult to attain the aimed effects of the present invention.

The sulfur content (S content) of the purifying iron particles is usually not less than 1,000 ppm, preferably not less than 1,500 ppm, more preferably not less than 1,900 ppm, still more preferably not less than 2,000 ppm, further still more preferably not less than 3,500 ppm, most preferably not less than 3,800 ppm. The upper limit of the S content of the purifying iron particles is preferably 10,000 ppm, more preferably 9,500 ppm. When the S content is less than 1,000 ppm, the obtained purifying iron particles may not exhibit a sufficient decomposition activity, i.e., a sufficient purification ability against the organohalogen compounds. In addition, upon the purification treatment, since the dissolution reaction of α-Fe is not caused sufficiently, the ferrite formation reaction with heavy metals may not fully proceed, so that it may be difficult to attain the aimed effects of the present invention. When the S content is more than 10,000 ppm, although a sufficient purification property against the organohalogen compounds is attained, the purification effect due to the S content is already saturated, and such a large S content is, therefore, unnecessary.

The purifying iron particles of the present invention contain the α-Fe phase in an amount of usually 30 to 99% by weight, preferably 40 to 99% by weight based on the weight of the iron particles. When the α-Fe phase content is less than 30% by weight, the obtained purifying iron particles may not exhibit a sufficient decomposition activity, i.e., a sufficient purification property against the organohalogen compounds. In addition, upon the purification treatment, since the dissolution reaction of α-Fe is not caused sufficiently, the ferrite formation reaction with heavy metals may not fully proceed, so that it may be difficult to attain the aimed effects of the present invention. When the α-Fe phase content is more than 99% by weight, the particle size of the purifying iron particles becomes extremely large, or the BET specific surface are thereof becomes extremely small, so that the iron particles are kept stable or inert in air, resulting in remarkably deteriorated catalytic activity thereof.

The purifying iron particles of the present invention preferably have a granular shape. In the process of the present invention, since the spindle-shaped or acicular goethite or hematite particles are directly subjected to heat reduction treatment, the particles undergo breakage of particle shape upon transformation into the α-Fe phase, and are formed into a granular shape or rice-ball shape through isotropic crystal growth thereof. On the contrary, as compared to these particles, spherical particles have a smaller BET specific surface area in the case where the particle sizes thereof are identical to that of the granular shaped or rice-ball shaped particles and, therefore, exhibit a less catalytic activity. Therefore, it is preferred that the purifying iron particles contain no spherical particles.

The primary particles of the purifying iron particles of the present invention have an average particle diameter of usually 0.05 to 0.50 μm, preferably 0.05 to 0.30 μm. When the average particle diameter of the primary particles is less than 0.05 μm, the α-Fe phase becomes unstable, resulting in formation of a thick oxidation film on the surface thereof, so that it may be difficult to increase the α-Fe content, and attain the aimed effects of the present invention. When the average particle diameter of the primary particles is more than 0.50 μm, although the α-Fe content is increased, the BET specific surface area thereof becomes too small, so that it may also be difficult to attain the aimed effects of the present invention.

The lower limit of the crystallite size $D_{110}$ of (110) plane of α-Fe of the purifying iron particles according to the present invention is usually 200 Å, preferably 220 Å, and the upper limit thereof is usually 500 Å, preferably 480 Å, more preferably 400 Å, still more preferably 350 Å. When the crystallite size $D_{110}$ is less than 200 Å, the BET specific surface area is increased, but the α-Fe phase becomes unstable, resulting in formation of a thick oxidation film on the surface of the particles, so that it may be difficult to increase the α-Fe content. As a result, the purifying iron particles may fail to show a sufficient decomposition activity, i.e., a sufficient purification property against the organohalogen compounds. In addition, upon the purification treatment, since the dissolution reaction of α-Fe is not caused sufficiently, the ferrite formation reaction with heavy metals may not fully proceed, so that it may be difficult to attain the aimed effects of the present invention. When the crystallite size $D_{110}$ is more than 500 Å, although the α-Fe content is increased, the BET specific surface area thereof becomes too small, so that it may be difficult to attain the aimed effects of the present invention.

The purifying iron particles of the present invention contain hardly no metal elements other than Fe such as Pb, Cd, As, Hg, Sn, Sb, Ba, Zn, Cr, Nb, Co, Bi, etc., since these metal elements exhibit a toxicity. In particular, it is preferred that the purifying iron particles contain substantially no Pb, Cd, As and Hg.

The purifying iron particles of the present invention have a saturation magnetization value of usually 60 to 200 Am²/kg (60 to 200 emu/g), preferably 60 to 190 Am²/kg (60 to 190 emu/g), more preferably 90 to 190 Am²/kg (90 to 190 emu/g), still more preferably 95 to 190 Am²/kg (95 to 190 emu/g). When the saturation magnetization value is less than 60 Am²/kg, the Fe content thereof is lowered, resulting in deteriorated catalytic activity thereof. When the saturation magnetization value is more than 200 Am²/kg, although the Fe content is increased, the BET specific surface area tends to be lowered, also resulting in deteriorated catalytic activity thereof.

The purifying iron particles are constituted from the $Fe_3O_4$ phase in addition to the α-Fe phase. The existence of the $Fe_3O_4$ phase enables the catalytic activity of the purifying iron particles to be kept for a long period of time. The $Fe_3O_4$ content of the purifying iron particles is controlled such that when measured from X-ray diffraction spectrum of the iron particles, the ratio of a diffraction intensity $D_{110}$ of (110) plane of α-Fe to a sum of a diffraction intensity $D_{311}$ of (311) plane of $Fe_3O_4$ and the diffraction intensity $D_{110}$ ($D_{110}/(D_{311}+D_{110})$) is usually 0.20:1 to 0.98:1, preferably 0.30:1 to 0.98:1. In addition, $Fe_3O_4$ (magnetite) is preferably present on the surface of the purifying iron particles. By allowing the magnetite to exist on the surface of the particles, the ferrite formation reaction over the iron particles as seeds can proceed epitaxially.

As the purifying iron particles of the present invention, there may also be exemplified iron particles having further the following properties.

(1) The purifying iron particles include primary particles containing small particles having a particle diameter of 0.05 to 0.50 μm in an amount of preferably not less than 20% by volume based on the volume of the whole particles, and large particles having a particle diameter of 0.50 to 5.0 μm in an amount of preferably less than 80% by volume based on the volume of the whole particles. When the content of the small particles is less than 20% by volume, the content of the large particles is comparatively increased, so that the catalytic activity may be deteriorated. The content of the small particles is more preferably not less than 25% by volume, still more preferably 30 to 60% by volume. In the primary particles, the small particles having a particle diameter of 0.05 to 0.50 μm have an average particle diameter of preferably 0.07 to 0.30 μm, and the large particles having a particle diameter of 0.50 to 5.0 μm have an average particle diameter of preferably 0.8 to 3.0 μm.

(2) The rice-ball shaped purifying iron particles include primary particles having an average major axis diameter of preferably 0.05 to 0.50 μm, more preferably 0.05 to 0.30 μm. When the average major axis diameter is less than 0.05 μm, the α-Fe phase becomes unstable, resulting in formation of a thick oxidation film on the surface thereof, so that it may be difficult to increase the α-Fe content. Also, the obtained purifying iron particles may not exhibit a sufficient decomposition activity, i.e., a sufficient purification property against the organohalogen compounds. In addition, upon the purification treatment, since the dissolution reaction of α-Fe is not caused sufficiently, the ferrite formation reaction with heavy metals may not fully proceed, so that it may be difficult to attain the aimed effects of the present invention. When the average major axis diameter is more than 0.50 μm, although the α-Fe content is increased, the BET specific surface area becomes small, so that it may be difficult to attain the aimed effects of the present invention.

The primary particles of the rice-ball shaped purifying iron particles have an aspect ratio of preferably from more than 1.0:1 to 2.0:1, more preferably 1.2:1 to 1.8:1. When the aspect ratio is 1.0:1, the iron particles are spherical particles, and the BET specific surface area becomes smaller as compared to that of the rice-ball shaped particles in the case where the particle sizes thereof are identical to each other, so that the catalytic activity thereof may be deteriorated. When the aspect ratio is more than 2.0:1, the BET specific surface area becomes large, and the α-Fe phase becomes unstable, resulting in formation of a thick oxidation film on the surface thereof, so that it may be difficult to increase the α-Fe content. Further, the obtained purifying iron particles may not exhibit a sufficient decomposition activity, i.e., a sufficient purification property against the organohalogen compounds. In addition, upon the purification treatment, since the dissolution reaction of α-Fe is not caused sufficiently, the ferrite formation reaction with heavy metals may not fully proceed, so that it may be difficult to attain the aimed effects of the present invention.

(3) The iron particles of the present invention exhibit a cadmium elution of usually not more than 0.01 mg/liter, preferably not more than 0.005 mg/liter; no detected elution of whole cyanogen; a lead elution of usually not more than 0.01 mg/liter, preferably not more than 0.005 mg/liter; a chromium (VI) elution of usually not more than 0.05 mg/liter, preferably not more than 0.002 mg/liter; an arsenic elution of usually not more than 0.01 mg/liter, preferably not more than 0.005 mg/liter; a whole mercury elution of usually not more than 0.0005 mg/liter, preferably less than 0.0005 mg/liter; a selenium elution of usually not more than 0.01 mg/liter, preferably not more than 0.005 mg/liter; a fluorine elution of usually not more than 0.8 mg/liter, preferably not more than 0.6 mg/liter; and a boron elution of usually not more than 1 mg/liter, preferably not more than 0.5 mg/liter. When the amount of elution of the respective elements exceeds the above-specified ranges, the iron particles may fail to show a high purification property against the organohalogen compounds. In addition, since a large amount of harmful elements are contained in the iron particles, there arises such a risk that when purifying soil or ground water contaminated with the organohalogen compounds, the soil or ground water is further contaminated with these harmful elements.

(4) In the case where the above iron particles of the present invention are used as a purifying agent, it is preferred to use secondary particles constituted by primary particles of the above-mentioned iron particles.

When the purifying iron particles of the present invention are measured by a laser diffraction apparatus, the secondary particles thereof preferably exhibit such a particle size distribution with a single peak. If a plurality of peaks is present, the penetration velocity of the iron particles into contaminated soil becomes non-uniform, resulting in prolonged purification time, so that it may be difficult to attain the aimed effects of the present invention.

The secondary particles of the purifying iron particles according to the present invention have a median diameter $D_{50}$ (particle diameter corresponding to an accumulative volume of particles of 50% as measured and accumulated with respect to respective particle diameters and expressed by percentage based on a total volume of iron particles as 100%) of preferably 0.5 to 5.0 μm, more preferably 0.5 to 3.5 μm. Although the median diameter $D_{50}$ of the secondary particles is preferably as small as possible, the lower limit thereof is preferably 0.5 μm from industrial viewpoints because the primary particles are fine particles, contain α-Fe and, therefore, tend to be magnetically agglomerated. When the median diameter of the secondary particles is more than 5.0 μm, the penetration into contaminated soil is too slow, so that it may be difficult to purify the soil for a short period of time and attain the aimed effects of the present invention.

The secondary particles of the purifying iron particles according to the present invention have a ratio of $D_{90}$ (particle diameter corresponding to an accumulative volume of particles of 90% as measured and accumulated with respect to respective particle diameters and expressed by percentage based on a total volume of iron particles as 100%) to $D_{10}$ (particle diameter corresponding to an accumulative volume of particles of 10% as measured and accumulated with respect to respective particle diameters and expressed by percentage based on a total volume of iron particles as 100%) ($D_{90}/D_{10}$) of preferably 1.5:1 to 5.0:1, more preferably 1.0:1 to 3.5:1. Although the ratio ($D_{90}/D_{10}$) is preferably as small as possible since the penetration velocity into contaminated soil is equalized and the purification velocity also becomes uniform, the lower limit thereof is preferably 1.0:1 from industrial viewpoints. When the ratio ($D_{90}/D_{10}$) is more than 5.0:1, the penetration velocity into contaminated soil becomes non-uniform, resulting in slow purification performance and prolonged purification time, so that it may be difficult to attain the aimed effects of the present invention.

The secondary particles of the purifying iron particles according to the present invention have a particle size distribution width: $D_{84}-D_{16}$ (wherein $D_{84}$ represents a particle diameter corresponding to an accumulative volume of particles of 84% as measured and accumulated with respect to respective particle diameters and expressed by percentage based on a total volume of iron particles as 100%, and $D_{16}$ represents a particle diameter corresponding to an accumulative volume of particles of 16% as measured and accumulated with respect to respective particle diameters and expressed by percentage based on a total volume of iron particles as 100%) of preferably 0.5 to 5.0 µm, more preferably 0.5 to 3.5 µm Although the distribution width: $D_{84}-D_{16}$ is preferably as small as possible since the penetration velocity into contaminated soil is equalized and, therefore, the purification velocity also becomes uniform, the lower limit thereof is preferably 0.5 µm from industrial viewpoints. When the distribution width: $D_{84}-D_{16}$ is more than 5.0 µm, the penetration velocity into contaminated soil becomes non-uniform, resulting in slow purification performance and prolonged purification time, so that it may be difficult to attain the aimed effects of the present invention.

Meanwhile, the purifying iron particles may be used in the form of a granulated product.

Next, the purifying agent for purifying soil or ground water contaminated with harmful substances such as organohalogen compounds and/or heavy metals, cyanogen, etc., according to the present invention (hereinafter referred to merely as "purifying agent"), is described.

The purifying agent of the present invention comprises the above purifying iron particles alone, or a water suspension containing as an effective component the above purifying iron particles. The content of the purifying iron particles in the water suspension may be appropriately selected from the range of usually 0.5 to 50 parts by weight based on 100 parts by weight of the water suspension.

The purifying agent composed of the water suspension for purifying soil or ground water contaminated with harmful substances such as organohalogen compounds and/or heavy metals, cyanogen, etc., according to the present invention, has a pH value of preferably 7 to 12, more preferably 8 to 12. In the present invention, it has been confirmed that the pH value of the purifying agent is increased from 8 to about 11 with the passage of time. Therefore, it is considered that since the pH value thereof lies in an alkali region, α-Fe is gradually dissolved little by little, so that the ferrite formation reaction with heavy metals or the like can proceed continuously.

Next, the process for producing the purifying iron particles for purifying soil or ground water contaminated with harmful substances such as organohalogen compounds and/or heavy metals, cyanogen, etc., according to the present invention, is described.

The goethite particles can be produced by ordinary methods, for example, by passing an oxygen-containing gas such as air through a suspension containing a ferrous-containing precipitate such as iron hydroxide and iron carbonate which is obtained by reacting a ferrous salt with at least one compound selected from the group consisting of alkali hydroxide, alkali carbonate and ammonia. As the aqueous solution containing the ferrous salt, there may be suitably used high-purity aqueous ferrous salt solutions having a less content of impurities such as heavy metals.

As the aqueous solution containing the ferrous salt and having a less content of impurities, there may be used, for example, an aqueous ferrous salt solution obtained by washing a steel plate with sulfuric acid to dissolve out and remove impurities precipitated on the surface layer thereof as well as rust-preventive oils and the like, and then dissolving the impurity-free steel plate. If acid-washing solutions obtained by washing scrap irons containing a large amount of metal impurities other than iron, steel plates subjected to plating treatment, phosphate treatment or chromic acid treatment for improving corrosion resistance thereof, or steel plates coated with rust-preventive oils or the like, are used as raw materials, impurities may remain in the obtained iron particles. As a result, there arises such a risk that the impurities are eluted from the iron particles into soil or ground water to be purified.

In addition, as the aqueous solution containing the ferrous salt and having a less content of impurities, there may also be used an aqueous ferrous salt solution obtained by adding alkali such as alkali hydroxide to a ferrous sulfate solution by-produced from titanium oxide production process, etc., to adjust the pH value thereof; insolubilizing and precipitating titanium as well as other impurities in the from of hydroxides thereof; and then removing the precipitates from the reaction solution by ultra-filtration, etc. Among these aqueous ferrous salt solutions, preferred is the aqueous ferrous salt solution obtained by dissolving the steel plate having a less content of impurities with sulfuric acid, and more preferred is such an aqueous ferrous salt solution obtained by further removing impurities from the above preferred aqueous ferrous salt solution by adjusting the pH value thereof. Any of the above-described methods can be used industrially without problems and is also advantageous from economical viewpoints.

The goethite particles have an average major axis diameter of usually 0.05 to 0.50 µm, and are preferably spindle-shaped particles or acicular particles, more preferably spindle-shaped particles. The lower limit of aspect ratio of the goethite particles is preferably 4:1, more preferably 5:1; and the upper limit thereof is preferably 30:1 more preferably 25:1, still more preferably 20:1, further still more preferably 18:1. The BET specific surface area of the goethite particles is preferably 20 to 200 m²/g, more preferably 25 to 180 m²/g.

The goethite particles have an S content of usually not less than 700 ppm, preferably 2,200 to 8,000 ppm, more preferably 2,200 to 6,300 ppm.

Also, in order to maintain a high α-Fe content in the iron particles and allow the iron particles to undergo shape breakage and crystal growth for forming granular particles, it is preferred that no surface treatments such as anti-sintering treatment are conducted against the goethite particles.

The goethite particles are preferably granulated by ordinary methods. By granulating the goethite particles a fixed bed-type reducing furnace can be used. Further, the iron particles obtained from such a granulated product may still maintain the shape thereof under certain reducing conditions, and can be suitably filled in columns or the like upon use.

The thus obtained goethite particles may be heat-dehydrated into hematite particles at a temperature of 250 to 350° C.

The S content of the obtained hematite particles can be controlled by previously using goethite particles having a high S content. Also, in the case where the goethite particles having a low S content are used, the S content of the hematite particles may be controlled by adding sulfuric acid to a water suspension containing the obtained hematite particles.

The thus obtained hematite particles have an average major axis diameter of usually 0.05 to 0.50 μm, and an S content of usually not less than 750 ppm, preferably 2,400 to, 8,500 ppm, more preferably 2,400 to 7,000 ppm.

The goethite particles or the hematite particles are heat-reduced at a temperature of usually 250 to 600° C., preferably 350 to 600° C. to obtain iron particles (α-Fe)

When the heat-reducing temperature is less than 350° C., the reduction reaction proceeds slowly, thereby requiring a prolonged reduction reaction time. Even though the BET specific surface area of the particles is increased at such a low heat-reducing temperature, a sufficient crystal growth of the particles may be inhibited, resulting in formation of unstable α-Fe phase and thick oxidation film, or insufficient phase transfer from $Fe_3O_4$ phase to α-Fe phase. As a results, it may be difficult to increase the α-Fe content. When the heat-reducing temperature is more than 600° C., the reduction reaction proceeds too rapidly, so that sintering within or between the particles is excessively accelerated, resulting in a too large particle size and a too small BET specific surface area of the obtained iron particles.

Meanwhile, as the atmosphere upon temperature rise of the reduction reaction, there may be used hydrogen gas, nitrogen gas or the like. Among these gases, hydrogen gas is preferred from industrial viewpoints.

After cooling the iron particles obtained by the heat reduction, (i) the obtained iron particles are taken out and transferred into water without forming an oxidation film (layer) on the surface thereof in a gas phase, oxidized in water to form the oxidation film (layer) on the surface thereof, and then dried; or (ii) the obtained iron particles are oxidized in a gas phase to form an oxidation film (layer) on the surface thereof. Among these methods, preferred is the method (i) in which the iron particles are taken out and transferred into water without forming an oxidation film on the surface thereof in a gas phase, oxidized in water to form an oxidation film (layer) on the surface thereof, and then dried.

As the atmosphere upon the cooling, there may be used either nitrogen gas or hydrogen gas. However, at a final stage of the cooling, the atmosphere is preferably changed to a nitrogen gas atmosphere. Upon transferring the iron particles into water, the iron particles are preferably cooled to a temperature of not more than 100° C.

The atmosphere upon the drying may be appropriately selected from nitrogen gas, air, vacuum, etc. Upon the drying, the temperature of the iron particles is preferably not more than 100° C.

In the above heat-reduction treatment, the treated particles are transformed into iron particles composed of α-Fe phase. Upon transferring the iron particles composed of α-Fe phase into water, water is decomposed by catalytic activity of the α-Fe to produce hydrogen and hydroxyl groups. Therefore, it is considered that hydroxyl groups produced together with the hydrogen, oxygen, dissolved oxygen in water, etc., cause the α-Fe to be oxidized, resulting in formation of an oxidation film composed of $Fe_3O_4$ on the surface of the particles.

Next, the process for producing the purifying agent for purifying soil or ground water contaminated with harmful substances such as organohalogen compounds and/or heavy metals, cyanogen, etc. according to the present invention, is described.

In the process of the present invention, (i) after the iron particles obtained by heat-reducing the goethite particles or the hematite particles obtained by heat-dehydrating the goethite particles, are taken out and transferred into water without forming an oxidation film on the surface thereof in a gas phase, the iron particles are oxidized in water to form the oxidation film on the surface thereof, or (ii) the iron particles obtained by heat-reducing the goethite particles or the hematite particles obtained by heat-dehydrating the goethite particles are oxidized in a gas phase to form the oxidation film on the surface thereof and then added into water, thereby obtaining a water suspension containing the iron particles having the surface oxidation film as a purifying agent according to the present invention.

The purifying agent of the present invention is preferably in the form of a dispersion obtained by dispersing secondary agglomerates of the iron particles in water.

After cooling the iron particles obtained by the heat-reduction treatment, the iron particles are then transferred into water without forming an oxidation film on the surface thereof in a gas phase, and oxidized in water to form the oxidation film thereon. Thereafter, the thus obtained iron particles are preferably wet-pulverized according to agglomeration condition, properties (high-activity), particle size, capacity of pulverizer (particle size of product, amount of product pulverized) and final configuration of the particles.

As the pulverizer usable in the present invention, in the case where grinding media are used, there may be used media-stirring type mills including container-moving type mills, e.g., rolling mills such as pot mill, tube mill and conical mill, vibration mills such as fine vibration mill, or the like; tower type mills such as tower mill; stirring tank type mills such as attritor; flowing tube type mills such as sand grind mill; and annular type mills such as annular mill. In the case where no grinding media are used, there may be used shear/friction type mills, e.g., container rotating type mills such as Wong mill; wet high-speed rotation type mills such as colloid mill, homomixer and line mixer; or the like.

In general, the pulverization means to pulverize raw materials having a size of not more than 25 mm into particles, and is generally classified into coarse pulverization, minute pulverization and fine pulverization. The coarse pulverization is to pulverize the raw materials into particles having a size of 5 mm to 20 mesh, the minute pulverization is to pulverize the raw materials into particles containing small particles having a size of not more than 200 mesh in an amount of about 90%, and the fine pulverization is to pulverize the raw materials into particles containing fine particles having a size of not more than 325 mesh in an amount of about 90%. Further, the raw materials may be pulverized into several microns using an ultrafine pulverizer. In the present invention, the raw materials are preferably subjected to three pulverization treatments including the coarse pulverization, minute pulverization and fine pulverization.

The coarse pulverization may be carried out using low-speed rotation-type stirrers, medium-speed rotation-type stirrers, high-speed rotation shearing-type stirrers or high- and low-speed combined rotation-type stirrers, in which a baffle is equipped into a stirring tank. In particular, in the consideration of pulverization of agglomerates of the iron particles, the medium- to high-speed rotation type stirrers being operable at 1,000 to 6,000 rpm are preferably used. As the blade form of the stirrers, there may be used disk turbine, fan turbine, arrow feather-shaped turbine, propeller turbine or the like. Of these stirrers, preferred are edged disk turbines, e.g., homodisper manufactured by Tokushu Kika Kogyo Co., Ltd.

The minute or fine pulverization may be carried out using a batch type apparatus or a continuous type apparatus. Of these apparatuses, the continuous type apparatus is preferred from industrial viewpoints. The minute or fine pulverization using grinding media may be carried out using ball mill, tower mill, sand grind mill, attritor or the like. Also, the minute or fine pulverization using no grinding media may be carried out using homomixer, line mixer or the like.

In the minute pulverization, there may be used such a pulverizer of a multi-stage structure comprising a combination of a stator provided at an outer periphery thereof with a plurality of slits and a rotor provided at a shaft-fixing surface portion with cutter blades. In particular, a continuous shear-dispersing device such as media-less line mixer whose rotor is rotated at a peripheral speed of not less than 30 m/s, for example, "Homomic Line Mixer" manufactured by Tokushu Kika Kogyo Co., Ltd., may be preferably used.

The fine pulverization (finish pulverization) may be carried out using a media type-dispersing device such as a sand grind mill, in which a plurality of disks fitted on a rotating center axis of a cylindrical vessel filled with $\phi 1$ to $\phi 3$ grinding media at a filling percentage of 70 to 80%, are rotated to cause a rapid rotation action of the media through which materials to be treated are passed from underneath to above, for example, a sand grinder manufactured by Imex Co., Ltd.

In the wet pulverization of the present invention, in order to accelerate formation of cracks in the particles and inhibit recombination of the pulverized particles, or in order to prevent the particles from being agglomerated into granular form which are difficult to pulverize or prevent the particles from being adhered onto balls or mills, which may cause deteriorated pulverizing force, suitable pulverizing assistants may be appropriately added. The pulverizing assistants may be in the form of either solid or liquid. Examples of the solid pulverizing assistants may include stearic acid salts, colloidal silica, colloidal carbon or the like. Examples of the liquid pulverizing assistants may include triethanolamine, alkyl sulfonates or the like.

The concentration of the iron particles contained in the water suspension upon the wet pulverization is preferably 20 to 40% by weight. When the concentration of the iron particles is less than 20% by weight, it may be difficult to apply a suitable stress such as shear force upon the pulverization, thereby failing to pulverize into the aimed particle size, or resulting in prolonged pulverization time. Further, the grinding media required for the pulverization may suffer from severe abrasion. When the concentration of the iron particles is more than 40% by weight, the water suspension may exhibit an increased viscosity, resulting in need of large mechanical load, so that it may be difficult to produce the aimed particles in industrially suitable manner.

Next, the process for purifying soil or ground water contaminated with harmful substances such as organohalogen compounds and/or heavy metals, cyanogen, etc., according to the present invention, is described.

The purification treatment of soil or ground water contaminated with organohalogen compounds are generally classified into "in-situ decomposition" method of directly decomposing contaminants contained therein under the ground, and "in-situ extraction" method of excavating or extracting soil or ground water containing contaminants, and then decomposing the contaminants in place. In the present invention, any of these methods may be used.

In the in-situ decomposition method, the purifying iron particles or the purifying agent may be directly penetrated into the underground or introduced into the underground through drilled bore, using a transfer medium including high-pressure gas such as air and nitrogen, or water. In particular, since the purifying agent of the present invention is in the form of a water suspension, the purifying agent may be directly used, or may be used in the form of a diluted solution.

In the in-situ extraction method, the excavated soil may be mixed and stirred with the purifying iron particles or the purifying agent using sand mill, Henschel mixer, concrete mixer, Nauter mixer, single- or twin-screw kneader type mixer, or the like. Also, the pumped ground water may be passed through a column, etc., filled with the purifying iron particles.

The soil or ground water contaminated with harmful substances such as heavy metals, cyanogens, etc. may be purified by the "containment" method. In the present invention, both methods of "in-situ containment" and "containment after excavation" are applicable.

In the "in-situ containment", a mixture of the purifying iron particles and water, or the purifying agent may be directly penetrated into the underground or introduced into the underground through drilled bore, using a transfer medium including high-pressure gas such as air and nitrogen or water, thereby confining the contaminated soil or ground water in place. Since the purifying agent is in the form of a water suspension, the purifying agent may be directly used, or may be used in the form of a diluted solution.

In the "containment after excavation", a mixture of the purifying iron particles and water, or the purifying agent may be mixed and stirred with excavated contaminated soil using sand mill, Henschel mixer, concrete mixer, Nauter mixer, single- or twin-screw kneader type mixer, or the like, thereby forming ferrite into which the heavy metals contained in the soil are incorporated for containment thereof. Meanwhile, if required, the ferrite into which the heavy metals are incorporated, may be magnetically separated from the soil.

The amount of the purifying iron particles or the purifying agent added (calculated as solid content) may be appropriately selected according to the degree of contamination of soil or ground water with harmful substances such as organohalogen compounds and/or heavy metals, cyanogen, etc. In the case where contaminated soil is to be purified, the lower limit of the amount of the purifying iron particles or the purifying agent added (calculated as solid content) is usually 0.1 part by weight, preferably 0.2 part by weight, more preferably 0.5 part by weight, still more preferably 1 part by weight based on 100 parts by weight of the soil, and the upper limit thereof is usually 50 parts by weight, preferably 30 parts by weight, more preferably 20 parts by weight based on 100 parts by weight of the soil. When the amount of the purifying iron particles or the purifying agent added is less than 0.1 part by weight, it may be difficult to attain the aimed effects of the present invention. When the amount of the purifying iron particles or the purifying agent added is more than 50 parts by weight, although the purification effect is enhanced, the use of such a large amount of the purifying iron particles or the purifying agent is uneconomical.

In the case where the contaminated ground water is to be purified, the lower limit of the amount of the purifying iron particles or the purifying agent added (calculated as solid content) is usually 0.1 part by weight, preferably 0.2 part by weight, more preferably 0.5 part by weight, still more preferably 1 part by weight based on 100 parts by weight of the ground water, and the upper limit thereof is usually 50 parts by weight, preferably 30 parts by weight, more preferably 20 parts by weight based on 100 parts by weight of the ground water.

When the purifying iron particles or the purifying agent of the present invention are used, when evaluated by the below-mentioned methods, the residual percentage of aliphatic organohalogen compounds remaining in the contaminated soil can be lessened to usually not more than 8%, preferably 0.1 to 5%; the residual percentage of aliphatic organohalogen compounds remaining in the contaminated ground water can be lessened to usually not more than 8%, preferably 0.1 to 5%; the residual percentage of aromatic organohalogen compounds remaining in the contaminated soil can be lessened to usually not more than 30%, preferably not more than 25%, more preferably not more than 20%; and the residual percentage of aromatic organohalogen compounds remaining in the contaminated ground water can be lessened to usually not more than 30%, preferably not more than 25%, more preferably not more than 20%.

In addition, in the case where the purifying iron particles or the purifying agent according to the present invention are used, when evaluated by the below-mentioned methods, the cadmium content in the contaminated soil or ground water can be reduced to not more than 0.01 mg/liter, the lead content in the contaminated soil or ground water can be reduced to not more than 0.01 mg/liter, the chromium (VI) content in the contaminated soil or ground water can be reduced to not more than 0.05 mg/liter, the arsenic content in the contaminated soil or ground water can be reduced to not more than 0.01 mg/liter, and the selenium content in the contaminated soil or ground water can be reduced to not more than 0.01 mg/liter. Also, the cyanogen content in the contaminated soil or ground water can be reduced to undetected level.

The point of the present invention is that by using the purifying iron particles or the purifying agent of the present invention, organohalogen compounds contained in soil or ground water can be decomposed in efficient, continuous and economical manners.

The reasons why organohalogen compounds contained in soil or ground water can be effectively decomposed according to the present invention, are considered as follows.

(1) That is, it is considered that due to the synergistic effect of specified BET specific surface area, high Fe content and specified high sulfur content of the purifying iron particles, the catalytic activity of the purifying agent can be largely enhanced. Although the function of the sulfur contained is not still unclear, it is considered that the sulfur can promote dissolution of surface portion of the particles to expose α-Fe having a high catalytic activity onto the surface thereof.

That is, it is considered that upon decomposition of the organohalogen compounds, the purifying iron particles exhibiting a very high catalytic activity can continuously decompose water, thereby providing reaction sites required for the decomposition of the organohalogen compounds. More specifically, it is considered that the continuous decomposition of water continuously produces hydroxide ions acting to isolate from the organohalogen compounds, halogen atoms that are then retained in the liquid phase in an ionized from, as well as hydrogen ions that are bonded to the sites from which the halogen atoms are isolated. Meanwhile, it is considered that the sulfur component contained in the purifying agent is eluted and ionized simultaneously with the decomposition of water, and the thus produced sulfur ions are reacted with the organohalogen compounds to induce substitution reaction and hydrogenation reaction thereof, thereby promoting the decomposition of the organohalogen compounds while allowing the sulfur component to be vaporized as sulfur dioxide. Further, it is considered that since various ions produced above cause the pH to be shifted to alkali region, it becomes possible to gradually elute the sulfur component and, therefore, improve the persistency of the decomposition reaction. Also, it is considered that since hydrogen gas as well as oxygen gas are produced in the gas phase, the reaction system can be kept in a reducing atmosphere by the existence of the hydrogen gas, thereby promoting the decomposition of the organohalogen compounds, and a part of the oxygen gas produced is incorporated into the solid to form magnetite.

Accordingly, it is considered that the decomposition of the organohalogen compounds can be completely achieved, when whole halogen atoms are isolated from the organohalogen compounds while adding hydrogen thereto so as to convert the compounds into stabilized form.

(2) It is considered that since the purifying iron particles contain small particles having a particle diameter of 0.05 to 0.50 μm in an amount of not less than 20% by volume, and have a specific BET specific surface area and a high Fe content as whole particles, the catalytic activity of the purifying iron particles can be largely enhanced. Further, it is considered that the purifying iron particles exhibiting a high activity can decompose water to generate hydrogen gas, so that the reaction system can be maintained in a reducing atmosphere, or hydrogen atoms before forming the hydrogen gas can be contacted with organohalogen compounds, resulting in promoted decomposition of the organohalogen compounds.

Further, it is considered that since the iron particles of the present invention have a specified crystallite size and are composed of a mixed phase of α-Fe and $Fe_3O_4$, the $Fe_3O_4$ layer formed on the surface thereof can have a function for protecting inside Fe, resulting in continuous effect of the catalytic activity. Also, the purifying iron particles containing large particles having a particle diameter of 0.5 to 5.0 μm according to the present invention can maintain the catalytic activity for a long period of time. In general, the catalytic activity of iron particles is gradually deteriorated with oxidation of the surface thereof. However, in the present invention, by allowing the iron particles to stand in water as shown in below-mentioned Examples, even though a large amount of the oxidation film layer composed of $Fe_3O_4$ is formed, the catalyst effect of the iron particles can be still maintained, and in some cases, a higher catalyst effect can be obtained. Therefore, it is presumed that the $Fe_3O_4$ phase formed in water can also contribute to enhancement of the catalytic activity.

(3) It is considered that since the purifying agent of the present invention contains as an effective component the fully pulverized iron particles having a narrow particle size distribution, the purifying agent can be readily penetrated and dispersed in soil or ground water and, therefore, can sufficiently exhibit an inherent decomposition activity to the organohalogen compounds.

(4) It is considered that since the iron particles of the present invention contain α-Fe, and exhibit the synergistic effect of increased purity of iron particles and increased reactivity thereof due to removal of harmful heavy metals and other elements as catalyst poisons, the iron particles can sufficiently exhibit an inherent decomposition activity to the organohalogen compounds.

Further, in the present invention, since the purifying iron particles and the purifying agent are reduced in amounts of elution of harmful heavy metals such as cadmium, lead, chromium (VI), arsenic, whole mercury and selenium as well as whole cyanogens and the other elements, the soil or ground water after the purification treatment can be discharged to environments without any environmental pollution, thereby extremely minimizing adverse influence on the environments.

That is, the purifying iron particles of the present invention can insolubilize heavy metals, cyanogens, etc., by subjecting α-Fe dissolved from the iron particles together with the heavy metals and the like to ferrite formation reaction.

Since the purifying iron particles of the present invention have a fine particle size and a high activity, α-Fe can be readily dissolved therefrom at ordinary temperature without heating. Further, water contained in soil or ground water is efficiently decomposed by the purifying iron particles to generate hydrogen or hydroxyl groups, thereby allowing an alkali region to always exist locally. As a result, the dissolution reaction of α-Fe can gradually proceed. Then, the dissolved α-Fe and the harmful substances such as heavy metals and cyanogens continuously undergo the reaction of forming spinel ferrite at an interface of the iron particles while introducing the hydroxyl groups due to the decomposition of water, oxygen or dissolved oxygen thereinto. For this reason, it is considered that as a result of the continuous spinel ferrite formation reaction, the harmful substances such as heavy metals and cyanogens can be insolubilized. Also, it is considered that sulfur contained in the iron particles can locally contribute to the dissolution of α-Fe.

In addition, it is considered that since the ferrite formation reaction of the dissolved α-Fe with the harmful substance such as heavy metals and cyanogens causes an epitaxial growth of the particles on the spinel magnetite surface layer as seed, the harmful substances such as heavy metals and cyanogens can be effectively insolubilized.

In the present invention, since any of pH-adjusting treatment by addition of acid or alkali, heat-treatment and forced oxidation treatment by air-blowing is not required, it is possible to efficiently insolubilize the harmful substances such as heavy metals and cyanogens. Further, since the purifying iron particles are free from change in properties with the passage of time, the harmful substances such as heavy metals and cyanogens can be insolubilized over a long period of time.

As described above, since the purifying iron particles of the present invention exhibit a high catalytic activity as well as a good persistency thereof, the organohalogen compounds can be efficiently decomposed for a short period of time, resulting in efficient purification treatment. Therefore, the present invention is suitable, in particular, for purifying soil or ground water contaminated with high-concentration organohalogen compounds.

In addition, since the purifying agent does not contain harmful heavy metals and other harmful elements, the soil or ground water can be prevented from being contaminated with the heavy metals and other harmful elements upon the purification treatment thereof, thereby minimizing adverse influence on environments.

The purifying iron particles and the purifying agent containing as an effective component the iron particles according to the present invention can insolubilize harmful substances including heavy metals such as cadmium, lead, chromium (VI), arsenic and selenium as well as cyanogen, etc., in efficient and continuous manners, and, therefor, are suitable for purifying soil or ground water contaminated with the harmful substances such as heavy metals. Accordingly, the present invention can exhibit a very large industrial applicability.

EXAMPLES

The present invention is described in more detail by Examples and Comparative Examples, but the Examples are only illustrative and, therefore, not intended to limit the scope of the present invention.

Various properties were evaluated by the following methods.

(1) The average major axis diameter and the aspect ratio of goethite particles were measured from a transmission electron micrograph thereof. The average particle sizes of hematite particles and iron particles were measured from a scanning electron micrograph thereof.

Also, the average particle diameter of small particles having a particle diameter of 0.05 to 0.50 μm and the average particle diameter of large particles having a particle diameter of 0.50 to 5.0 μm were respectively measured from a scanning electron micrograph of the iron particles.

The particle size distribution of the iron particles was measured by a laser scattering diffraction type "NIKKISO MICROTRAC HRA MODEL 9320-X100" (manufactured by Nikkiso Co., Ltd.), and the respective contents of the small particles having a particle diameter range of 0.05 to 0.50 μm and the large particles having a particle diameter range of 0.5 to 5.0 μm were determined from the thus measured particle size distribution.

(2) The Fe content in the iron particles was measured using an inductively coupled high-frequency plasma atomic emission spectroscope "SPS-4000" (manufactured by Seiko Denshi Kogyo Co., Ltd.).

(3) The α-Fe content in the iron particles was calculated from a calibration curve prepared by previously measuring X-ray diffraction patterns of various particles containing α-iron and magnetite (transformed from α-Fe placed in water) at various mixing ratios and establishing a relational formula between the diffraction intensity $D_{110}$ of (110) plane of α-Fe, the diffraction intensity $D_{311}$ of (311) plane of magnetite and the mixing ratios based on the measured patterns. The relational formula as the calibration curve is expressed as follows.

α-Fe content=$-51.387X^2+151.88X$ wherein X represents an intensity ratio ($D_{110}/(D_{110}+D_{311})$)

(4) Among metal elements other than iron contained in the respective particles, the Pb and Cd contents were measured by "Flame Atomic Absorption Spectrophotometer AA-6500S" (manufactured by Shimadzu Seisakusho Co., Ltd.); the As content was measured by "Hydrogen Compound-Generating Atomic Absorption Spectrophotometer HVG-1" (manufactured by Shimadzu Seisakusho Co., Ltd.); and the Hg content was measured by "Reduction-Vaporizing Atomic Absorption Spectrophotometer MVU-1A" (manufactured by Shimadzu Seisakusho Co., Ltd.).

(5) The crystallite size $D_{110}$ ((110) plane of α-Fe) of the iron particles was expressed by the thickness of crystallite in the direction perpendicular to each crystal plane of the particles as measured by X-ray diffraction method. The thickness value was calculated from the X-ray diffraction peak curve prepared with respect to each crystal plane according to the following Scherrer's formula:

Crystallite Size $D_{110}=K\lambda/\beta \cos \theta$ wherein β is a true half-width of the diffraction peak which was corrected with respect to the width of machine used (unit: radian); K is a Scherrer constant (=0.9); λ is a wavelength of X-ray used (Cu Kα-ray 0.1542 nm); and θ is a diffraction angle (corresponding to a diffraction peak of each crystal plane).

Meanwhile, upon determining the crystallite size, different crystallite size values may be obtained due to the difference of calculation method therefor, i.e., due to the difference in the number of background correction points, the number of smoothing points and the separation intensity (separation factor) ratio between Kα1 and Kα2 in a diffraction peak curve prepared by an X-ray diffractometer. Therefore, respective crystallite size values obtained by two different methods, i.e., A and B methods, are described together, if required.

Specifically, in the A method, the crystallite size was calculated using 5 background correction points, 5 smoothing points and a Kα1, Kα2 separation intensity ratio of 0 (no separation), whereas in the B method, the crystallite size was calculated using 27 background correction points, 10 smoothing points and a Kα1, Kα2 separation intensity ratio of 0.5 (Rachinger's method).

The measurement of the crystallite size was performed using "Rigaku PINT X-ray Diffractometer Model RINT 1100K" (manufactured by Rigaku Denki Co., Ltd.).

(6) The specific surface area of the respective particles was expressed by the value measured by BET method using "MONOSORB MS-11" (manufactured by Cantachrom Co., Ltd.).

(7) The saturation magnetization value of the iron particles was measured using a vibration sample magnetometer "VSM-3S-15" (manufactured by Toei Kogyo Co., Ltd.) by applying an external magnetic field of 795.8 kA/m (10 kOe) thereto.

(8) The crystal phase of the respective particles was identified by measuring the particles in the range of 10 to 90° using the above X-ray diffractometer.

(9) The sulfur content (S content) of the respective particles was measured by "Carbon and Sulfur Analyzer EMIA-2200" (manufactured by Horiba Seisakusho Co., Ltd.).

(10) The particle size distribution of the iron particles was measured by a laser scattering diffraction type "NIKKISO MICROTRAC HRA MODEL 9320-X100" (manufactured by Nikkiso Co., Ltd.). Meanwhile, upon the measurement, ethanol was used as a dispersing solvent and organosilane was used as a dispersant, and the particles were dispersed therein using an ultrasonic dispersing apparatus for one minute.

(11) The amounts of elution of elements other than iron contained in the iron particles, including cadmium, lead, chromium (VI), arsenic, whole mercury, selenium, whole cyanogens, fluorine and boron, were measured according to "Environmental. Standard for Contamination of Soil", Notification No. 46 of the Environmental Agency of Japan, 1991, by the following methods.

Cadmium (Elution test according to JIS K0102 55.2)

Whole cyanogens (Elution test according to JIS K0102 38.1 and 38.3)

Lead (Elution test according to JIS K0102 54.2)

Chromium (VI) (Elution test according to JIS K0102 65.2.1)

Arsenic (Elution test according to JIS K0102 61.2)

Whole mercury (Elution test according to Attached Table 1 of Notification No. 59 of the Environmental Agency of Japan, 1971)

Selenium (Elution test according to JIS K0102 67.2)

Fluorine (Elution test according to JIS K0102 34.1)

Boron (Elution test according to JIS K0102 47.3)

(12) <Preparation of Calibration Curve for Soil: Quantitative Determination of Aliphatic Organohalogen Compounds>

The concentration of the aliphatic organohalogen compounds was calculated from the calibration curve previously prepared according to the following procedure.

Trichloroethylene (TCE: $C_2HCl_3$): molecular weight: 131.39; guaranteed reagent (99.5%); density (20° C.): 1.461 to 1.469 g/ml Trichloroethylene was used in three standard amounts (0.05 μl, 0.1 μl and 1.0 μl) in this procedure. 30 ml of ion-exchanged water was added to a 50-ml brown vial bottle (effective capacity: 68 ml) filled with 20 g of sand soil (under sieve of 2 mm mesh), and the bottle was sealed. Next, the respective standard amounts of trichloroethylene were poured into each vial bottle, then the vial bottle was immediately closed with a rubber plug with a fluororesin liner, and an aluminum seal was firmly tightened on the rubber plug. A headspace gas of the vial bottle was sampled using a syringe, and trichloroethylene contained in the sampled gas was measured by "GC-MS-QP5050" (manufactured by Shimadzu Seisakusho Co., Ltd.). Assuming that trichloroethylene was not decomposed at all, the relationship between the amount of trichloroethylene added and the peak area was determined from the measurement values. The above analysis was carried out using a capillary column ("DB-1" manufactured by J & B Scientific Co. Ltd.; liquid phase: dimethyl polysiloxane) and He gas (flow rate: 143 liters/ min) as carrier gas. Specifically, the sample was held at 40° C. for 2 minutes and then heated to 250° C. at a temperature-rising rate of 10° C./min for analyzing the gas.

<Preparation of Samples for Measurement of Aliphatic Organohalogen Compounds>

1.0 μl of trichloroethylene was previously added to 20 g of wetted sand soil (under sieve of 2 mm mesh) to prepare a sample soil contaminated with trichloroethylene. A 50-ml brown vial bottle (effective capacity: 68 ml) was charged with 1 g of purifying iron particles and 30 ml of ion-exchanged water, and then with the above contaminated soil. The vial bottle was immediately closed with a rubber plug with a fluororesin liner, and an aluminum seal was firmly tightened on the rubber plug. The vial bottle was shaken for 3 hours using a paint conditioner (manufactured by Reddevil Co., Ltd.).

<Evaluation Method for Aliphatic Organohalogen Compounds>

50 μl of a headspace gas of the vial bottle was sampled using a syringe, and was analyzed by "GC-MS-QP5050" (manufactured by Shimadzu Seisakusho Co., Ltd.) to measure the amount of residual trichloroethylene contained in the gas.

(13) <Preparation of Calibration Curve for Ground Water: Quantitative Determination of Aliphatic Organohalogen Compounds>

The same procedure as defined in the above <preparation of calibration curve for soil: quantitative determination of aliphatic organohalogen compounds> was conducted except that no sand soil was added, thereby preparing a calibration curve for ground water.

<Preparation of Samples>

The 50-ml brown vial bottle (effective capacity: 68 ml) was charged with 1 g of the purifying iron particles and 30 ml of ion-exchanged water, and then with 1 μl of trichloroethylene. The vial bottle was immediately closed with a rubber plug with a fluororesin liner, and then an aluminum seal was firmly tightened on the rubber plug. The vial bottle was shaken for 3 hours using a paint conditioner (manufactured by Reddevil Co., Ltd.).

<Evaluation Method>

The amount of the residual trichloroethylene was measured by the same method as define in the above <evaluation method for aliphatic organohalogen compounds>.

(14) <Preparation of Calibration Curve for Soil: Quantitative Determination of Aromatic Organohalogen Compounds>

Trichlorobenzene (TCB: $C_6H_3Cl_3$): molecular weight: 181.45; guaranteed reagent (not less than 99.0%); density (20%): 1.461 g/ml Trichlorobenzene was used in three standard amounts (0.05 μl, 0.1 μl and 1.0 μl) in this procedure. 30 ml of ion-exchanged water was added to a 50-ml brown vial bottle (effective capacity: 68 ml) filled with 20 g of sand soil (under sieve of 2 mm mesh), and the bottle was sealed. Next, the respective standard amounts of trichlorobenzene were poured into each vial bottle. The vial bottle was immediately closed with a rubber plug with a fluororesin liner, and then an aluminum seal was firmly tightened on the rubber plug. Next, the vial bottle was shaken for 10 hours using a paint conditioner (manufactured by Reddevil Co., Ltd.). Thereafter, 10 ml of n-hexane was added to the vial bottle, and the contents of the vial bottle were dispersed for 20 minutes by an ultrasonic dispersing apparatus and separated for 5 minutes using a centrifugal separator rotating at 8,000 rpm. 1.0 μl of the upper hexane layer thus separated was sampled using a syringe, and analyzed by "GC-MS-QP5050" (manufactured by Shimadzu Seisakusho Co., Ltd.) to measure the amount of trichlorobenzene contained therein. Assuming that trichlorobenzene was not decomposed at all, the relationship between the amount of trichlorobenzene added and the peak area was determined from the measured values. The above analysis was carried out using a capillary column ("DB-1" manufactured by J & B Scientific Co., Ltd.; liquid phase: dimethyl polysiloxane) and He gas (flow rate: 143 liters/min) as carrier gas. Specifically, the sample was held at 40° C. for 2 minutes and then heated to 250° C. at a temperature-rising rate of 10° C./min for analyzing the gas.

<Preparation of Samples for Measurement of Aromatic Organohalogen Compounds>

1.0 μl of trichlorobenzene was previously added to 20 g of wetted sand soil (under sieve of 2 mm mesh) to prepare a sample soil contaminated with trichlorobenzene. A 50-ml brown vial bottle (effective capacity: 68 ml) was charged with 1 g of purifying iron particles and 30 ml of ion-exchanged water, and then with the above contaminated soil. The vial bottle was immediately closed with a rubber plug with a fluororesin liner, and then an aluminum seal was firmly tightened on the rubber plug. The vial bottle was shaken for 10 hours using a paint conditioner (manufactured by Reddevil Co., Ltd.). Then, 10 ml of n-hexane was added to the vial bottle, and the contents of the vial bottle were dispersed for 20 minutes by an ultrasonic dispersing apparatus and separated for 5 minutes using a centrifugal separator rotating at 8,000 rpm.

<Evaluation Method for Aromatic Organohalogen Compounds>

1.0 μl of the upper n-hexane layer thus separated by the above centrifugal separation procedure was sampled using a syringe, and then analyzed using "GC-MS-QP5050" manufactured by Shimadzu Seisakusho Co., Ltd., to measure the amount of residual trichlorobenzene contained therein.

(15)<Preparation of Calibration Curve for Ground Water: Quantitative Determination of Aromatic Organohalogen Compounds>

The same procedure as defined in the above <preparation of calibration curve for soil: quantitative determination of aromatic organohalogen compounds> was conducted except that no sand soil was added, thereby preparing a calibration curve for ground water.

<Preparation of Samples>

The 50-ml brown vial bottle (effective capacity: 68 ml) was charged with 1 g of the purifying iron particles and 30 ml of ion-exchanged water, and then with 1 μl of trichlorobenzene. The vial bottle was immediately closed with a rubber plug with a fluororesin liner, and an aluminum seal was firmly tightened on the rubber plug. The vial bottle was shaken for 10 hours using a paint conditioner (manufactured by Reddevil Co., Ltd.). Thereafter, 10 ml of n-hexane was added to the vial bottle, and the contents of the vial bottle were dispersed for 20 minutes by an ultrasonic dispersing apparatus, and then separated for 5 minutes using a centrifugal separator rotating at 8,000 rpm.

<Evaluation Method>

The amount of the residual trichlorobenzene was measured by the same method as define in the above <evaluation method for aromatic organohalogen compounds>.

(16) As to the measurements of harmful substances such as heavy metals in the purification treatment, the solid content of the contaminated soil was analyzed according to "Environmental Standard for Contamination of Soil", Notification No. 46 of the Environmental Agency of Japan, and the contaminated-ground water was analyzed according to "Environmental Standard for Contamination of Ground Water", Notification No. 10 of the Environmental Agency of Japan.

Example 1

<Production of Purifying Iron Particles and Purifying Agent>

A reaction vessel maintained in a non-oxidative atmosphere by flowing $N_2$ gas at a rate of 3.4 cm/sec, was charged with 704 liters of a 1.16 mol/l $Na_2CO_3$ aqueous solution, and then with 296 liters of an aqueous ferrous sulfate solution containing 1.35 mol/l of $Fe^{2+}$ (amount of $Na_2CO_3$: 2.0 equivalents based on equivalent of Fe), and these solutions were mixed together at 47° C., thereby producing $FeCO_3$.

The aqueous solution containing the thus obtained $FeCO_3$ was successively held at 47° C. for 70 minutes while blowing $N_2$ gas thereinto at a rate of 3.4 cm/sec. Thereafter, air was passed through the $FeCO_3$-containing aqueous solution at a temperature of 47° C. and a flow rate of 2.8 cm/sec for 5.0 hours, thereby producing goethite particles 1. Meanwhile, it was confirmed that the pH value of the aqueous solution during the air passage was maintained at 8.5 to 9.5.

The water suspension containing the thus obtained goethite particles 1 was washed with water using a filter press, thereby obtaining a press cake. The obtained press cake was extrusion-molded and granulated using a compression-molding machine equipped with a mold plate having an orifice diameter of 4 mm, and then dried at 120, thereby obtaining a granulated product of the goethite particles 1. The granulated product was of a cylindrical shape having an average diameter of 3.3 mm and an average length of 10 mm.

It was confirmed that the goethite particles 1 constituting the granulated product were spindle-shaped particles having an average major axis diameter of 0.30 μm and an aspect ratio (major axis diameter/minor axis diameter) of 12.5:1. Further, it was confirmed that the goethite particles 1 had a uniform particle size and contained no dendritic particles.

100 g of the granulated product of the goethite particles 1 were introduced into a fixed bed type reducing apparatus, and reduced at 450° C. for 180 minutes while passing $H_2$ gas therethrough until the goethite particles 1 were completely transformed into α-Fe. Then, after replacing the $H_2$ gas with $N_2$ gas and cooling the obtained iron particles to room temperature, 300 ml of ion-exchanged water was directly introduced into the reducing furnace, and the contents of the reducing furnace were taken out therefrom in the form of a water suspension containing the iron particles in an amount of 18% by weight (as a purifying agent 1).

Next, the water suspension was filtered to separate the iron particles therefrom, and the iron particles were dried in air at 40° C. for 3 hours, thereby producing purifying iron particles.

Figure 2:
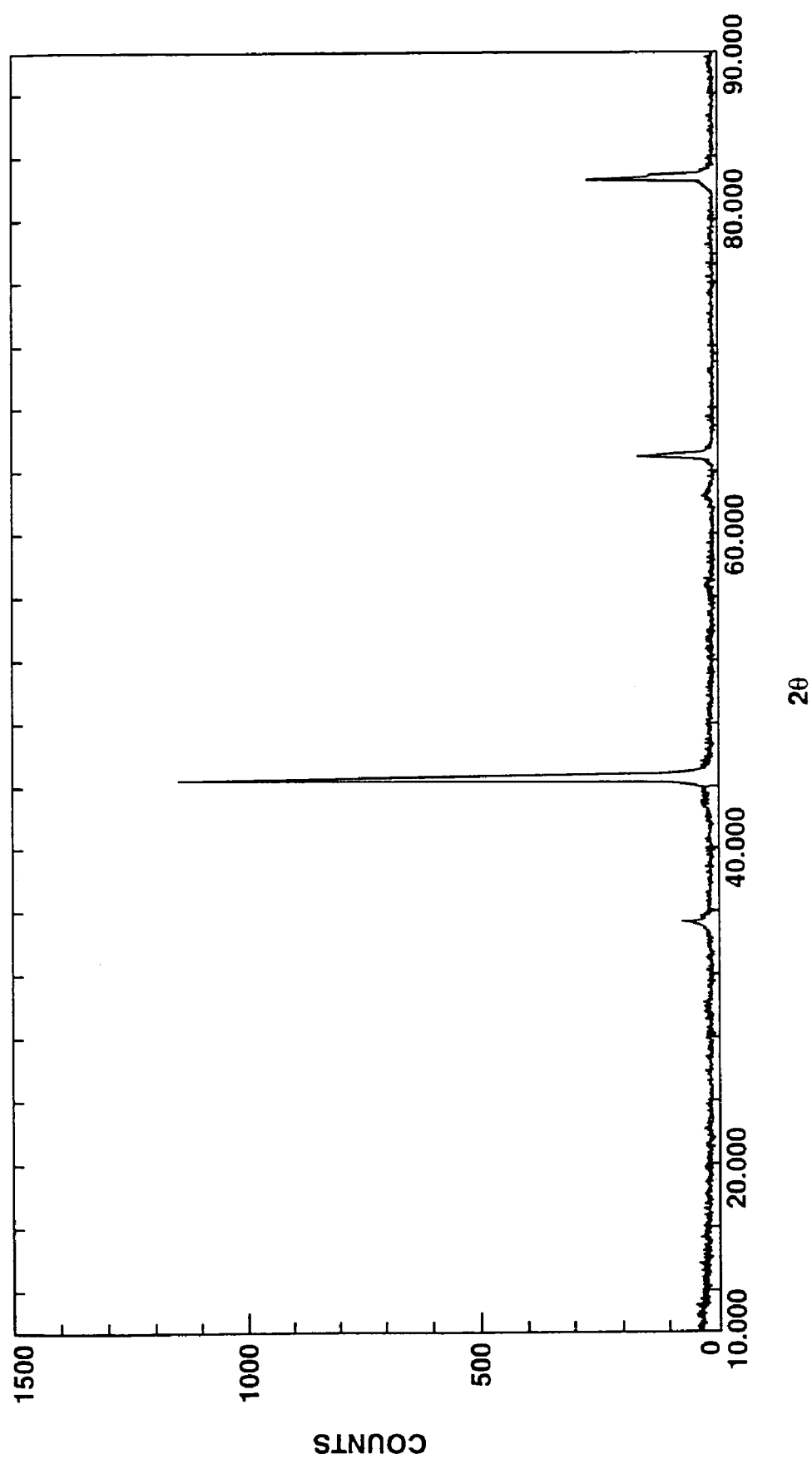
FIG. 2 is an X-ray pattern of the iron particles for purification treatment obtained in Example 1.

As a result of observing by a scanning electron microscope (×30,000), the thus obtained purifying iron particles were granular particles as shown in FIG. 1, and contained small particles having an average particle diameter of 0.1 μm and large particles having an average particle diameter of 1.0 μm. When measured by a laser diffractometer, it was confirmed that the content of the small particles having a particle diameter of 0.05 to 0.50 μm was 35.5% by volume, and the content of the large particles having a particle diameter of 0.50 to 5.0 μm was 62.7% by volume. Further, it was confirmed that the purifying iron particles had a saturation magnetization value of 155 $Am^2/kg$ (155 emu/g), a BET specific surface area of 15 $m^2/g$, a crystallite size of 420 Å (A method) and 309 Å (B method), an Fe content of 88.6% by weight, a carbon content of 0.09% by weight and a sulfur content of 0.15% by weight (1,500 ppm), and none of Cd, Pb, As and Hg were detected therefrom. The X-ray diffraction pattern of the purifying iron particles is shown in FIG. 2. From FIG. 2, it was apparently confirmed that both α-Fe and $Fe_3O_4$ were present in the purifying iron particles. Also, it was confirmed that when measured from the calibration curve, the α-Fe content was 97.9% by weight, and the intensity ratio of $D_{110}$ (α-Fe) to a sum of $D_{311}$ ($Fe_3O_4$) and the $D_{110}$ ($D_{110}/(D_{110}+D_{311})$) was 0.95:1.

<Results of Purification Treatment of Contaminated Soil>

According to the above evaluation method, it was confirmed that when the contaminated soil was treated with the above purifying iron particles, the residual percentage of trichloroethylene was 9%.

<Results of Purification Treatment of Contaminated Ground Water>

According to the above evaluation method, it was confirmed that when the contaminated ground water was treated with the above purifying iron particles, the residual percentage of trichloroethylene was 15%.

<Purification Treatment with Purifying Agent 1>

1 μl of trichloroethylene was previously added to 20 g of wetted sand soil (under sieve of 2 mm mesh) to prepare a sample soil contaminated with trichloroethylene. A 50-ml brown vial bottle (effective capacity: 68 ml) was charged with 5.6 g of the above purifying agent 1 (containing 18% by weight of the iron particles) and 25.4 ml of ion-exchanged water, and then with the above contaminated soil. The vial bottle was immediately closed with a rubber plug with a fluororesin liner, and an aluminum seal was firmly tightened on the rubber plug. The vial bottle was shaken for 3 hours using a paint conditioner (manufactured by Reddevil Co., Ltd.).

<Purification Treatment of Contaminated Soil with Purifying Agent 1>

According to the above evaluation method, it was confirmed that when the contaminated soil was treated with the above purifying agent, the residual percentage of trichloroethylene was 8%.

<Purification Treatment of Contaminated Ground Water with Purifying Agent 1>

According to the above evaluation method, it was confirmed that when the contaminated ground water was treated with the above purifying agent 1, the residual percentage of trichloroethylene was 14%.

<Change of Residual Percentage with Shaking Time>

Figure 3:
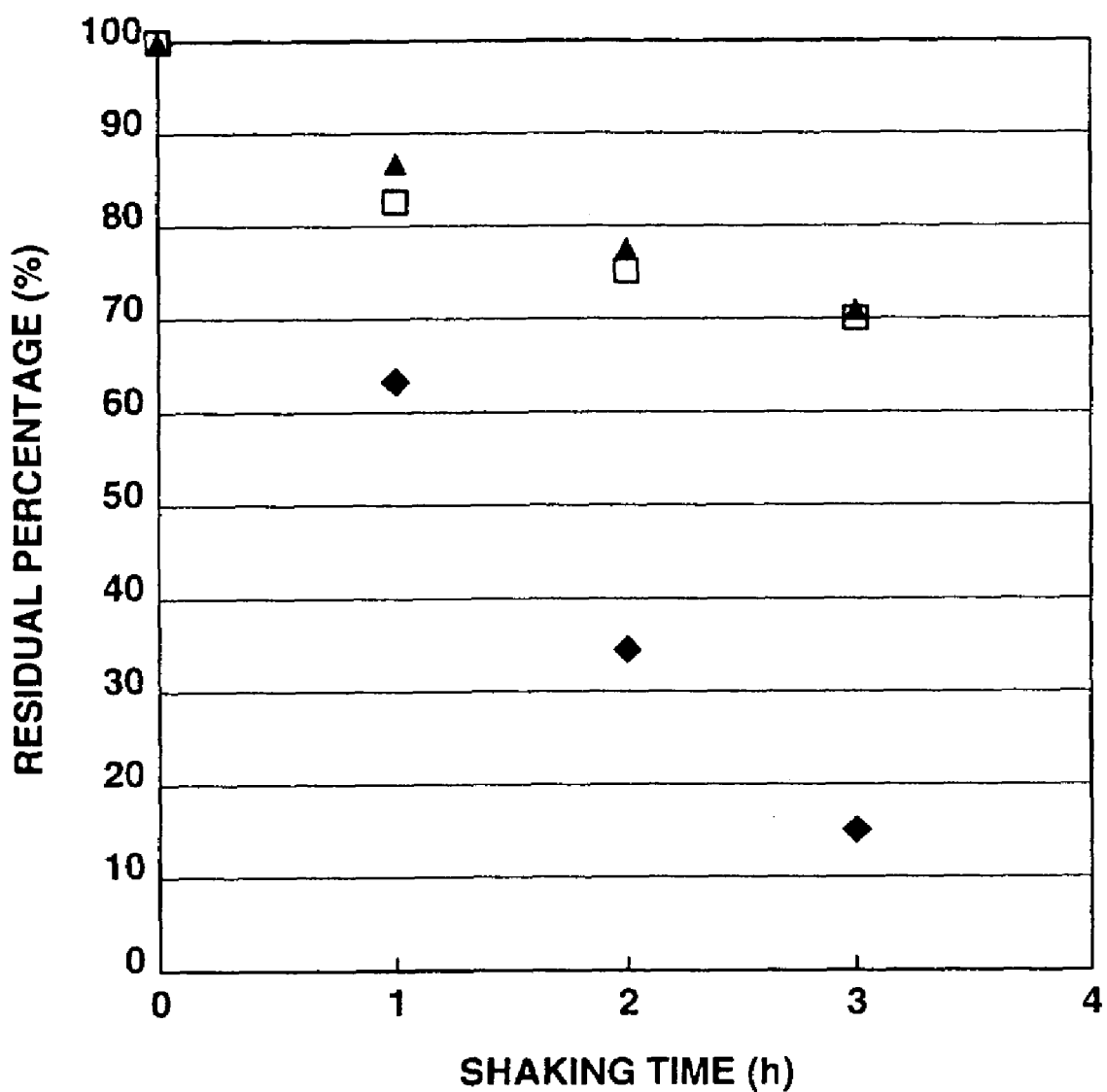
FIG. 3 is a graph showing change in residual percentage of a purifying agent obtained in Example 1 with the passage of a penetrating time thereof.

Next, the same procedure as defined in the above evaluation method was conducted except that the time of shaking by the paint conditioner after addition of the purifying agent 1 was changed to 1, 2 and 3 hours, respectively, thereby purifying the ground water. The results are shown in FIG. 3. As is apparent from FIG. 3, when the purifying agent 1 of the present invention was used, the residual percentage was considerably reduced. Therefore, it was apparently confirmed that the purifying agent 1 of the present invention was excellent in catalytic activity.

<Persistency of Catalytic Activity>

Figure 4:
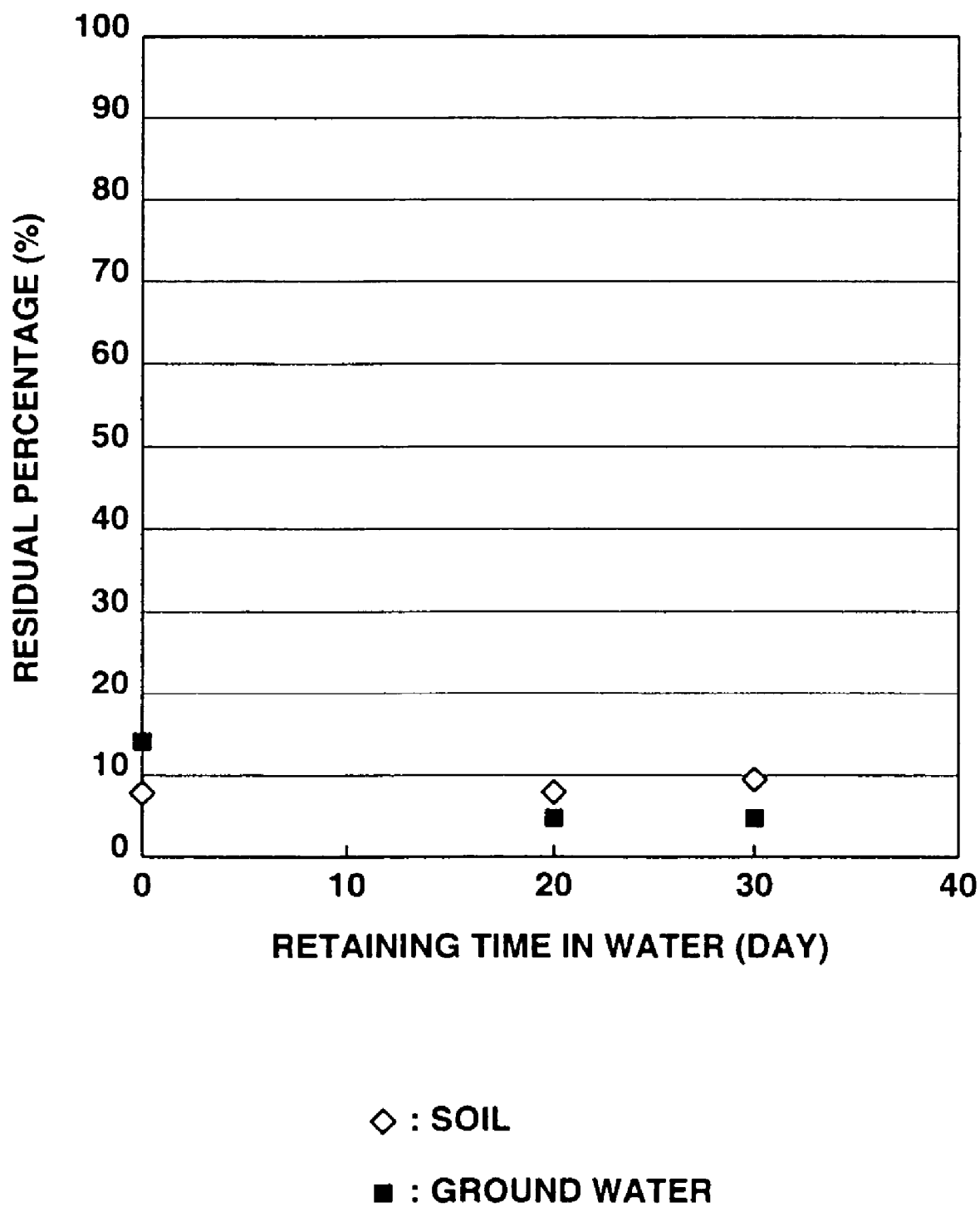
FIG. 4 is a graph showing a persistency of a purifying agent obtained in Example 1.

After the purifying agents were retained in water for 20 days (Example 8) and 30 days (Example 10), respectively, the purification treatment was conducted using each purifying agent by the same evaluation method as defined above. The results are shown in FIG. 4. In any of the cases where the purifying agent was used, the residual percentage was low and the catalytic activity was high. Therefore, it was apparently recognized that the purifying agent of the present invention was capable of maintaining its catalytic activity for a long period of time.

Example 2

<Production of Purifying Iron Particles and Purifying Agent>

A reaction vessel maintained in a non-oxidative atmosphere by flowing $N_2$ gas therethrough at a rate of 3.4 cm/sec, was charged with 704 liters of a 1.16 mol/l $Na_2CO_3$ aqueous solution, and then with 296 liters of an aqueous ferrous sulfate solution containing $Fe^{2+}$ in an amount of 1.35 mol/l (amount of $Na_2CO_3$: 2.0 equivalents based on equivalent of Fe), and these solutions were mixed together at 47° C., thereby producing $FeCO_3$.

The aqueous solution containing the thus obtained $FeCO_3$ was successively held at 47° C. for 70 minutes while blowing $N_2$ gas thereinto at a rate of 3.4 cm/sec. Thereafter, air was passed through the $FeCO_3$-containing aqueous solution at a temperature of 47° C. and a flow rate of 2.8 cm/sec for 5.0 hours, thereby producing goethite particles 4. Meanwhile, it was confirmed that the pH value of the aqueous solution during the air passage was maintained at 8.5 to 9.5.

The water suspension containing the thus obtained goethite particles 4 was washed with water using a filter press to adjust the residual S content thereof to 1,500 ppm, thereby obtaining a press cake. The obtained press cake was extrusion-molded and granulated using a compression-molding machine equipped with a mold plate having an orifice diameter of 4 mm, and then dried at 120° C., thereby obtaining a granulated product of the goethite particles 4. The granulated product was of a cylindrical shape having an average diameter of 3.3 mm and an average length of 10 mm.

It was confirmed that the goethite particles 4 constituting the obtained granulated product were spindle-shaped particles having an average major axis diameter of 0.30 μm an aspect ratio (major axis diameter/minor axis diameter) of 12.5:1 and an S content of 1,500 ppm. Further, it was confirmed that the goethite particles 4 had a uniform particle size, and contained no dendritic particles.

100 g of the granulated product of the goethite particles 4 were introduced into a fixed bed type reducing apparatus, and reduced at 450° C. for 180 minutes while passing $H_2$ gas therethrough until the goethite particles 4 were completely transformed into $\alpha$-Fe. Then, after replacing the $H_2$ gas with $N_2$ gas and cooling the obtained iron particles to room temperature, 300 ml of ion-exchanged water was directly introduced into the reducing furnace, and the contents of the reducing furnace were taken out therefrom in the form of a water suspension containing the iron particles in an amount of 18% by weight (as a purifying agent 2).

Next, the water suspension was filtered to separate the iron particles therefrom, and the iron particles were dried in air at 40° C. for 3 hours, thereby producing purifying iron particles.

As a result of observing by a scanning electron microscope (×30,000), the thus obtained purifying iron particles were granular particles mainly composed of $\alpha$-Fe and had an average particle diameter of 0.10 μm, a saturation magnetization value of 168 $Am^2/kg$ (168 emu/g), a BET specific surface area of 19 $m^2/g$, a crystallite size of 380 Å (A method) and 301 Å (B method), an Fe content of 89.0% by weight, an S content of 2,000 ppm and a carbon content of 0.09% by weight, and none of Cd, Pb, As and Hg were detected therefrom. As a result of X-ray diffraction analysis of the purifying iron particles, it was confirmed that both $\alpha$-Fe and $Fe_3O_4$ were present in the purifying iron particles. Also, it was confirmed that when measured from the calibration curve, the $\alpha$-Fe content was 99.0% by weight, and the intensity ratio of $D_{110}$ ($\alpha$-Fe) to a sum of $D_{311}$ ($Fe_3O_4$) and the $D_{110}$ ($D_{110}/(D_{110}+D_{311})$) was 0.97:1.

<Results of Purification Treatment of Contaminated Soil>

According to the above evaluation method, it was confirmed that when the contaminated soil was treated with the above purifying iron particles, the residual percentage of trichlorobenzene was 20.6%.

<Results of Purification Treatment of Contaminated Ground Water>

According to the above evaluation method, it was confirmed that when the contaminated ground water was treated with the above purifying iron particles, the residual percentage of trichlorobenzene was 21.1%.

<Purification Treatment of Contaminated Soil with Purifying Agent 2>

1 μl of trichlorobenzene was previously added to 20 g of wetted sand soil (under sieve of 2 mm mesh) to prepare a sample soil contaminated with trichlorobenzene. A 50-ml brown vial bottle (effective capacity: 68 ml) was charged with 5.6 g of the above purifying agent 2 (containing 18% by weight of the iron particles) and 25.4 ml of ion-exchanged water, and then with the above contaminated soil. The vial bottle was immediately closed with a rubber plug with a fluororesin liner and then an aluminum seal was firmly tightened on the rubber plug. The vial bottle was shaken for 10 hours using a paint conditioner (manufactured by Reddevil Co., Ltd.). Thereafter, 10 ml of n-hexane was added to the vial bottle, and the contents of the vial bottle were dispersed for 20 minutes by an ultrasonic dispersing apparatus and then separated for 5 minutes using a centrifugal separator rotating at 8,000 rpm.

1.0 μl of the upper hexane layer obtained by the above centrifugal separation was sampled using a syringe, and analyzed by "GC-MS-QP5050" (manufactured by Shimadzu Seisakusho Co., Ltd.) to measure the amount of residual trichlorobenzene contained therein. As a result, it was confirmed that when treated with the above purifying agent 2, the residual percentage of trichlorobenzene was 19.5%.

<Purification Treatment of Contaminated Ground Water with Purifying Agent 2>

A 50-ml brown vial bottle (effective capacity: 68 ml) was charged with 5.6 g of the above purifying agent 2 (containing 18% by weight of the iron particles) and 25.4 ml of ion-exchanged water, and then with 1 μl of trichlorobenzene. The vial bottle was immediately closed with a rubber plug with a fluororesin liner, and then an aluminum seal was firmly tightened on the rubber plug. Subsequently, the vial bottle was shaken for 10 hours to disperse the contents thereof by the same method as defined in <purification treatment of contaminated soil with purifying agent 2> for measuring the amount of residual trichlorobenzene. As a result, it was confirmed that when the contaminated ground water was treated with the above purifying agent 2, the residual percentage of trichlorobenzene was 20.2%.

<Persistency of Catalytic Activity>

After the purifying agents were retained in water for 20 days (Example 37) and 30 days (Example 38), respectively, the purification treatment was conducted using each purifying agent by the same evaluation method as defined above. In any of the cases where the purifying agent was used, the residual percentage was low and the catalytic activity was high. Therefore, it was apparently recognized that the purifying agent of the present invention was capable of maintaining its catalytic activity for a long period of time.

Example 3

<Production of Purifying Iron Particles and Purifying Agent>

A reaction vessel maintained in a non-oxidative atmosphere by flowing $N_2$ gas therethrough at a rate of 3.4 cm/sec, was charged with 704 liters of a 1.16 mol/l $Na_2CO_3$ aqueous solution, and then with 296 liters of an aqueous ferrous sulfate solution containing $Fe^{2+}$ in an amount of 1.35 mol/l (amount of $Na_2CO_3$: 2.0 equivalents based on equivalent of Fe), and these solutions were mixed together at 47° C., thereby producing $FeCO_3$.

The aqueous solution containing the thus obtained $FeCO_3$ was successively held at 47° C. for 70 minutes while blowing $N_2$ gas thereinto at a rate of 3.4 cm/sec. Thereafter, air was passed through the $FeCO_3$-containing aqueous solution at a temperature of 47° C. and a flow rate of 2.8 cm/sec for 5.0 hours, thereby producing goethite particles 5. Meanwhile, it was confirmed that the pH value of the aqueous solution during the air passage was maintained at 8.5 to 9.5.

The water suspension containing the thus obtained goethite particles 5 was washed with water using a filter press, thereby obtaining a press cake. The obtained press cake was extrusion-molded and granulated using a compression-molding machine equipped with a mold plate having an orifice-diameter of 4 mm, and then dried at 120° C., thereby obtaining a granulated product of the goethite particles 5.

It was confirmed that the goethite particles 5 constituting the obtained granulated product were spindle-shaped particles having an average major axis diameter of 0.30 μm, an aspect ratio (major axis diameter/minor axis diameter) of 12.5:1, a BET specific surface area of 85 m²/g and an S content of 400 ppm.

The granulated product was heated to 330° C. to transform the goethite particles into hematite particles, and the thus obtained hematite particles were dry-pulverized. Thereafter, the hematite particles were deaggregated in water, and a 70% sulfuric acid solution was added thereto in an amount of 10 ml/kg. The resultant mixture was stirred and then dehydrated to obtain a press cake. The obtained press cake was extrusion-molded and granulated using a compression-molding machine equipped with a mold plate having an orifice diameter of 3 mm, and then dried at 120, thereby obtaining a granulated product of the hematite particles.

It was confirmed that the hematite particles constituting the obtained granulated product were spindle-shaped particles having an average major axis diameter of 0.25 μm, an aspect ratio (major axis diameter/minor axis diameter) of 10.5:1 and an S content of 3,300 ppm.

100 g of the granulated product of the hematite particles were introduced into a fixed bed type reducing apparatus, and reduced at 450° C. for 180 minutes while passing $H_2$ gas therethrough until the hematite particles were completely transformed into α-Fe. Then, after replacing the $H_2$ gas with $N_2$ gas and cooling the obtained iron particles to room temperature, 300 ml of ion-exchanged water was directly introduced into the reducing furnace, and the contents of the reducing furnace were taken out therefrom in the form of a water suspension containing the iron particles in an amount of 18% by weight (as a purifying agent 3).

Next, the water suspension was filtered to separate the iron particles therefrom, and the iron particles were dried in air at 40° C. for 3 hours, thereby producing purifying iron particles.

As a result of observing by a scanning electron microscope (×30,000), the thus obtained purifying iron particles were granular particles mainly composed of α-Fe and had an average particle diameter of 0.10 μm, a saturation magnetization value of 155 Am²/kg (155 emu/g), a BET specific surface area of 25 m²/g, a crystallite size of 297 Å (B method), an Fe content of 85.6% by weight, an S content of 4,000 ppm and a carbon content of 0.09% by weight, and none of Cd, Pb, As and Hg were detected therefrom. As a result of X-ray diffraction analysis of the purifying iron particles, it was confirmed that both α-Fe and $Fe_3O_4$ were present in the purifying iron particles. Also, it was confirmed that the α-Fe content of the purifying iron particles was 97.4% by weight, and the ratio of $D_{110}$ (α-Fe) to a sum of $D_{311}$ ($Fe_3O_4$) and the $D_{110}$ ($D_{110}/(D_{110}+D_{110})$) thereof was 0.94:1, when both measured from the calibration curve.

<Results of Purification Treatment of Soil and Ground Water Contaminated with Aliphatic Organohalogen Compounds>

According to the above evaluation method, it was confirmed that when the soil and ground water were treated with the above purifying iron particles, the residual percentage of trichloroethylene in the soil was 0.7%, and the residual percentage of trichloroethylene in the ground water was 0.9%.

<Results of Purification Treatment of Soil and Ground Water Contaminated with Aromatic Organohalogen Compounds>

According to the above evaluation method, it was confirmed that when the soil and ground water were treated with the above purifying iron particles, the residual percentage of trichlorobenzene in the soil was 15.3%, and the residual percentage of trichlorobenzene in the ground water was 16.9%.

<Purification Treatment of Soil Contaminated with Aliphatic Organohalogen Compounds, with Purifying Agent 3>

1 μl of trichloroethylene was previously added to 20 g of wetted sand soil (under sieve of 2 mm mesh) to prepare a sample soil contaminated with trichloroethylene. A 50-ml brown vial bottle (effective capacity: 68 ml) was charged with 5.6 g of the above purifying agent 3 (containing 18% by weight of the iron particles) and 25.4 ml of ion-exchanged water, and then with the above contaminated soil. The vial bottle was immediately closed with a rubber plug with a fluororesin liner, and then an aluminum seal was firmly tightened on the rubber plug. The vial bottle was shaken for 3 hours using a paint conditioner (manufactured by Reddevil Co., Ltd.).

<Evaluation Method>

According to the above <evaluation method for aliphatic organohalogen compounds>, it was confirmed that when the contaminated soil was treated with the above purifying agent 3, the residual percentage of trichloroethylene was 0.8%.

<Purification Treatment of Ground Water Contaminated with Aliphatic Organohalogen Compounds, with Purifying Agent 3>

The 50-ml brown vial bottle (effective capacity: 68 ml) was charged with 5.6 g of the above purifying agent 3 (containing 18% by weight of the iron particles) and 25.4 ml of ion-exchanged water, and then with 1 μl of trichloroethylene. The vial bottle was immediately closed with a rubber plug with a fluororesin liner, and then an aluminum seal was firmly tightened on the rubber plug. The vial bottle was shaken for 3 hours using a paint conditioner (manufactured by Reddevil Co., Ltd.).

<Evaluation Method>

According to the above <evaluation method for aliphatic organohalogen compounds>, it was confirmed that when the contaminated ground water was treated with the above purifying agent 3, the residual percentage of trichloroethylene was 1.0%.

<Purification Treatment of Soil Contaminated with Aromatic Organohalogen Compounds, with Purifying Agent 3>

1 μl of trichlorobenzene was previously added to 20 g of wetted sand soil (under sieve of 2 mm mesh) to prepare a sample soil contaminated with trichlorobenzene. A 50-ml brown vial bottle (effective capacity: 68 ml) was charged with 5.6 g of the above purifying agent 3 (containing 18% by weight of the iron particles) and 25.4 ml of ion-exchanged water, and then with the above contaminated soil. The vial bottle was immediately closed with a rubber plug with a fluororesin liner, and then an aluminum seal was firmly tightened on the rubber plug. The vial bottle was shaken for 10 hours using a paint conditioner (manufactured by Reddevil Co., Ltd.). Then, 10 ml of n-hexane was added to the vial bottle, and the contents of the vial bottle were dispersed for 20 minutes by an ultrasonic dispersing apparatus and then separated for 5 minutes using a centrifugal separator rotating at 8,000 rpm.

1.0 μl of the upper n-hexane layer obtained by the above centrifugal separation was sampled using a syringe, and analyzed by "GC-MS-QP5050" (manufactured by Shimadzu Seisakusho Co., Ltd.) to measure the amount of residual trichlorobenzene contained therein. As a result, it was confirmed that when the contaminated soil was treated with the purifying agent, the residual percentage of trichlorobenzene was 15.0%.

<Purification Treatment of Ground Water Contaminated with Aromatic Organohalogen Compounds, with Purifying Agent 3>

The 50-ml brown vial bottle (effective capacity: 68 ml) was charged with 5.6 g of the purifying agent 3 (containing 18% by weight of the iron particles) and 25.4 ml of ion-exchanged water, and then with 1 μl of trichlorobenzene. The vial bottle was immediately closed with a rubber plug with a fluororesin liner, and then an aluminum seal was firmly tightened on the rubber plug. The vial bottle was shaken for 10 hours using a paint conditioner (manufactured by Reddevil Co., Ltd.). Thereafter, 10 ml of n-hexane was added to the vial bottle, and the contents of the vial bottle were dispersed for 20 minutes by an ultrasonic dispersing apparatus and then separated for 5 minutes using a centrifugal separator rotating at 8,000 rpm. According to the above <evaluation method for aromatic organohalogen compounds>, it was confirmed that the residual percentage of trichlorobenzene was 16.7%.

Example 4

<Production of Purifying Agent>

A reaction vessel maintained in a non-oxidative atmosphere by flowing $N_2$ gas therethrough at a rate of 3.4 cm/sec, was charged with 704 liters of a 1.16 mol/l $Na_2CO_3$ aqueous solution, and then with 296 liters of an aqueous ferrous sulfate solution containing $Fe^{2+}$ in an amount of 1.35 mol/l (amount of $Na_2CO_3$: 2.0 equivalents based on equivalent of Fe), and these solutions were mixed together at 47° C., thereby producing $FeCO_3$.

The aqueous solution containing the thus obtained $FeCO_3$ was successively held at 47° C. for 70 minutes while blowing $N_2$ gas thereinto at a rate of 3.4 cm/sec. Thereafter, air was passed through the $FeCO_3$-containing aqueous solution at a temperature of 47° C. and a flow rate of 2.8 cm/sec for 5.0 hours, thereby producing goethite particles 7. Meanwhile, it was confirmed that the pH value of the aqueous solution during the air passage was maintained at 8.5 to 9.5.

The water suspension containing the thus obtained goethite particles 7 was washed with water using a filter press while controlling the washing degree so as to allow a trace amount of S to remain therein, thereby obtaining a press cake. The obtained press cake was extrusion-molded and granulated using a compression-molding machine equipped with a mold plate having an orifice diameter of 4 mm, and then dried at 120, thereby obtaining a granulated product of the goethite particles 7.

It was confirmed that the goethite particles 7 constituting the obtained granulated product were spindle-shaped particles having an average major axis diameter of 0.30 μm, an aspect ratio (major axis diameter/minor axis diameter) of 12.5:1, a BET specific surface area of 85 $m^2/g$ and an S content of 900 ppm. Further, it was confirmed that the goethite particles 7 had a uniform particle size and contained no dendritic particles.

The granulated product was heated to 330° C. to transform the goethite particles into hematite particles, and the thus obtained hematite particles were dry-pulverized. Thereafter, the hematite particles were deaggregated in water, and a 70% sulfuric acid solution was added thereto in an amount of 4 ml/kg. The resultant mixture was stirred and then dehydrated to obtain a press cake. The obtained press cake was extrusion-molded and granulated using a compression-molding machine equipped with a mold plate having an orifice diameter of 3 mm, and then dried at 120° C., thereby obtaining a granulated product of the hematite particles.

It was confirmed that the hematite particles constituting the obtained granulated product were spindle-shaped particles having an average major axis diameter of 0.25 μm, an aspect ratio (major axis diameter/minor axis diameter) of 10.5:1 and an S content of 2,100 ppm. Further, it was confirmed that the hematite particles had a uniform particle size and contained no dendritic particles.

100 g of the granulated product of the hematite particles was introduced into a fixed bed type reducing apparatus, and reduced at 450° C. for 180 minutes while passing $H_2$ gas therethrough until the hematite particles were completely transformed into α-Fe. Then, after replacing the $H_2$ gas with $N_2$ gas and cooling the obtained iron particles to room temperature, 160 ml of ion-exchanged water was directly introduced into the reducing furnace, and the contents of the reducing furnace were taken out therefrom in the form of a water suspension containing the iron particles in an amount of 30% by weight.

Next, the water suspension was transferred into a stainless steel beaker with a baffle, and stirred for 30 minutes at 3,600 rpm using a medium-speed rotating type stirrer "0.2 kW-power T. K. Homodisper 2.5 Model" (equipped with edged turbine blades having a diameter of 40 mmφ; manufactured by Tokushu Kika Kogyo Co., Ltd.) inserted into the beaker.

Then, the water suspension was dispersed at 4,000 rpm using a continuous shear-type dispersing apparatus "0.55 kW-power T. K. Homomic Line Mill". ("PL-SL Model" manufactured by Tokushu Kika Kogyo Co., Ltd.).

Thereafter, the water suspension was further dispersed at 500 rpm using a media type dispersing apparatus "1.5 kW-power Four Cylinder Sand Grinder 4TSG-(1/8G) Model" (manufactured by Imex Co., Ltd.) filled with 0.25 liter of 2 mmφ glass beads, thereby producing a purifying agent.

Figure 11:
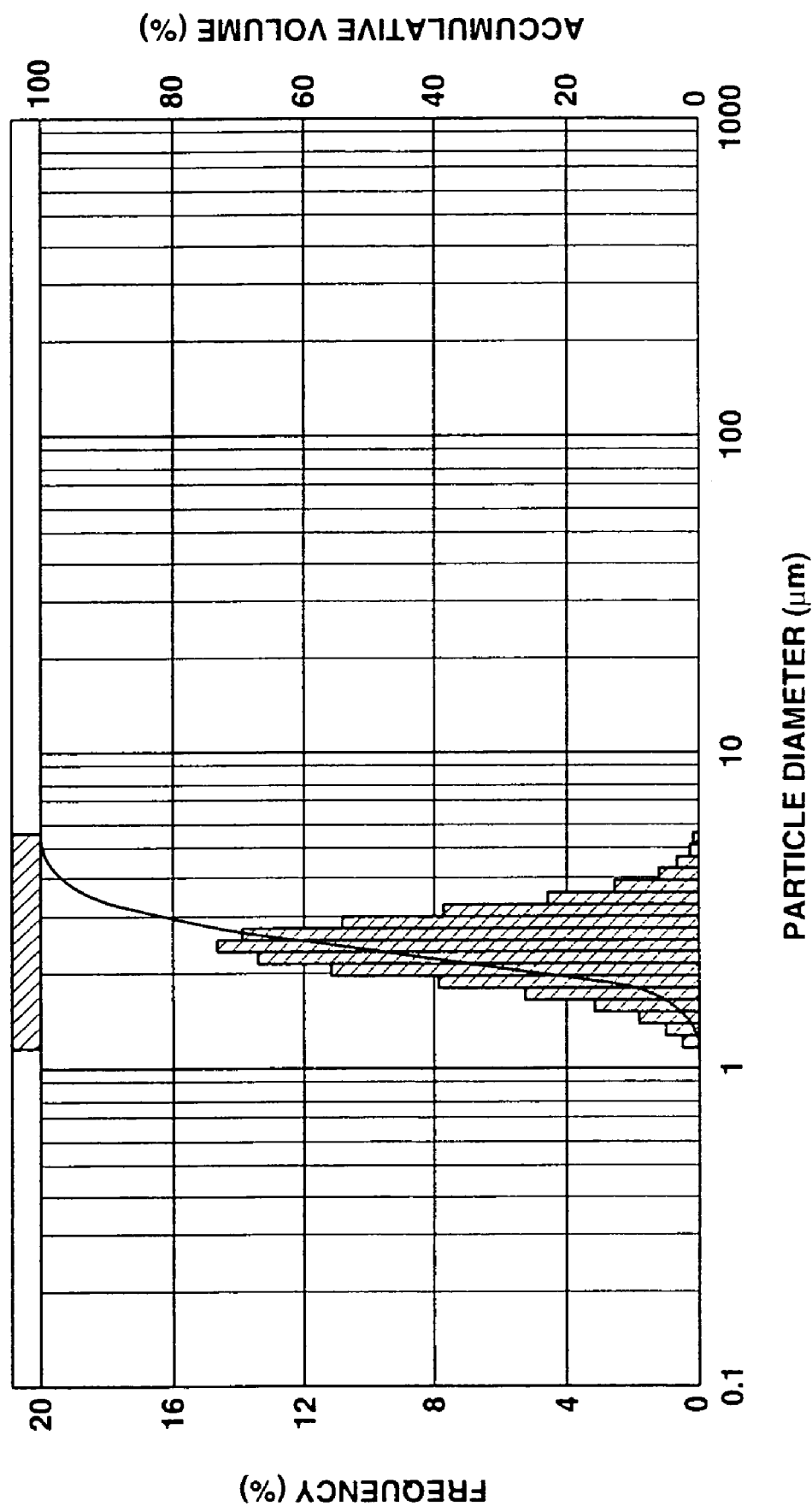
FIG. 11 is a graph showing a particle size distribution of iron particles contained in a purifying agent obtained in Example 4.

The thus obtained purifying agent had a specific gravity of 1.25 and a solid content of 30% by weight. In addition, as shown in FIG. 11, the purifying agent (water suspension) exhibited a particle size distribution with a single peak, a median diameter ($D_{50}$) of 2.40 μm, a ratio of $D_{90}$ to $D_{10}$ of 1.86:1, and a distribution width ($D_{84}$–$D_{16}$) of 1.15 μm, as measured by laser diffraction scattering method.

Figure 12:
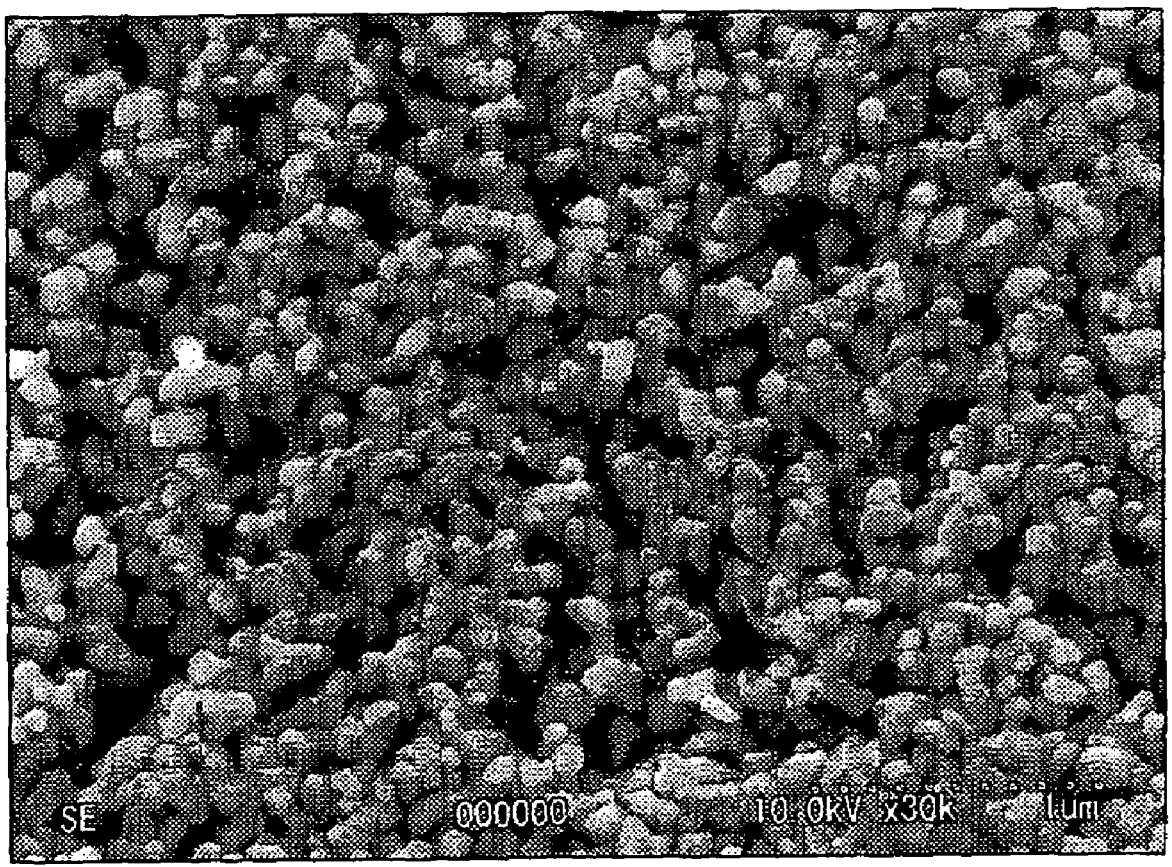
FIG. 12 is a scanning electron micrograph (×30,000) of the iron particles contained in the purifying agent obtained in Example 4.

As a result of observing by a scanning electron microscope (×30,000), as shown in FIG. 12, primary particles of the iron particles contained in the obtained purifying agent were rice grain-shaped particles, and had an average particle diameter of 0.13 μm and an aspect ratio of 1.6:1.

The thus obtained iron particles were mainly composed of α-Fe, and had a saturation magnetization value of 157

Am²/kg (157 emu/g), a BET specific surface area of 26 m²/g, a crystallite size of 298 Å (B method), an Fe content of 86.2% by weight and an S content of 2,900 ppm, and none of Cd, Pb, As and Hg were detected therefrom. As a result of X-ray diffraction analysis of the iron particles, it was confirmed that both α-Fe and $Fe_3O_4$ were present in the iron particles. Also, it was confirmed that the α-Fe content of the iron particles was 97.9% by weight, and the intensity ratio of $D_{110}$ (α-Fe) to a sum of $D_{311}$ ($Fe_3O_4$) and the $D_{110}$ ($D_{110}/(D_{110}+D_{110})$) thereof was 0.95:1, as both measured from the calibration curve.

<Results of Purification Treatment of Soil and Ground Water Contaminated with Aliphatic Organohalogen Compounds>

According to the above evaluation method, it was confirmed that when the soil and ground water were treated with the above purifying agent, the residual percentage of trichloroethylene in the soil was 3.3%, and the residual percentage of trichloroethylene in the ground water was 4.0%.

<Results of Purification Treatment of Soil and Ground Water Contaminated with Aromatic Organohalogen Compounds>

According to the above evaluation method, it was confirmed that when the soil and ground water were treated with the above purifying agent, the residual percentage of trichlorobenzene in the soil was 17.4%, and the residual percentage of trichlorobenzene in the ground water was 18.7%.

Example 5

<Production of Aqueous Ferrous Salt Solution>

Steel pieces such as chopped, shredded or trimmed pieces produced upon shear-cutting an acid-washed steel plate obtained by acid-washing a hot-rolled steel plate for removing scales from the surface thereof (which was not coated with rust-preventive oils), were dissolved in sulfuric acid, thereby obtaining an aqueous ferrous sulfate solution.

Then, an aqueous NaOH solution was added to the aqueous ferrous sulfate solution to adjust the pH value thereof to 5.0, thereby precipitating heavy metal impurities contained in the steel plate in the form of hydroxides thereof. The aqueous ferrous sulfate solution containing the precipitated hydroxides was filtered by an ultrafiltration device to separate and remove the hydroxides of heavy metal impurities therefrom, thereby a high-purity aqueous ferrous sulfate solution.

<Production of Purifying Agent>

A reaction vessel maintained in a non-oxidative atmosphere by flowing $N_2$ gas therethrough at a rate of 3.4 cm/sec, was charged with 704 liters of a 1.16 mol/l $Na_2CO_3$ aqueous solution, and then with 296 liters of the above aqueous ferrous sulfate solution containing $Fe^{2+}$ in an amount of 1.35 mol/l (amount of $Na_2CO_3$: 2.0 equivalents based on equivalent of Fe), and these solutions were mixed together at 47° C., thereby producing $FeCO_3$.

The aqueous solution containing the thus obtained $FeCO_3$ was successively held at 47° C. for 70 minutes while blowing $N_2$ gas thereinto at a rate of 3.4 cm/sec. Thereafter, air was passed through the $FeCO_3$-containing aqueous solution at a temperature of 47° C. and a flow rate of 2.8 cm/sec for 5.0 hours, thereby producing goethite particles 7. Meanwhile, it was confirmed that the pH value of the aqueous solution during the air passage was maintained at 8.5 to 9.5.

The water suspension containing the thus obtained goethite particles 7 was washed with water using a filter press while controlling the washing degree so as to allow a trace amount of S to remain therein, thereby obtaining a press cake. The obtained press cake was extrusion-molded and granulated using a compression-molding machine equipped with a mold plate having an orifice diameter of 4 mm, and then dried at 120° C., thereby obtaining a granulated product of the goethite particles 7.

It was confirmed that the goethite particles 7 constituting the obtained granulated product were spindle-shaped particles having an average major axis diameter of 0.30 μm, an aspect ratio (major axis diameter/minor axis diameter) of 12.5:1, a BET specific surface area of 85 m²/g and an S content of 900 ppm. Also, it was confirmed that the goethite particles 7 had a uniform particle size and contained no dendritic particles.

The granulated product was heated to 330° C. to transform the goethite particles into hematite particles, and the thus obtained hematite particles were dry-pulverized. Thereafter, the hematite particles were deaggregated in water, and a 70% sulfuric acid solution was added thereto in an amount of 4 ml/kg. The resultant mixture was stirred and then dehydrated to obtain a press cake. The obtained press cake was extrusion-molded and granulated using a compression-molding machine equipped with a mold plate having an orifice diameter of 3 mm, and then dried at 120, thereby obtaining a granulated product of the hematite particles.

It was confirmed that the hematite particles constituting the obtained granulated product were spindle-shaped particles having an average major axis diameter of 0.25 μm, an aspect ratio (major axis diameter/minor axis diameter) of 10.5:1 and an S content of 2,100 ppm. Also, it was confirmed that the hematite particles had a uniform particle size and contained no dendritic particles.

100 g of the granulated product of the hematite particles were introduced into a fixed bed type reducing apparatus, and reduced at 450° C. for 180 minutes while passing $H_2$ gas therethrough until the hematite particles were completely transformed into α-Fe. Then, after replacing the $H_2$ gas with $N_2$ gas and cooling the obtained iron particles to room temperature, 160 ml of ion-exchanged water was directly introduced into the reducing furnace, and the contents of the reducing furnace were taken out therefrom in the form of a water suspension containing the iron particles in an amount of 30% by weight (as a purifying agent 5).

Next, the water suspension was filtered to separate the iron particles therefrom, and the iron particles were dried in air at 40° C. for 3 hours, thereby producing purifying iron particles.

As a result of observing by a scanning electron microscope (×30,000), primary particles of the iron particles contained in the purifying agent 5 were rice grain-shaped particles having an average major axis diameter of 0.13 μm.

The thus obtained iron particles were mainly composed of α-Fe, and had a saturation magnetization value of 156 Am²/kg (156 emu/g), a BET specific surface area of 25 m²/g, a crystallite size of 297 Å (B method), an Fe content of 86.1% by weight and an S content of 2,900 ppm. As a result of X-ray diffraction analysis of the iron particles, it was confirmed that both α-Fe and $Fe_3O_4$ were present in the iron particles. Also, it was confirmed that the α-Fe content of the iron particles was 97.9% by weight, and the intensity ratio of $D_{110}$ (α-Fe) to a sum of $D_{311}$ ($Fe_3O_4$) and the $D_{110}$ ($D_{110}/(D_{110}+D_{110})$) thereof was 0.95:1, as both measured from the calibration curve.

<Results of Elution Test of Purifying Iron Particles>

According to the above evaluation method, from the results of elution test of the above iron particles, it was confirmed that the iron particles exhibited a cadmium elution of less than 0.001 mg/liter, no detected elution of whole cyanogens, a lead elution of less than 0.001 mg/liter, a chromium (VI) elution of less than 0.01 mg/liter, an arsenic elution of less than 0.001 mg/liter, a whole mercury elution of less than 0.0005 mg/liter, a selenium elution of less than 0.001 mg/liter, a fluorine elution of less than 0.5 mg/liter, and a boron elution of less than 0.1 mg/liter. Therefore, it was confirmed that all the amounts of these elements eluted were below the detection limit of the measuring device used, and lower than the standard values prescribed in the above Environmental Standard.

<Results of Purification Treatment of Soil and Ground Water Contaminated with Aliphatic Organohalogen Compounds>

According to the above evaluation method, it was confirmed that when the soil and ground water were treated with the above iron particles, the residual percentage of trichloroethylene in the soil was 3.8%, and the residual percentage of trichloroethylene in the ground water was 5.0%.

<Results of Purification Treatment of Soil and Ground Water Contaminated with Aromatic Organohalogen Compounds>

According to the above evaluation method, it was confirmed that when the soil and ground water were treated with the above iron particles, the residual percentage of trichlorobenzene in the soil was 18.7%, and the residual percentage of trichlorobenzene in the ground water was 19.5%.

<Purification Treatment of Soil Contaminated with Aliphatic Organohalogen Compounds, with Purifying Agent 5>

1.0 µl of trichloroethylene was previously added to 20 g of wetted sand soil (under sieve of 2 mm mesh) to prepare a sample soil contaminated with trichloroethylene. A 50-ml brown vial bottle (effective capacity: 68 ml) was charged with the purifying agent 5 containing 1 g of the above iron particles as well as ion-exchanged water in such an amount that the total amount of the ion-exchanged water and water contained in the purifying agent 5 was 30 ml, and then with the above contaminated soil. The vial bottle was immediately closed with a rubber plug with a fluororesin liner, and then an aluminum seal was firmly tightened on the rubber plug. The vial bottle was shaken for 3 hours using a paint conditioner (manufactured by Reddevil Co., Ltd.).

According to the above <evaluation method for aliphatic organohalogen compounds>, it was confirmed that when the contaminated soil was treated with the above purifying agent 5, the residual percentage of trichloroethylene was 3.7%.

<Purification Treatment of Ground Water Contaminated with Aliphatic Organohalogen Compounds, with Purifying Agent 5>

The 50-ml brown vial bottle (effective capacity: 68 ml) was charged with the purifying agent 5 containing 1 g of the above iron particles as well as ion-exchanged water in such an amount that the total amount of the ion-exchanged water and water contained in the purifying agent 5 was 30.0 ml, and then with 1 µl of trichloroethylene. The vial bottle was immediately closed with a rubber plug with a fluororesin liner, and then an aluminum seal was firmly tightened on the rubber plug. The vial bottle was shaken for 3 hours using a paint conditioner (manufactured by Reddevil Co., Ltd.).

According to the above <evaluation method for aliphatic organohalogen compounds>, it was confirmed that when the contaminated ground water was treated with the above purifying agent 5, the residual percentage of trichloroethylene was 4.8%.

<Purification Treatment of Soil Contaminated with Aromatic Organohalogen Compounds, with Purifying Agent 5>

1.0 µl of trichlorobenzene was previously added to 20 g of wetted sand soil (under sieve of 2 mm mesh) to prepare a sample soil contaminated with trichlorobenzene. A 50-ml brown vial bottle (effective capacity: 68 ml) was charged with the purifying agent 5 containing 1 g of the above iron particles as well as ion-exchanged water in such an amount that the total amount of the ion-exchanged water and water contained in the purifying agent 5 was 30.0 ml, and then with the above contaminated soil. The vial bottle was immediately closed with a rubber plug with a fluororesin liner, and then an aluminum seal was firmly tightened on the rubber plug. The vial bottle was shaken for 10 hours using a paint conditioner (manufactured by Reddevil Co., Ltd.). Thereafter, 10 ml of n-hexane was added to the vial bottle, and the contents of the vial bottle were dispersed for 20 minutes by an ultrasonic dispersing apparatus and then separated for 5 minutes using a centrifugal separator rotating at 8,000 rpm.

1.0 µl of the thus separated upper n-hexane layer obtained by the above centrifugal separation was sampled using a syringe, and analyzed by "GC-MS-QP5050" (manufactured by Shimadzu Seisakusho Co., Ltd.) to measure the amount of residual trichlorobenzene contained therein. As a result, it was confirmed that when the contaminated soil was treated with the purifying agent, the residual percentage of trichlorobenzene was 17.9%.

<Purification Treatment of Ground Water Contaminated with Aromatic Organohalogen Compounds, with Purifying Agent 5>

A 50-ml brown vial bottle (effective capacity: 68 ml) was charged with the purifying agent 5 containing 1 g of the above iron particles as well as ion-exchanged water in such an amount that the total amount of the ion-exchanged water and water contained in the purifying agent 5 was 30.0 ml, and then charged with 1 µl of trichlorobenzene. The vial bottle was immediately closed with a rubber plug with a fluororesin liner, and then an aluminum seal was firmly tightened on the rubber plug. The vial bottle was shaken for 10 hours using a paint conditioner (manufactured by Reddevil Co., Ltd.). Thereafter, 10 ml of n-hexane was added to the vial bottle, and the contents of the vial bottle were dispersed for 20 minutes by an ultrasonic dispersing apparatus and then separated for 5 minutes using a centrifugal separator rotating at 8,000 rpm.

According to the above <evaluation method for aromatic organohalogen compounds>, it was confirmed that the residual percentage of trichlorobenzene was 18.9%.

Example 6

<Production of Purifying Iron Particles and Purifying Agent>

A reaction vessel maintained in a non-oxidative atmosphere by flowing $N_2$ gas therethrough at a rate of 3.4 cm/sec, was charged with 704 liters of a 1.16 mol/l $Na_2CO_3$ aqueous solution, and then with 296 liters of an aqueous ferrous sulfate solution containing $Fe^{2+}$ in an amount of 1.35 mol/l (amount of $Na_2CO_3$: 2.0 equivalents based on equivalent of Fe), and these solutions were mixed together at 47° C., thereby producing $FeCO_3$.

The aqueous solution containing the thus produced $FeCO_3$ was successively held at 47° C. for 70 minutes while blowing $N_2$ gas thereinto at a rate of 3.4 cm/sec. Thereafter, air was passed through the $FeCO_3$-containing aqueous solution at a temperature of 47° C. and a flow rate of 2.8 cm/sec for 5.0 hours, thereby producing goethite particles 5.

Meanwhile, it was confirmed that the pH value of the aqueous solution during the air passage was maintained at 8.5 to 9.5.

The water suspension containing the thus obtained goethite particles 5 was washed with water using a filter press, thereby obtaining a press cake. The obtained press cake was extrusion-molded and granulated using a compression-molding machine equipped with a mold plate having an orifice diameter of 4 mm, and then dried at 120° C., thereby obtaining a granulated product of the goethite particles 5.

It was confirmed that the goethite particles 5 constituting the obtained granulated product were spindle-shaped particles having an average major axis diameter of 0.30 μm, an aspect ratio (major axis diameter/minor axis diameter) of 12.5:1, a BET specific surface area of 85 m²/g and an S content of 400 ppm.

The granulated product was heated to 330° C. to transform the goethite particles into hematite particles, and the thus obtained hematite particles were dry-pulverized. Thereafter, the hematite particles were deaggregated in water, and a 70% sulfuric acid solution was added thereto in an amount of 10 ml/kg. The resultant mixture was stirred and then dehydrated to obtain a press cake. The obtained press cake was extrusion-molded and granulated using a compression-molding machine equipped with a mold plate having an orifice diameter of 3 mm, and then dried at 120° C., thereby obtaining a granulated product of the hematite particles.

It was confirmed that the hematite particles constituting the obtained granulated product were spindle-shaped particles having an average major axis diameter of 0.24 μm, an aspect ratio (major axis diameter/minor axis diameter) of 10.5:1 and an S content of 3,100 ppm.

100 g of the granulated product of the hematite particles were introduced into a fixed bed type reducing apparatus, and reduced at 450° C. for 180 minutes while passing $H_2$ gas therethrough until the hematite particles were completely transformed into α-Fe. Then, after replacing the $H_2$ gas with $N_2$ gas and cooling the obtained iron particles to room temperature, 300 ml of ion-exchanged water was directly introduced into the reducing furnace, and the contents of the reducing furnace were taken out therefrom in the form of a water suspension containing the iron particles in an amount of 18% by weight (a purifying agent 6).

Next, the water suspension was filtered to separate the iron particles therefrom, and the iron particles were dried in air at 40° C. for 3 hours, thereby producing purifying iron particles.

As a result of observing by a scanning electron microscope (×30,000), the thus obtained purifying iron particles were rice ball-shaped particles mainly composed of α-Fe and had an average particle diameter of 0.10 μm, a saturation magnetization value of 160 Am²/kg (160 emu/g), a BET specific surface area of 26 m²/g, a crystallite size of 290 Å (B method), an Fe content of 83.2% by weight, an S content of 3,800 ppm and a carbon content of 0.09% by weight, and none of Cd, Pb, As and Hg were detected therefrom. As a result of X-ray diffraction analysis of the purifying iron particles, it was confirmed that both α-Fe and magnetite were present in the purifying iron particles. Also, it was confirmed that the α-Fe content of the purifying iron particles was 95.7% by weight, and the intensity ratio of $D_{110}$ (α-Fe) to a sum of $D_{311}$ ($Fe_3O_4$) and the $D_{110}$ ($D_{110}/(D_{110}+D_{110})$) thereof was 0.91:1, when both measured from the calibration curve.

<Purification Treatment of Soil Contaminated with Harmful Substances such as Heavy Metals, with Purifying Iron Particles>

1 g of the thus obtained purifying iron particles and 27.0 ml of ion-exchanged water were previously added to 20 g of wetted sand soil (under sieve of 2 mm mesh) filled in a 50-ml brown vial bottle (effective capacity: 68 ml). Then, 0.3 ml of each of 1000 ppm standard solutions of cadmium, lead, arsenic, selenium and cyanogens (each produced by Kanto Kagaku Co., Ltd.) as well as 1.5 ml of 1000 ppm standard solution of chromium (VI) (produced by Kanto Kagaku Co., Ltd.) were added in a total amount of 3.0 ml such that the concentration of each of cadmium, lead, arsenic, selenium and cyanogens in the resultant mixed-solution was 10 ppm, the concentration of chromium (VI) therein was 50 ppm, and the total concentration of cadmium, lead, arsenic, selenium, cyanogens and chromium (VI) therein was 100 ppm. The vial bottle was immediately closed with a rubber plug with a fluororesin liner, and then an aluminum seal was firmly tightened on the rubber plug. The vial bottle was shaken for 16 hours using a paint conditioner (manufactured by Reddevil Co., Ltd.), and then the contents of the vial bottle were separated into solid and liquid (filtrate) using a 0.45-μm membrane filter.

Successively, the same solid/liquid separation procedure as defined above was repeated until the amounts of the obtained solid and filtrate reached 50 g and 300 ml, respectively, as required for the following measurements. The obtained filtrate was directly analyzed according to "Environmental Standard for Contamination of Ground Water", Notification No. 10 of the Environmental Agency of Japan. Whereas, the obtained solid was dried in air at 40° C. for 3 hours to obtain a test specimen, and the test specimen was analyzed according to "Environmental Standard for Contamination of Soil", Notification No. 46 of the Environmental Agency of Japan. As a result, it was confirmed that the solution (filtrate) contained cadmium in an amount of less than 0.001 mg/liter; lead in an amount of less than 0.005 mg/liter; chromium (VI) in an amount of less than 0.04 mg/liter; arsenic in an amount of less than 0.001 mg/liter; and selenium in an amount of less than 0.002 mg/liter, and no cyanogens was detected therefrom. Also, as to the amounts of the respective elements eluted from the solid, it was confirmed that the solid exhibited a cadmium elution of less than 0.001 mg/liter; a lead elution of less than 0.005 mg/liter; a chromium (VI) elution of less than 0.04 mg/liter; an arsenic elution of less than 0.001 mg/liter; a selenium elution of less than 0.002 mg/liter; and no detected elution of cyanogens.

<Purification Treatment of Ground Water Contaminated with Harmful Substances such as Heavy Metals, with Iron Particles>

1 g of the thus obtained purifying iron particles and 27.0 ml of ion-exchanged water were charged into a 50-ml brown vial bottle (effective capacity: 68 ml). Then, 0.3 ml of each of 1000 ppm standard solutions of cadmium, lead, arsenic, selenium and cyanogens (each produced by Kanto Kagaku Co., Ltd.) as well as 1.5 ml of 1000 ppm standard solution of chromium (VI) (produced by Kanto Kagaku Co., Ltd.) were added in a total amount of 3.0 ml such that the concentration of each of cadmium, lead, arsenic, selenium and cyanogens in the resultant mixed solution was 10 ppm, the concentration of chromium (VI) therein was 50 ppm, and the total concentration of cadmium, lead, arsenic, selenium, cyanogens and chromium (VI) therein was 100 ppm. The vial bottle was immediately closed with a rubber plug with a fluororesin liner, and then an aluminum seal was firmly tightened on the rubber plug. The vial bottle was shaken for 16 hours using a paint conditioner manufactured by Reddevil Co., Ltd., and then the contents of the vial bottle were separated into solid and liquid (filtrate) using a 0.45-μm membrane filter.

Successively, the same solid/liquid separation procedure as defined above was repeated until the amounts of the obtained solid and filtrate reached respective values as required for the following measurements. The obtained filtrate was directly analyzed according to "Environmental Standard for Contamination of Ground Water", Notification No. 10 of the Environmental Agency of Japan. Whereas, the obtained solid was dried in air at 40° C. for 3 hours to obtain a test specimen, and the test specimen was analyzed according to "Environmental Standard for Contamination of Soil", Notification No. 46 of the Environmental Agency of Japan. As a result, it was confirmed that the solution (filtrate) contained cadmium in an amount of less than 0.001 mg/liter; lead in an amount of less than 0.005 mg/liter; chromium (VI) in an amount of less than 0.04 mg/liter; arsenic in an amount of less than 0.001 mg/liter; and selenium in an amount of less than 0.002 mg/liter, and no cyanogens was detected therefrom. Also, as to the amounts of the respective elements eluted from the solid, it was confirmed that the solid exhibited a cadmium elution of less than 0.001 mg/liter; a lead elution of less than 0.005 mg/liter; a chromium (VI) elution of less than 0.04 mg/liter; an arsenic elution of less than 0.001 mg/liter; a selenium elution of less than 0.002 mg/liter; and no detected elution of cyanogens.

<Purification Treatment of Soil Contaminated with Harmful Substances such as Heavy Metals, with Purifying Agent 6>

5.6 g of the thus obtained purifying agent 6 (containing 18% by weight of the iron particles) and 22.4 ml of ion-exchanged water were previously added to 20 g of wetted sand soil (under sieve of 2 mm mesh) filled in a 50-ml brown vial bottle (effective capacity: 68 ml). Then, 0.3 ml of each of 1000 ppm standard solutions of cadmium, lead, arsenic, selenium and cyanogen (each produced by Kanto Kagaku Co., Ltd.) as well as 1.5 ml of 1000 ppm standard solution of chromium (VI) (produced by Kanto Kagaku Co., Ltd.) were added in a total amount of 3.0 ml such that the concentration of each of cadmium, lead, arsenic, selenium and cyanogen in the resultant mixed solution was 10 ppm, the concentration of chromium (VI) therein was 50 ppm, and the total concentration of cadmium, lead, arsenic, selenium, cyanogen and chromium (VI) therein was 100 ppm. The vial bottle was immediately closed with a rubber plug with a fluororesin liner, and then an aluminum seal was firmly tightened on the rubber plug. The vial bottle was shaken for 16 hours using a paint conditioner manufactured by Reddevil Co., Ltd., and then the contents of the vial bottle were separated into solid and liquid (filtrate) using a 0.45-μm membrane filter.

Successively, the same solid/liquid separation procedure as defined above was repeated until the amounts of the obtained solid and filtrate reached respective values as required for the following measurements. The obtained filtrate was directly analyzed according to "Environmental Standard for Contamination of Ground Water", Notification No. 10 of the Environmental Agency of Japan. Whereas, the obtained solid was dried in air at 40° C. for 3 hours to obtain a test specimen, and the test specimen was analyzed according to "Environmental Standard for Contamination of Soil", Notification No. 46 of the Environmental Agency of Japan. As a result, it was confirmed that the solution (filtrate) contained cadmium in an amount of less than 0.001 mg/liter; lead in an amount of less than 0.005 mg/liter; chromium (VI) in an amount of less than 0.04 mg/liter; arsenic in an amount of less than 0.001 mg/liter; and selenium in an amount of less than 0.002 mg/liter, and no cyanogen was detected therefrom. Also, as to the amounts of the respective elements eluted from the solid, it was confirmed that the solid exhibited a cadmium elution of less than 0.001 mg/liter; a lead elution of less than 0.005 mg/liter; a chromium (VI) elution of less than 0.04 mg/liter; an arsenic elution of less than 0.001 mg/liter; a selenium elution of less than 0.002 mg/liter; and no detected elution of cyanogen.

<Purification Treatment of Ground Water Contaminated with Harmful Substances such as Heavy Metals, with Purifying Agent 6>

5.6 g of the thus obtained purifying agent 6 (containing 18% by weight of the iron particles) and 22.4 ml of ion-exchanged water were charged into a 50-ml brown vial bottle (effective capacity: 68 ml). Then, 0.3 ml of each of 1000 ppm standard solutions of cadmium, lead, arsenic, selenium and cyanogen (each produced by Kanto Kagaku Co., Ltd.) as well as 1.5 ml of 1000 ppm standard solution of chromium (VI) (produced by Kanto Kagaku Co., Ltd.) were added to the vial bottle in a total amount of 3.0 ml such that the concentration of each of cadmium, lead, arsenic, selenium and cyanogen in the resultant mixed solution was 10 ppm, the concentration of chromium (VI) therein was 50 ppm, and the total concentration of cadmium, lead, arsenic, selenium, cyanogen and chromium (VI) therein was 100 ppm. The vial bottle was immediately closed with a rubber plug with a fluororesin liner, and then an aluminum seal was firmly tightened on the rubber plug. The vial bottle was shaken for 16 hours using a paint conditioner manufactured by Reddevil Co., Ltd., and then the contents of the vial bottle were separated into solid and liquid (filtrate) using a 0.45-μm membrane filter.

Successively, the same solid/liquid separation procedure as defined above was repeated until the amounts of the obtained solid and filtrate reached respective values as required for the following measurements. The obtained filtrate was directly analyzed according to "Environmental Standard for Contamination of Ground Water", Notification No. 10 of the Environmental Agency of Japan. Whereas, the obtained solid was dried in air at 40° C. for 3 hours to obtain a test specimen, and the test specimen was analyzed according to "Environmental Standard for Contamination of Soil", Notification No. 46 of the Environmental Agency of Japan. As a result, it was confirmed that the solution (filtrate) contained cadmium in an amount of less than 0.001 mg/liter; lead in an amount of less than 0.005 mg/liter; chromium (VI) in an amount of less than 0.04 mg/liter; arsenic in an amount of less than 0.001 mg/liter; and selenium in an amount of less than 0.002 mg/liter, and no cyanogen was detected therefrom. Also, as to the amounts of the respective elements eluted from the solid, it was confirmed that the solid exhibited a cadmium elution of less than 0.001 mg/liter; a lead elution of less than 0.005 mg/liter; a chromium (VI) elution of less than 0.04 mg/liter; an arsenic elution of less than 0.001 mg/liter; a selenium elution of less than 0.002 mg/liter; and no detected elution of cyanogen.

<Goethite Particles>

As goethite particles, there were prepared goethite particles 1 to 8 shown in Table 1.

Goethite Particles 2:

300 liters of an aqueous ferrous sulfate solution containing $Fe^{2+}$ in an amount of 1.17 mol/l was added to 200 liters of a 8.05N NaOH aqueous solution previously filled in a reactor, and the solutions were reacted at a pH of 13.1 and a temperature of 35° C., thereby producing ferrous hydroxide particles.

Then, air was passed through the aqueous solution containing the thus obtained ferrous hydroxide particles, at a temperature of 40° C. and a flow rate of 500 liters/min for 8.5 hours, thereby producing goethite particles.

Goethite Particles 3:

400 liters of an aqueous ferrous sulfate solution containing $Fe^{2+}$ in an amount of 1.35 mol/l was added to a mixed solution of 350 liters of a 2.6N $Na_2CO_3$ aqueous solution and 150 liters of a 2.6N NaOH aqueous solution, and the solutions were mixed at 45° C., thereby producing a ferrous-containing precipitate. Then, air was passed through the water suspension containing the thus obtained ferrous-containing precipitate and having a pH value of 8.9, at a temperature of 45° C. and a flow rate of 800 liters/min for 7.2, hours, thereby producing goethite particles. The thus obtained goethite particles were filtered out, washed with water, dried and then pulverized by ordinary methods.

Goethite Particles 6:

12.8 liters of an aqueous ferrous sulfate solution containing $Fe^{2+}$ in an amount of 1.50 mol/l and 30.2 liters of a 0.44N NaOH aqueous solution (corresponding to 0.35 equivalent based on equivalent of $Fe^{2+}$ contained in the aqueous ferrous sulfate solution) were mixed together at a pH of 6.7 and a temperature of 38° C., thereby producing an aqueous ferrous sulfate solution containing $Fe(OH)_2$. Then, air was passed through the aqueous ferrous sulfate solution containing $Fe(OH)_2$, at a temperature of 40° C. and a flow rate of 130 liters/min for 3.0 hours, thereby producing goethite core particles.

The aqueous ferrous sulfate solution containing the goethite core particles (in an amount corresponding to 35 mol % based on finally produced goethite particles) was mixed with 7.0 liters of a 5.4N $Na_2CO_3$ aqueous solution (corresponding to 1.5 equivalents based on equivalent of residual $Fe^{2+}$ contained in the aqueous ferrous sulfate solution). Then, air was passed through the mixed solution having a pH of 9.4, at a temperature of 42° C. and a flow rate of 130 liters/min for 4 hours, thereby producing goethite particles. The water suspension containing the thus obtained goethite particles was washed with water using a filter press, thereby obtaining a press cake. The obtained press cake was extrusion-molded and granulated using a compression-molding machine equipped with a mold plate having an orifice diameter of 4 mm, and then dried at 120° C., thereby obtaining a granulated product of the goethite particles.

It was confirmed that the goethite particles constituting the above obtained granulated product were acicular particles having an average major axis diameter of 0.30 µm, an aspect ratio (major axis diameter/minor axis diameter) of 25.0:1, a BET specific surface area of 70 $m^2/g$ and an S content of 4,000 ppm.

Goethite Particles 8:

12.8 liters of an aqueous ferrous sulfate solution containing $Fe^{2+}$ in an amount of 1.50 mol/l which was obtained by controlling the concentration of the aqueous ferrous sulfate solution prepared by the same method as defined in Example 4, and 30.2 liters of a 0.44N NaOH aqueous solution (corresponding to 0.35 equivalent based on equivalent of $Fe^{2+}$ contained in the aqueous ferrous sulfate solution) were mixed together at a pH of 6.7 and a temperature of 38° C., thereby producing an aqueous ferrous sulfate solution containing $Fe(OH)_2$. Then, air was passed through the aqueous ferrous sulfate solution containing $Fe(OH)_2$, at a temperature of 40° C. and a flow rate of 130 liters/min for 3.0 hours, thereby producing goethite core particles.

The aqueous ferrous sulfate solution containing the goethite core particles (in an amount corresponding to 35 mol % based on finally produced goethite particles) was mixed with 7.0 liters of a 5.4N $Na_2CO_3$ aqueous solution (corresponding to 1.5 equivalents based on equivalent of residual $Fe^{2+}$ contained in the aqueous ferrous sulfate solution). Then, air was passed through the resultant mixed solution having a pH of 9.4 at a temperature of 42° C. and a flow rate of 130 liters/min for 4 hours, thereby producing goethite particles. The water suspension containing the thus obtained goethite particles was washed with water using a filter press, thereby obtaining a press cake. The obtained press cake was extrusion-molded and granulated using a compression-molding machine equipped with a mold plate having an orifice diameter of 4 mm, and then dried at 120° C., thereby obtaining a granulated product of the goethite particles.

It was confirmed that the goethite particles constituting the obtained granulated product were acicular particles having an average major axis diameter of 0.33 µm, an aspect ratio (major axis diameter/minor axis diameter) of 25.0:1, a BET specific surface area of 70 $m^2/g$ and an S content of 1,700 ppm. In addition, it was confirmed that the goethite particles had a uniform particle size and contained no dendritic particles.

Examples 7 and 9

<Production of Purifying Iron Particles>

The same procedure as defined in Example 1 for producing the purifying iron particles was conducted except that kind of goethite particles, heat-reducing temperature, and retention time (days) in water were changed variously, thereby obtaining purifying iron particles.

Essential production conditions are shown in Table 2, and various properties of the obtained purifying iron particles are shown in Table 3.

Examples 8 and 10 to 20, and Comparative Examples 1 to 4

<Production of Purifying Agent>

The same procedure as defined in Example 1 for producing the purifying agent was conducted except that kind of goethite particles, heat-reducing temperature, and retention time (days) in water were changed variously, thereby obtaining purifying agents. Meanwhile, in Examples 11 to 14, the goethite particles were heat-dehydrated at 300° C., and then heat-reduced at various temperatures.

Figure 5:
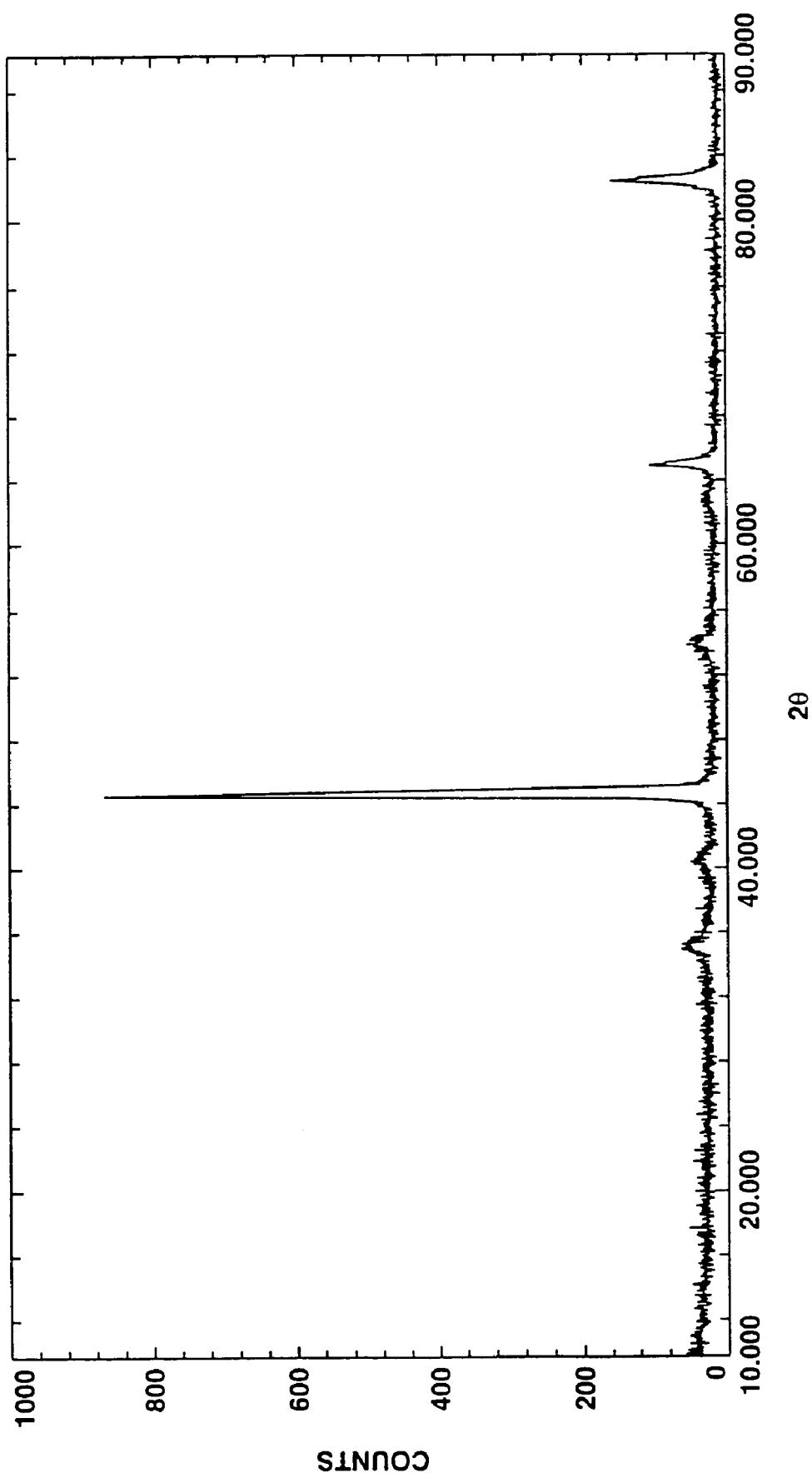
FIG. 5 is an X-ray pattern of iron particles contained in a purifying agent obtained in Example 8.
Figure 6:
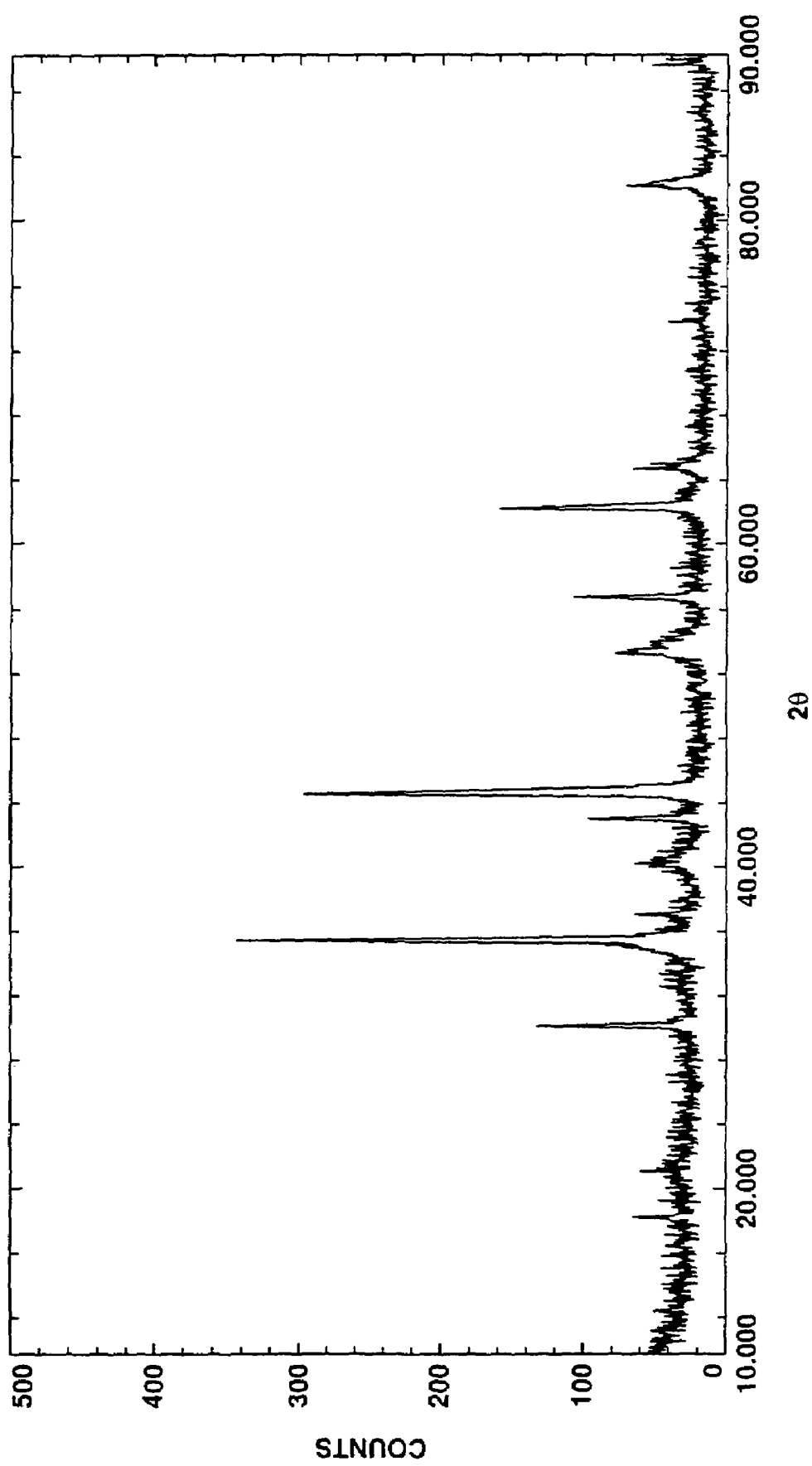
FIG. 6 is an X-ray pattern of iron particles contained in a purifying agent obtained in Example 10.

Essential production conditions are shown in Table 2, and various properties of the obtained purifying agents are shown in Table 3. X-ray diffraction patterns of the iron particles contained in the purifying agents obtained in Examples 8 and 10, are shown in FIGS. 5 and 6, respectively.

Figure 7:
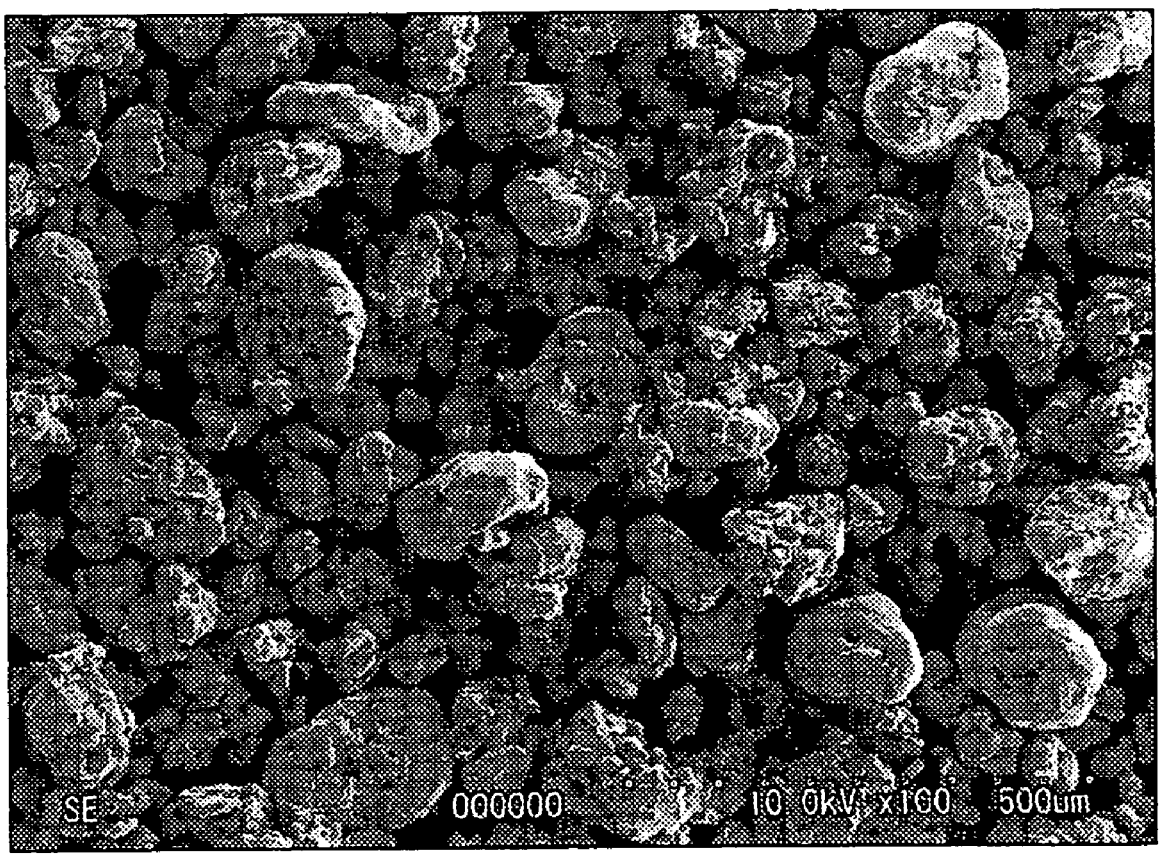
FIG. 7 is a scanning electron micrograph (×100) of reduced iron particles used in Comparative Example 5.
Figure 8:
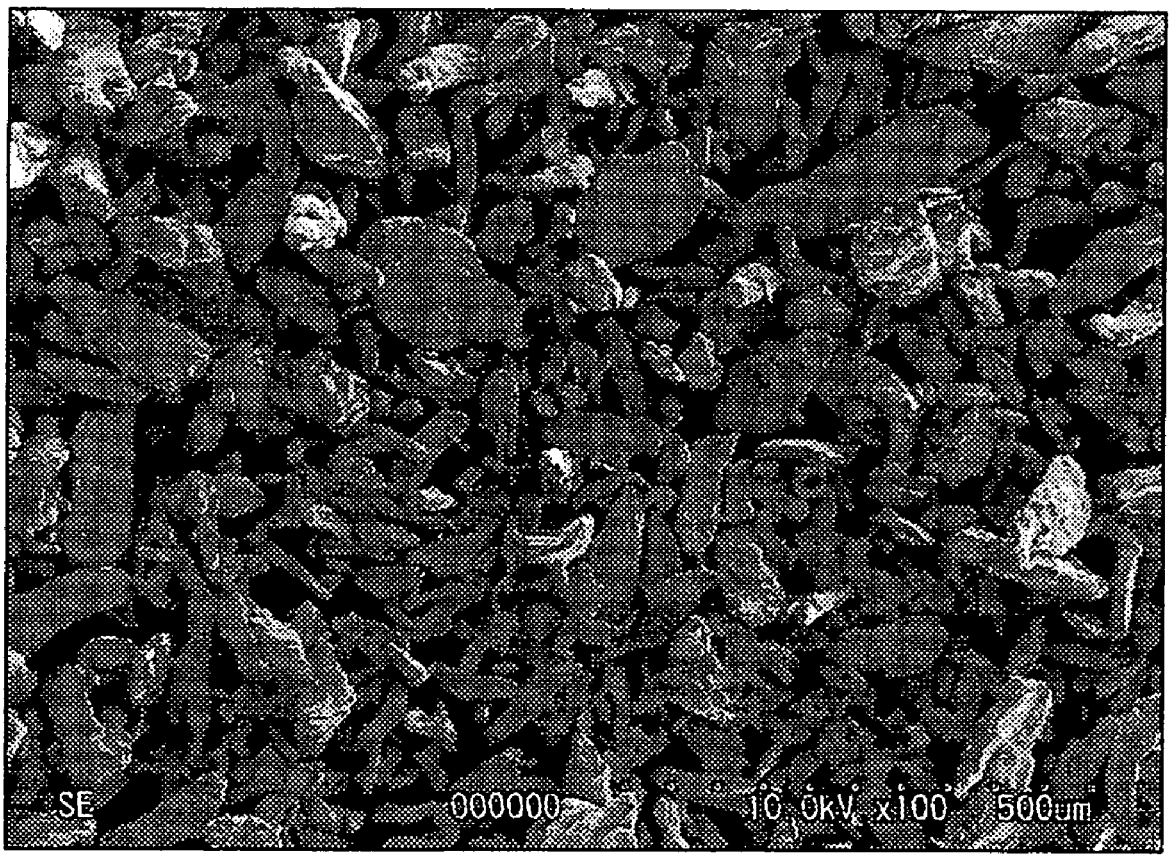
FIG. 8 is a scanning electron micrograph (×100) of electrolytic iron particles used in Comparative Example 6.
Figure 9:
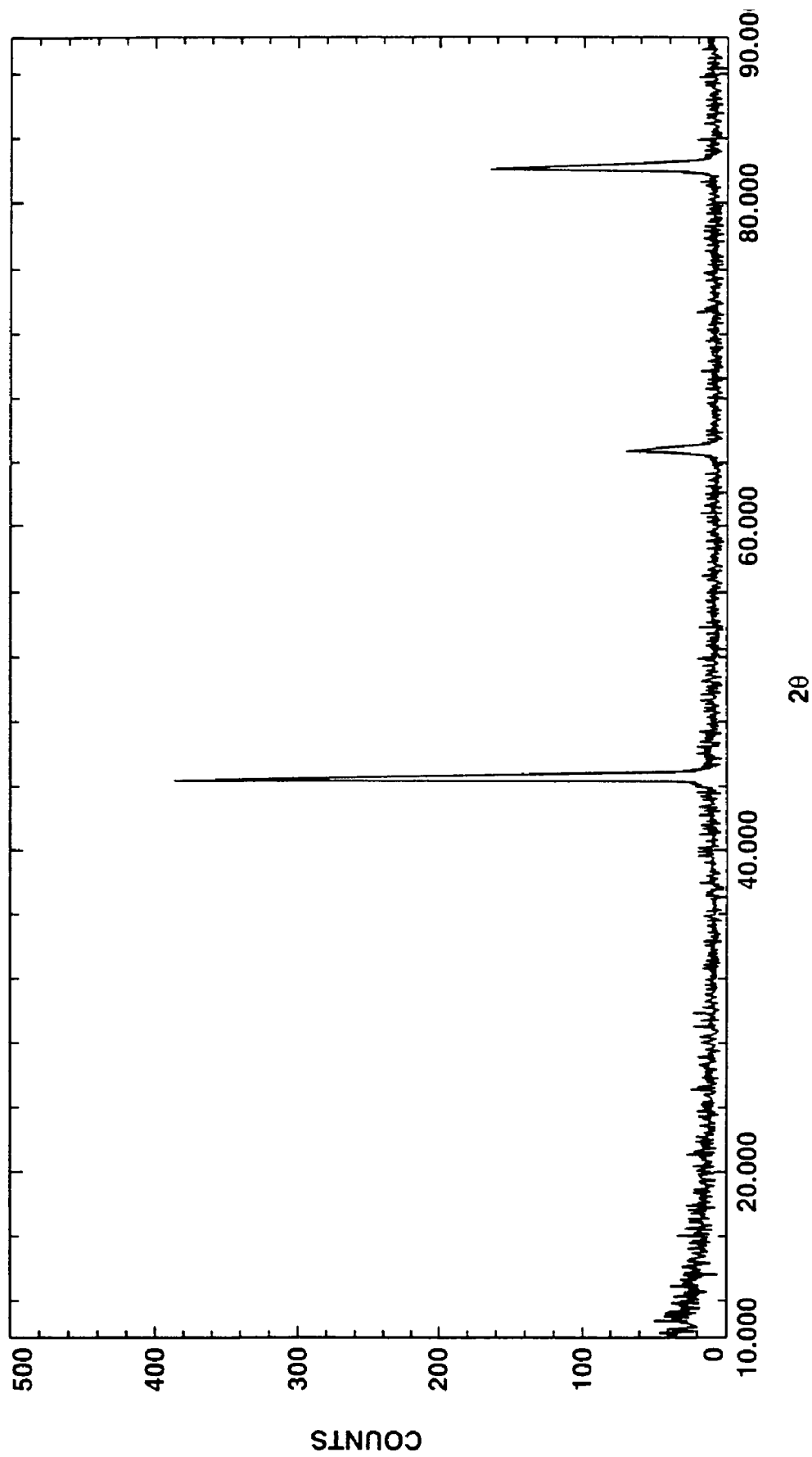
FIG. 9 is an X-ray pattern of reduced iron particles used in Comparative Example 5.
Figure 10:
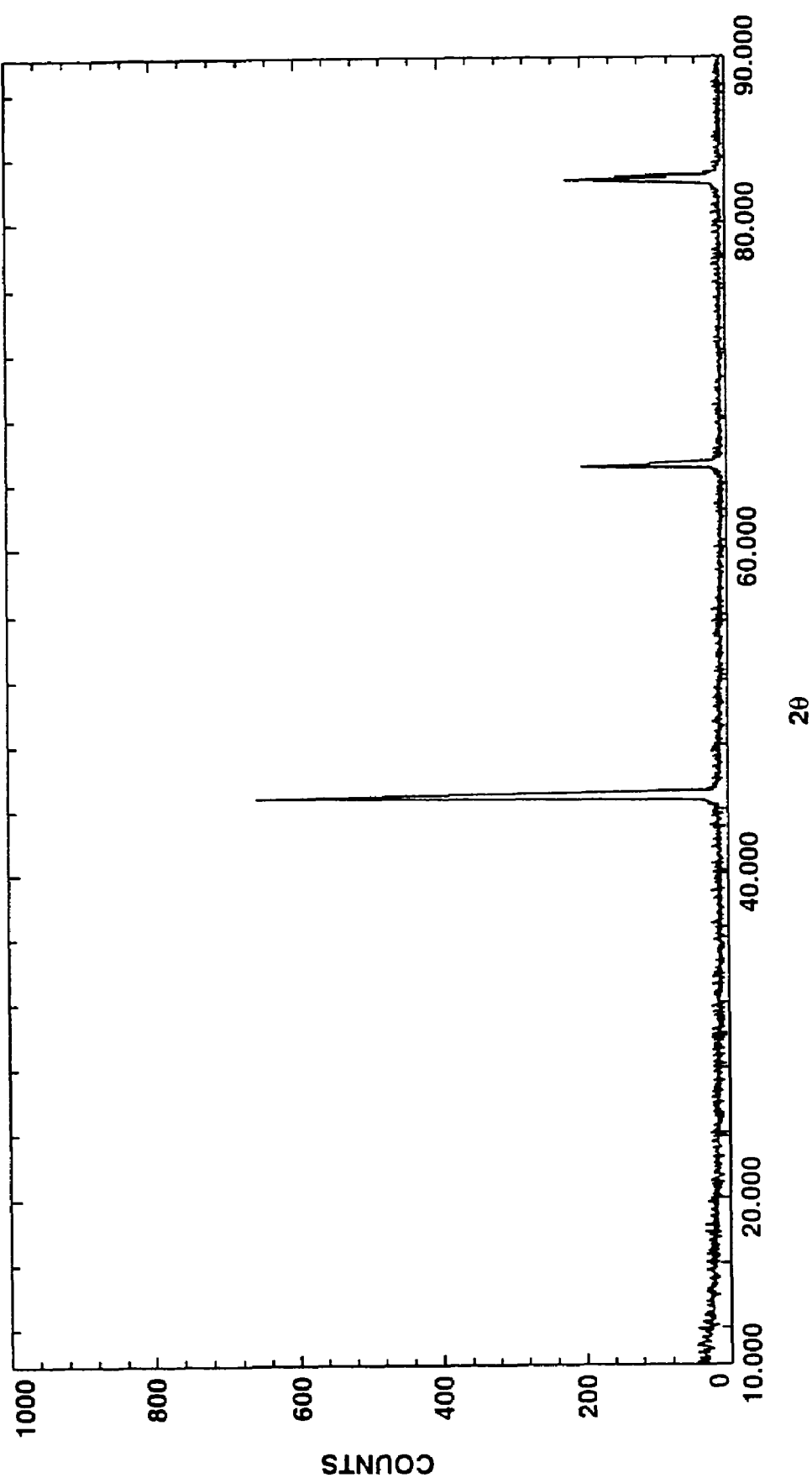
FIG. 10 is an X-ray pattern of electrolytic iron particles used in Comparative Example 6.

Meanwhile, reduced iron particles were used in Comparative Example 5, and electrolytic iron particles were used in Comparative Example 6. The scanning electron micrographs (×100) of the respective iron particles are shown in FIGS. 7 and 8, and X-ray diffraction patterns thereof are shown in FIGS. 9 and 10.

Examples 21 to 34 and Comparative Examples 7 to 12

<Purification Treatment of Contaminated Soil and Ground Water>

The same procedure as defined in Example 1 was conducted to treat the contaminated soil and ground water, except that kind of purifying iron particles and kind of purifying agent were changed variously.

Essential treatment conditions and the measurement results are shown in Table 4.

Examples 35 to 39 and Comparative Examples 13 to 14

The same procedure as defined in Example 2 for producing the purifying iron particles was conducted except that heat-reducing temperature and retention time (days) in water were changed variously, thereby obtaining purifying iron particles and purifying agent.

Essential production conditions are shown in Table 5, and various properties of the obtained purifying iron particles and purifying agent are shown in Table 6. Meanwhile, in Comparative Example 13, the S content of the iron particles were fully reduced by washing the goethite particles with water. Also, in Comparative Example 14, it was confirmed that the obtained iron particles partially contained acicular particles.

Examples 40 to 47 and Comparative Examples 15 to 18

<Purification Treatment of Contaminated Soil and Ground Water>

The same procedure as defined in Example 2 was conducted to treat the contaminated soil and ground water, except that kind of purifying iron particles and kind of purifying agent were changed variously.

Essential treatment conditions and the measurement results are shown in Table 7.

Examples 48 and 55 and Comparative Example 19

<Production of Purifying Iron Particles and Purifying Agent>

The same procedure as defined in Example 3 for producing the purifying iron particles and purifying agent was conducted except that kind of goethite particles, heat-dehydrating temperature, addition or non-addition of sulfuric acid to water suspension containing hematite particles as well as amount of the sulfuric acid added, heat-reducing temperature, and retention time (days) in water were changed variously, thereby obtaining purifying iron particles and purifying agent.

Essential production conditions are shown in Table 8, and various properties of the obtained purifying iron particles and purifying agent are shown in Table 9.

In Comparative Example 20, there were used magnetite particles containing no α-Fe which were obtained by introducing 100 g of the granulated product of the goethite particles 6 into a rolling-type reducing apparatus and subjecting the goethite particles to reduction reaction at 300% for 180 minutes while passing $H_2$ gas therethrough until the goethite particles were completely transformed into $Fe_3O_4$.

Examples 56 to 63 and Comparative Examples 21 and 22

<Purification Treatment of Contaminated Soil and Ground Water>

The same procedure as defined in Example 3 was conducted to treat the contaminated soil and ground water, except that kind of purifying iron particles and kind of purifying agent were changed variously.

Essential treatment conditions and the measurement results are shown in Table 10.

<Persistency of Catalytic Activity>

The purification treatment was conducted by the same evaluation method as defined above except that there were used such purifying agents containing the iron particles retained in water for 4 days (Examples 50 and 54) and 30 days (Examples 51 and 55). As a result, it was confirmed that in any of the cases where the purifying agents of the present invention were used, the residual percentage of organohalogen compounds was kept low, and the catalytic activity was kept high. Therefore, it is apparently recognized that the purifying agents of the present invention were capable of maintaining a good catalytic activity thereof for a long period of time.

Examples 64 to 68

<Production of Purifying Agent>

The same procedure as defined in Example 4 for producing the purifying agent was conducted except that kind of goethite particles, heat-dehydrating temperature, heat-reducing temperature, dispersing method, etc., were changed variously, thereby obtaining purifying agents.

Essential production conditions are shown in Tables 11 and 12, and various properties of the obtained purifying agents are shown in Tables 13 and 14.

Examples 69 to 73

<Purification Treatment of Contaminated Soil and Ground Water>

The same procedure as defined in Example 4 was conducted to treat the contaminated soil and ground water, except that kind of purifying agent was changed variously.

Essential treatment conditions and the measurement results are shown in Table 15.

Examples 74 to 78

<Production of Iron Particles and Purifying Agent>

The same procedure as defined in Example 5 for producing the purifying iron particles and purifying agent was conducted except that kind of goethite particles, heat-dehydrating temperature, heat-reducing temperature, dispersing method, etc., were changed variously, thereby obtaining purifying iron particles and purifying agents.

Essential production conditions are shown in Table 16, and various properties of the obtained purifying iron particles and purifying agents are shown in Table 17. Further, the results of elution test of the obtained iron particles and purifying agents are shown in Table 18.

Examples 79 to 83

<Purification Treatment of Contaminated Soil and Ground Water>

The same procedure as defined in Example 5 was conducted to treat the contaminated soil and ground water, except that kinds of iron particles and purifying agent were changed variously.

Essential treatment conditions and the measurement results are shown in Table 19.

Examples 84 to 91 and Comparative Example 23

<Production of Purifying Iron Particles and Purifying Agent>

The same procedure as defined in Example 6 for producing the purifying iron particles and purifying agent was conducted except that kind of goethite particles, heat-dehydrating temperature, addition or non-addition of sulfuric acid to water suspension containing hematite particles as well as amount of the sulfuric acid added, heat-reducing temperature, and retention time (days) in water were changed variously, thereby obtaining purifying iron particles and purifying agent.

Essential production conditions are shown in Table 20, and various properties of the obtained purifying iron particles and purifying agent are shown in Table 21.

Examples 92 to 99 and Comparative Example 24

<Purification Treatment of Contaminated Soil and Ground Water>

The same procedure as defined in Example 6 was conducted to treat the contaminated soil and ground water, except that kind of purifying iron particles and kind of purifying agent were changed variously.

Essential treatment conditions and the measurement results are shown in Tables 22 and 23.

<Persistency of Catalytic Activity>

The purification treatments were conducted by the same evaluation method as defined above except that there were respectively used the purifying agents containing the purifying iron particles retained in water for 4 days (Examples 86 and 90) and 30 days (Examples 87 and 91). As a result, it was confirmed that in any of the cases where the purifying agents of the present invention were used, the harmful substance such as heavy metals which were contained in the soil and ground water, were incorporated into ferrite formed, and the ferrite formation reaction with harmful substances such as heavy metals was continued for a long period of time. Accordingly, it is apparently recognized that the purifying agents of the present invention were capable of maintaining the effect of insolubilizing the harmful substances such as heavy metals, for a long period of time.

Example 100

<Purification Treatment of Soil Contaminated with Harmful Substances such as Heavy Metals or the Like, Aliphatic Organohalogen Compounds, or Aromatic Organohalogen Compounds, Using Iron Particles>

1.0 µl of trichloroethylene was previously added to 20 g of wetted sand soil (under sieve of 2 mm mesh) to prepare a sample soil contaminated with trichloroethylene. A 50-ml brown vial bottle (effective capacity: 68 ml) was charged with 1 g of the purifying iron particles obtained in Example 1 and 27 ml of ion-exchanged water, and then with the above contaminated soil. Further, 0.3 ml of each of 1000 ppm standard solutions of cadmium, lead, arsenic, selenium and cyanogen (each produced by Kanto Kagaku Co., Ltd.) as well as 1.5 ml of 1000 ppm standard solution of chromium (VI) (produced by Kanto Kagaku Co., Ltd.) were added to the vial bottle in a total amount of 3.0 ml such that the concentration of each of cadmium, lead, arsenic, selenium and cyanogen in the resultant mixed solution was 10 ppm, the concentration of chromium (VI) therein was 50 ppm, and the total concentration of cadmium, lead, arsenic, selenium, cyanogen and chromium (VI) therein was 100 ppm. The vial bottle was immediately closed with a rubber plug with a fluororesin liner, and an aluminum seal was firmly tightened on the rubber plug. The vial bottle was shaken for 3 hours using a paint conditioner manufactured by Reddevil Co., Ltd. 50 µl of a headspace gas of the vial bottle was sampled using a syringe, and the amount of residual trichloroethylene contained in the sampled gas was measured by the same method as defined above. Thereafter, the vial bottle was further shaken for 13 hours (total shaking time: 16 hours), and then the contents of the vial bottle were separated into solid and liquid (filtrate) using a 0.45-µm membrane filter.

Successively, the same solid/liquid separation procedure as defined above was repeated until the amounts of the obtained solid and filtrate reached 50 g and 300 ml, respectively, as required for the following measurements. The obtained filtrate was directly analyzed according to "Environmental Standard for Contamination of Ground Water", Notification No. 10 of the Environmental Agency of Japan. Whereas, the obtained solid was dried in air at 40° C. for 3 hours to obtain a test specimen, and the test specimen was analyzed according to "Environmental Standard for Contamination of Soil", Notification No. 46 of the Environmental Agency of Japan. As a result, it was confirmed that the solution (filtrate) contained cadmium in an amount of less than 0.001 mg/liter; lead in an amount of less than 0.005 mg/liter; chromium (VI) in an amount of less than 0.04 mg/liter; arsenic in an amount of less than 0.001 mg/liter; and selenium in an amount of less than 0.002 mg/liter, and no cyanogen was detected therefrom. Also, as to the amounts of the respective elements eluted from the solid, it was confirmed that the solid exhibited a cadmium elution of less than 0.001 mg/liter; a lead elution of less than 0.005 mg/liter; a chromium (VI) elution of less than 0.04 mg/liter; an arsenic elution of less than 0.001 mg/liter; a selenium elution of less than 0.002 mg/liter; and no detected elution of cyanogen.

<Results of Purification Treatment of Soil Contaminated with Aliphatic Organohalogen Compounds>

According to the above evaluation method, it was confirmed that when the contaminated soil was treated with the above purifying iron particles, the residual percentage of trichloroethylene in the treated soil was 9.6%.

<Purification Treatment of Ground Water Contaminated with Harmful Substances such as Heavy Metals or the Like, Aliphatic Organohalogen Compounds, or Aromatic Organohalogen Compounds, Using Iron Particles>

A 50-ml brown vial bottle (effective capacity: 68 ml) was charged with 1 g of the purifying iron particles obtained in Example 1, 27.0 ml of ion-exchanged water and 1.0 µl of trichloroethylene. Further, 0.3 ml of each of 1000 ppm standard solutions of cadmium, lead, arsenic, selenium and cyanogen (each produced by Kanto Kagaku Co., Ltd.) as well as 1.5 ml of 1000 ppm standard solution of chromium (VI) (produced by Kanto Kagaku Co., Ltd.) were charged into the vial bottle in a total amount of 3.0 ml such that the concentration of each of cadmium, lead, arsenic, selenium and cyanogen in the resultant mixed solution was 10 ppm, the concentration of chromium (VI) therein was 50 ppm, and the total concentration of cadmium, lead, arsenic, selenium, cyanogen and chromium (VI) therein was 100 ppm. The vial bottle was immediately closed with a rubber plug with a fluororesin liner, and then an aluminum seal was firmly tightened on the rubber plug. The vial bottle was shaken for 3 hours using a paint conditioner manufactured by Reddevil Co., Ltd. Then, 50 µl of a headspace gas of the vial bottle was sampled using a syringe, and the amount of residual trichloroethylene contained in the sampled gas was measured by the same method as defined above. Thereafter, the vial bottle was further shaken for 13 hours (total shaking time: 16 hours), and then the contents of the vial bottle were separated into solid and liquid (filtrate) using a 0.45-µm membrane filter.

Successively, the same solid/liquid separation procedure as defined above was repeated until the amounts of the obtained solid and filtrate reached respective values as required for the following measurements. The obtained filtrate was directly analyzed according to "Environmental Standard for Contamination of Ground Water", Notification No. 10 of the Environmental Agency of Japan. Whereas, the obtained solid was dried in air at 40° C. for 3 hours to obtain a test specimen, and the test specimen was analyzed according to "Environmental Standard for Contamination of Soil", Notification No. 46 of the Environmental Agency of Japan. As a result, it was confirmed that the solution (filtrate) contained cadmium in an amount of less than 0.001 mg/liter; lead in an amount of less than 0.005 mg/liter; chromium (VI) in an amount of less than 0.04 mg/liter; arsenic in an amount of less than 0.001 mg/liter; and selenium in an amount of less than 0.002 mg/liter, and no cyanogen was detected therefrom. Also, as to the amounts of the respective elements eluted from the solid, it was confirmed that the solid exhibited a cadmium elution of less than 0.001 mg/liter; a lead elution of less than 0.005 mg/liter; a chromium (VI) elution of less than 0.04 mg/liter; an arsenic elution of less than 0.001 mg/liter; a selenium elution of less than 0.002 mg/liter; and no detected elution of cyanogen.

<Results of Purification Treatment of Ground Water Contaminated with Aliphatic Organohalogen Compounds>

According to the above evaluation method, it was confirmed that when the contaminated ground water was treated with the above purifying iron particles, the residual percentage of trichloroethylene in the treated ground water was 15.8%.

<Purification Treatment of Soil Contaminated with Harmful Substances such as Heavy Metals or the like, Aliphatic Organohalogen Compounds, or Aromatic Organohalogen Compounds, Using Purifying Agent>

1.0 µl of trichloroethylene was previously added to 20 g of wetted sand soil (under sieve of 2 mm mesh) to prepare a sample soil contaminated with trichloroethylene. A 50-ml brown vial bottle (effective capacity: 68 ml) was charged with 5.6 g of the purifying agent (containing 18% by weight of the iron particles) obtained in Example 4 and 27 ml of ion-exchanged water, and then with the above contaminated soil. Then, 0.3 ml of each of 1000 ppm standard solutions of cadmium, lead, arsenic, selenium and cyanogen (each produced by Kanto Kagaku Co., Ltd.) as well as 1.5 ml of 1000 ppm standard solution of chromium (VI) (produced by Kanto Kagaku Co., Ltd.) were added to the vial bottle in a total amount of 3.0 ml such that the concentration of each of cadmium, lead, arsenic, selenium and cyanogen in the resultant mixed solution was 10 ppm, the concentration of chromium (VI) therein was 50 ppm, and the total concentration of cadmium, lead, arsenic, selenium, cyanogen and chromium (VI) therein was 100 ppm. The vial bottle was immediately closed with a rubber plug with a fluororesin liner, and an aluminum seal was firmly tightened on the rubber plug. The vial bottle was shaken for 3 hours using a paint conditioner manufactured by Reddevil Co., Ltd. Then, 50 µl of a headspace gas of the vial bottle was sampled using a syringe, and the amount of residual trichloroethylene contained in the sampled gas was measured by the same method as defined above. Thereafter, the vial bottle was further shaken for 13 hours (total shaking time: 16 hours), and then the contents of the vial bottle were separated into solid and liquid (filtrate) using a 0.45-µm membrane filter.

Successively, the same solid/liquid separation procedure as defined above was repeated until the amounts of the obtained solid and filtrate reached respective values as required for the following measurements. The obtained filtrate was directly analyzed according to "Environmental Standard for Contamination of Ground Water", Notification No. 10 of the Environmental Agency of Japan. Whereas, the obtained solid was dried in air at 40° C. for 3 hours to obtain a test specimen, and the test specimen was analyzed according to "Environmental Standard for Contamination of Soil", Notification No. 46 of the Environmental Agency of Japan. As a result, it was confirmed that the solution (filtrate) contained cadmium in an amount of less than 0.001 mg/liter; lead in an amount of less than 0.005 mg/liter; chromium (VI) in an amount of less than 0.04 mg/liter; arsenic in an amount of less than 0.001 mg/liter; and selenium in an amount of less than 0.002 mg/liter, and no cyanogen was detected therefrom. Also, as to the amounts of the respective elements eluted from the solid, it was confirmed that the solid exhibited a cadmium elution of less than 0.001 mg/liter; a lead elution of less than 0.005 mg/liter; a chromium (VI) elution of less than 0.04 mg/liter; an arsenic elution of less than 0.001 mg/liter; a selenium elution of less than 0.002 mg/liter; and no detected elution of cyanogen.

<Results of Purification Treatment of Soil Contaminated with Aliphatic Organohalogen Compounds>

According to the above evaluation method, it was confirmed that when the contaminated soil was treated with the above purifying agent, the residual percentage of trichloroethylene in the treated soil was 3.8%.

<Purification Treatment of Ground Water Contaminated with Harmful Substances such as Heavy Metals or the like, Aliphatic Organohalogen Compounds, or Aromatic Organohalogen Compounds, Using Purifying Agent>

A 50-ml brown vial bottle (effective capacity: 68 ml) was charged with 5.6 g of the purifying agent (containing 18% by weight of the iron particles) obtained in Example 4, 22.4 ml of ion-exchanged water and 1.0 µl of trichloroethylene. Further, 0.3 ml of each of 1000 ppm standard solutions of cadmium, lead, arsenic, selenium and cyanogen (each produced by Kanto Kagaku Co., Ltd.) as well as 1.5 ml of 1000 ppm standard solution of chromium (VI) (produced by Kanto Kagaku Co., Ltd.) were charged into the vial bottle in a total amount of 3.0 ml such that the concentration of each of cadmium, lead, arsenic, selenium and cyanogen in the resultant mixed solution was 10 ppm, the concentration of chromium (VI) therein was 50 ppm, and the total concentration of cadmium, lead, arsenic, selenium, cyanogen and chromium (VI) therein was 100 ppm. The vial bottle was immediately closed with a rubber plug with a fluororesin liner, and then an aluminum seal was firmly tightened on the rubber plug. The vial bottle was shaken for 3 hours using a paint conditioner manufactured by Reddevil Co., Ltd. Then, 50 μl of a headspace gas of the vial bottle was sampled using a syringe, and the amount of residual trichloroethylene contained in the sampled gas was measured by the same method as defined above. Thereafter, the vial bottle was further shaken for 13 hours (total shaking time: 16 hours), and then the contents of the vial bottle were separated into solid and liquid (filtrate) using a 0.45-μm membrane filter.

Successively, the same solid/liquid separation procedure as defined above was repeated until the amounts of the obtained solid and filtrate reached respective values as required for the following measurements. The obtained filtrate was directly analyzed according to "Environmental Standard for Contamination of Ground Water", Notification No. 10 of the Environmental Agency of Japan. Whereas, the obtained solid was dried in air at 40° C. for 3 hours to obtain a test specimen, and the test specimen was analyzed according to "Environmental Standard for Contamination of Soil", Notification No. 46 of the Environmental Agency of Japan. As a result, it was confirmed that the solution (filtrate) contained cadmium in an amount of less than 0.001 mg/liter; lead in an amount of less than 0.005 mg/liter; chromium (VI) in an amount of less than 0.04 mg/liter; arsenic in an amount of less than 0.001 mg/liter; and selenium in an amount of less than 0.002 mg/liter, and no cyanogen was detected therefrom. Also, as to the amounts of the respective elements eluted from the solid, it was confirmed that the solid exhibited a cadmium elution of less than 0.001 mg/liter; a lead elution of less than 0.005 mg/liter; a chromium (VI) elution of less than 0.04 mg/liter; an arsenic elution of less than 0.001 mg/liter; a selenium elution of less than 0.002 mg/liter; and no detected elution of cyanogen.

<Results of Purification Treatment of Ground Water Contaminated with Aliphatic Organohalogen Compounds>

According to the above evaluation method, it was confirmed that when the contaminated ground water was treated with the above purifying agent, the residual percentage of trichloroethylene in the treated ground water was 5.1%.

Examples 101 to 104

<Purification Treatment of Contaminated Soil and Ground Water>

The same procedure as defined in Example 100 was conducted to treat the contaminated soil and ground water, except that kind of purifying iron particles, kind of purifying agent, and kinds of aliphatic organohalogen compounds and aromatic organohalogen compounds added thereto were changed variously.

Essential treatment conditions and the measurement results are shown in Tables 24 and 25.

Examples 105 to 108

<Purification Treatment of Contaminated Soil and Ground Water>

The same procedure as defined in Example 100 was conducted to treat the contaminated soil and ground water, except that kind of purifying iron particles, kind of purifying agent, and kinds of aliphatic organohalogen compounds and aromatic organohalogen compounds added thereto were changed variously.

Meanwhile, in the case where the aromatic organohalogen compounds were added to the soil and ground water, the vial bottle was shaken for 10 hours using a paint conditioner manufactured by Reddevil Co., Ltd. Then, 50 μl of a headspace gas of the vial bottle was sampled using a syringe, and the amount of residual trichlorobenzene contained in the sampled gas was measured by the same method as defined above. Thereafter, the vial bottle was further shaken for 6 hours (total shaking time: 16-hours), and then the contents of the vial bottle were separated into solid and liquid (filtrate) using a 0.45-μm membrane filter.

Essential treatment conditions and the measurement results are shown in Table 26.

TABLE 1

| Examples and Comparative Examples | Properties of spindle-shaped goethite particles | | |
|---|---|---|---|
| | Shape | Average major axis diameter (μm) | Aspect ratio (—) |
| Goethite particles 1 | Spindle-shaped | 0.30 | 12.5:1 |
| Goethite particles 2 | Acicular | 0.48 | 8.5:1 |
| Goethite particles 3 | Spindle-shaped | 0.30 | 16.0:1 |
| Goethite particles 4 | Spindle-shaped | 0.30 | 12.5:1 |
| Goethite particles 5 | Spindle-shaped | 0.30 | 12.5:1 |
| Goethite particles 6 | Acicular | 0.33 | 25.0:1 |
| Goethite particles 7 | Spindle-shaped | 0.30 | 12.5:1 |
| Goethite particles 8 | Acicular | 0.33 | 25.0:1 |

| Examples and Comparative Examples | Properties of spindle-shaped goethite particles | |
|---|---|---|
| | BET specific surface area ($m^2/g$) | S content (ppm) |
| Goethite particles 1 | 85 | — |
| Goethite particles 2 | 30 | — |
| Goethite particles 3 | 85 | — |
| Goethite particles 4 | 85 | 1,500 |
| Goethite particles 5 | 85 | 400 |
| Goethite particles 6 | 70 | 4,000 |
| Goethite particles 7 | 85 | 900 |
| Goethite particles 8 | 70 | 1,700 |

TABLE 2

| Examples and Comparative Examples | Kind of goethite particles used | Heat-dehydrating temperature (° C.) |
|---|---|---|
| Example 7 | Goethite particles 1 | — |
| Example 8 | Goethite particles 1 | — |
| Example 9 | Goethite particles 1 | — |
| Example 10 | Goethite particles 1 | — |
| Example 11 | Goethite particles 1 | 300 |
| Example 12 | Goethite particles 1 | 300 |

TABLE 2-continued

| Examples and Comparative Examples | | |
|---|---|---|
| Example 13 | Goethite particles 1 | 300 |
| Example 14 | Goethite particles 1 | 300 |
| Example 15 | Goethite particles 1 | — |
| Example 16 | Goethite particles 1 | — |
| Example 17 | Goethite particles 2 | — |
| Example 18 | Goethite particles 2 | — |
| Example 19 | Goethite particles 3 | — |
| Example 20 | Goethite particles 3 | — |
| Comparative Example 1 | Goethite particles 1 | — |
| Comparative Example 2 | Goethite particles 2 | — |
| Comparative Example 3 | Goethite particles 3 | — |
| Comparative Example 4 | Goethite particles 4 | — |

| Examples and Comparative Examples | Reducing temperature (° C.) | Retention time in water (day) | Condition |
|---|---|---|---|
| Example 7 | 450 | 20 | Iron particles |
| Example 8 | 450 | 20 | Purifying agent |
| Example 9 | 450 | 30 | Iron particles |
| Example 10 | 450 | 30 | Purifying agent |
| Example 11 | 400 | 0 | Purifying agent |
| Example 12 | 400 | 20 | Purifying agent |
| Example 13 | 500 | 0 | Purifying agent |
| Example 14 | 500 | 20 | Purifying agent |
| Example 15 | 550 | 0 | Purifying agent |
| Example 16 | 550 | 20 | Purifying agent |
| Example 17 | 450 | 0 | Purifying agent |
| Example 18 | 450 | 20 | Purifying agent |
| Example 19 | 450 | 0 | Purifying agent |
| Example 20 | 450 | 20 | Purifying agent |
| Comparative Example 1 | 250 | 0 | Purifying agent |
| Comparative Example 2 | 250 | 20 | Purifying agent |
| Comparative Example 3 | 650 | 0 | Purifying agent |
| Comparative Example 4 | 650 | 20 | Purifying agent |

TABLE 3

| Example and Comparative Examples | Properties of iron particles and purifying agent | | | |
|---|---|---|---|---|
| | Small particles: 0.05 to 0.5 μm | | Large particles: 0.5 to 5.0 μm | |
| | Percentage based on whole particles (%) | Average particle diameter (μm) | Percentage based on whole particles (%) | Average particle diameter (μm) |
| Example 7 | 35.8 | 0.10 | 62.4 | 1.0 |
| Example 8 | 35.8 | 0.10 | 62.4 | 1.0 |
| Example 9 | 36.3 | 0.10 | 62.2 | 1.0 |
| Example 10 | 36.3 | 0.10 | 62.2 | 1.0 |
| Example 11 | 38.0 | 0.08 | 60.1 | 0.9 |
| Example 12 | 38.4 | 0.08 | 60.0 | 0.9 |
| Example 13 | 33.6 | 0.15 | 64.2 | 1.2 |
| Example 14 | 33.9 | 0.15 | 64.1 | 1.2 |
| Example 15 | 30.8 | 0.20 | 66.3 | 1.5 |
| Example 16 | 31.3 | 0.20 | 65.9 | 1.5 |
| Example 17 | 31.2 | 0.20 | 65.8 | 1.5 |
| Example 18 | 34.4 | 0.20 | 62.9 | 1.5 |
| Example 19 | 36.1 | 0.10 | 62.1 | 1.0 |
| Example 20 | 36.9 | 0.10 | 61.6 | 1.0 |
| Comparative Example 1 | 45.4 | 0.06 | 54.1 | 0.7 |
| Comparative Example 2 | 46.6 | 0.06 | 53.0 | 0.7 |
| Comparative Example 3 | 19.5 | 0.40 | 70.8 | 3.2 |
| Comparative Example 4 | 19.6 | 0.40 | 70.9 | 3.2 |
| Comparative Example 5 | Average particle diameter: 100 μm | | | |
| Comparative Example 6 | Average particle diameter: 50 μm | | | |

| Examples and Comparative Examples | Properties of iron particles and purifying agent | | |
|---|---|---|---|
| | BET specific surface (m²/g) | Crystallite size ($D_{110}$) (Å) A method | Crystallite size ($D_{110}$) (Å) B Method |
| Example 7 | 16 | 310 | 266 |
| Example 8 | 16 | 310 | 266 |
| Example 9 | 16 | 305 | 260 |
| Example 10 | 16 | 305 | 260 |
| Example 11 | 20 | 375 | 299 |
| Example 12 | 22 | 300 | 245 |
| Example 13 | 14 | 420 | 308 |
| Example 14 | 15 | 325 | 277 |
| Example 15 | 9 | 450 | 313 |
| Example 16 | 10 | 380 | 300 |
| Example 17 | 27 | 420 | 307 |
| Example 18 | 28 | 300 | 243 |
| Example 19 | 13 | 430 | 310 |
| Example 20 | 14 | 325 | 276 |
| Comparative Example 1 | 31 | 180 | 178 |
| Comparative Example 2 | 32 | 140 | 137 |
| Comparative Example 3 | 4 | 480 | 316 |
| Comparative Example 4 | 4 | 430 | 310 |
| Comparative Example 5 | 0.05 | 440 | 312 |
| Comparative Example 6 | 0.03 | 430 | 311 |

| Examples and Comparative Examples | Properties of iron particles and purifying agent | | |
|---|---|---|---|
| | Saturation magnetization value (σs) (Am²/kg) | (emu/g) | Fe content (wt. %) |
| Example 7 | 113 | 113 | 80.4 |
| Example 8 | 113 | 113 | 80.4 |
| Example 9 | 89 | 89 | 77.2 |
| Example 10 | 89 | 89 | 77.2 |
| Example 11 | 141 | 141 | 84.4 |
| Example 12 | 66 | 66 | 75.3 |
| Example 13 | 176 | 176 | 91.7 |
| Example 14 | 121 | 121 | 83.9 |
| Example 15 | 187 | 187 | 94.0 |
| Example 16 | 155 | 155 | 90.7 |
| Example 17 | 165 | 165 | 89.3 |
| Example 18 | 102 | 102 | 78.5 |
| Example 19 | 152 | 152 | 87.6 |
| Example 20 | 116 | 116 | 81.1 |
| Comparative Example 1 | 100 | 100 | 74.7 |
| Comparative Example 2 | 57 | 57 | 67.2 |
| Comparative Example 3 | 195 | 195 | 96.3 |
| Comparative Example 4 | 174 | 174 | 92.0 |

TABLE 3-continued

| Examples and Comparative Examples | | | |
|---|---|---|---|
| Comparative Example 5 | 204 | 204 | 98.2 |
| Comparative Example 6 | 208 | 208 | 98.3 |

| | Properties of iron particles and purifying agent | |
|---|---|---|
| Examples and Comparative Examples | α-Fe content (wt %) | Crystal phase |
| Example 7 | 92.0 | α-Fe and $Fe_3O_4$ mixed phase |
| Example 8 | 92.0 | α-Fe and $Fe_3O_4$ mixed phase |
| Example 9 | 85.7 | α-Fe and $Fe_3O_4$ mixed phase |
| Example 10 | 85.7 | α-Fe and $Fe_3O_4$ mixed phase |
| Example 11 | 96.2 | α-Fe and $Fe_3O_4$ mixed phase |
| Example 12 | 81.1 | α-Fe and $Fe_3O_4$ mixed phase |
| Example 13 | 99.0 | α-Fe and $Fe_3O_4$ mixed phase |
| Example 14 | 95.7 | α-Fe and $Fe_3O_4$ mixed phase |
| Example 15 | 99.5 | α-Fe and $Fe_3O_4$ mixed phase |
| Example 16 | 99.0 | α-Fe and $Fe_3O_4$ mixed phase |
| Example 17 | 98.4 | α-Fe and $Fe_3O_4$ mixed phase |
| Example 18 | 89.3 | α-Fe and $Fe_3O_4$ mixed phase |
| Example 19 | 97.4 | α-Fe and $Fe_3O_4$ mixed phase |
| Example 20 | 92.6 | α-Fe and $Fe_3O_4$ mixed phase |
| Comparative Example 1 | 79.5 | α-Fe and $Fe_3O_4$ mixed phase |
| Comparative Example 2 | 25.7 | α-Fe and $Fe_3O_4$ mixed phase |
| Comparative Example 3 | 99.5 | α-Fe and $Fe_3O_4$ mixed phase |
| Comparative Example 4 | 99.0 | α-Fe and $Fe_3O_4$ mixed phase |
| Comparative Example 5 | 100.0 | α-Fe |
| Comparative Example 6 | 100.0 | α-Fe |

| | Properties of iron particles and purifying agent | |
|---|---|---|
| Examples and Comparative Examples | X-ray diffraction intensity ratio ($D_{110}/(D_{311} + D_{110})$) | Condition |
| Example 7 | 0.85 | Iron particles |
| Example 8 | 0.85 | Purifying agent |
| Example 9 | 0.76 | Iron particles |
| Example 10 | 0.76 | Purifying agent |
| Example 11 | 0.92 | Purifying agent |
| Example 12 | 0.70 | Purifying agent |
| Example 13 | 0.97 | Purifying agent |
| Example 14 | 0.91 | Purifying agent |
| Example 15 | 0.98 | Purifying agent |
| Example 16 | 0.97 | Purifying agent |
| Example 17 | 0.96 | Purifying agent |
| Example 18 | 0.81 | Purifying agent |
| Example 19 | 0.94 | Purifying agent |
| Example 20 | 0.86 | Purifying agent |
| Comparative Example 1 | 0.68 | Purifying agent |
| Comparative Example 2 | 0.18 | Purifying agent |
| Comparative Example 3 | 0.98 | Purifying agent |
| Comparative Example 4 | 0.97 | Purifying agent |
| Comparative Example 5 | 1.00 | Iron particles |
| Comparative Example 6 | 1.00 | Iron particles |

TABLE 4

| Examples and Comparative Examples | Iron particles and purifying agent used | Condition |
|---|---|---|
| Example 21 | Example 7 | Iron particles |
| Example 22 | Example 8 | Purifying agent |
| Example 23 | Example 9 | Iron particles |
| Example 24 | Example 10 | Purifying agent |
| Example 25 | Example 11 | Purifying agent |
| Example 26 | Example 12 | Purifying agent |
| Example 27 | Example 13 | Purifying agent |
| Example 28 | Example 14 | Purifying agent |
| Example 29 | Example 15 | Purifying agent |
| Example 30 | Example 16 | Purifying agent |
| Example 31 | Example 17 | Purifying agent |
| Example 32 | Example 18 | Purifying agent |
| Example 33 | Example 19 | Purifying agent |
| Example 34 | Example 20 | Purifying agent |
| Comparative Example 7 | Comparative Example 1 | Purifying agent |
| Comparative Example 8 | Comparative Example 2 | Purifying agent |
| Comparative Example 9 | Comparative Example 3 | Purifying agent |
| Comparative Example 10 | Comparative Example 4 | Purifying agent |
| Comparative Example 11 | Comparative Example 5 | Iron particles |
| Comparative Example 12 | Comparative Example 6 | Iron particles |

| | Treatment of contaminated soil | |
|---|---|---|
| Examples and Comparative Examples | Contaminants | Residual percentage (%) |
| Example 21 | Trichloroethylene | 9 |
| Example 22 | Trichloroethylene | 8 |
| Example 23 | Trichloroethylene | 10 |
| Example 24 | Trichloroethylene | 9 |
| Example 25 | Trichloroethylene | 11 |
| Example 26 | Trichloroethylene | 30 |
| Example 27 | Trichloroethylene | 6 |
| Example 28 | Trichloroethylene | 6 |
| Example 29 | Trichloroethylene | 37 |
| Example 30 | Trichloroethylene | 36 |
| Example 31 | Trichloroethylene | 24 |
| Example 32 | Trichloroethylene | 37 |
| Example 33 | Trichloroethylene | 10 |
| Example 34 | Trichloroethylene | 9 |
| Comparative Example 7 | Trichloroethylene | 56 |
| Comparative Example 8 | Trichloroethylene | 71 |
| Comparative Example 9 | Trichloroethylene | 67 |
| Comparative Example 10 | Trichloroethylene | 68 |
| Comparative Example 11 | Trichloroethylene | 73 |
| Comparative Example 12 | Trichloroethylene | 74 |

| | Treatment of contaminated ground water | |
|---|---|---|
| Examples and Comparative Examples | Contaminants | Residual percentage (%) |
| Example 21 | Trichloroethylene | 6 |
| Example 22 | Trichloroethylene | 5 |
| Example 23 | Trichloroethylene | 6 |
| Example 24 | Trichloroethylene | 5 |
| Example 25 | Trichloroethylene | 16 |
| Example 26 | Trichloroethylene | 28 |
| Example 27 | Trichloroethylene | 11 |
| Example 28 | Trichloroethylene | 6 |
| Example 29 | Trichloroethylene | 38 |
| Example 30 | Trichloroethylene | 32 |
| Example 31 | Trichloroethylene | 27 |

TABLE 4-continued

| | | |
|---|---|---|
| Example 32 | Trichloroethylene | 33 |
| Example 33 | Trichloroethylene | 16 |
| Example 34 | Trichloroethylene | 7 |
| Comparative Example 7 | Trichloroethylene | 58 |
| Comparative Example 8 | Trichloroethylene | 68 |
| Comparative Example 9 | Trichloroethylene | 70 |
| Comparative Example 10 | Trichloroethylene | 65 |
| Comparative Example 11 | Trichloroethylene | 70 |
| Comparative Example 12 | Trichloroethylene | 71 |

TABLE 5

| Examples and Comparative Examples | Kind of goethite particles used | Reducing temperature (°C.) | Retention time in water (day) |
|---|---|---|---|
| Example 35 | Goethite particles 4 | 450 | 20 |
| Example 36 | Goethite particles 4 | 450 | 30 |
| Example 37 | Goethite particles 4 | 400 | 0 |
| Example 38 | Goethite particles 4 | 500 | 0 |
| Example 39 | Goethite particles 4 | 550 | 0 |
| Comparative Example 13 | Goethite particles 4 | 450 | 0 |
| Comparative Example 14 | Goethite particles 4 | 300 | 0 |

TABLE 6

| | Properties of iron particles | | | |
|---|---|---|---|---|
| Examples and Comparative Examples | Average particle diameter (μm) | BET specific surface area (m²/g) | Crystallite size ($D_{110}$) (Å) A Method | Crystallite size ($D_{110}$) (Å) B Method |
| Example 35 | 0.10 | 20 | 325 | 278 |
| Example 36 | 0.10 | 20 | 310 | 266 |
| Example 37 | 0.08 | 22 | 370 | 297 |
| Example 38 | 0.15 | 16 | 390 | 303 |
| Example 39 | 0.20 | 11 | 400 | 306 |
| Comparative Example 13 | 0.10 | 16 | 395 | 304 |
| Comparative Example 14 | 0.15 | 55 | 190 | 185 |

| | Properties of iron particles | | | |
|---|---|---|---|---|
| Examples and Comparative Examples | Saturation magnetization value (σs) Am²/kg | Saturation magnetization value (σs) emu/g | Fe content (wt. %) | α-Fe content (wt. %) |
| Example 35 | 129 | 129 | 84.6 | 96.2 |
| Example 36 | 114 | 114 | 80.1 | 91.3 |
| Example 37 | 155 | 155 | 87.6 | 97.9 |
| Example 38 | 172 | 172 | 90.4 | 98.4 |
| Example 39 | 178 | 178 | 92.1 | 99.0 |
| Comparative Example 13 | 156 | 156 | 86.7 | 97.9 |
| Comparative Example 14 | 85 | 85 | 68.9 | 27.0 |

| | Properties of iron particles | | |
|---|---|---|---|
| Examples and Comparative Examples | S content (ppm) | Crystal phase | X-ray diffraction intensity ratio ($D_{110}/(D_{311} + D_{110})$) |
| Example 35 | 2,000 | α-Fe and $Fe_3O_4$ mixed phase | 0.92 |
| Example 36 | 2,000 | α-Fe and $Fe_3O_4$ mixed phase | 0.84 |
| Example 37 | 3,000 | α-Fe and $Fe_3O_4$ mixed phase | 0.95 |
| Example 38 | 2,500 | α-Fe and $Fe_3O_4$ mixed phase | 0.96 |
| Example 39 | 3,500 | α-Fe and $Fe_3O_4$ mixed phase | 0.97 |
| Comparative Example 13 | 180 | α-Fe and $Fe_3O_4$ mixed phase | 0.95 |
| Comparative Example 14 | 2,000 | α-Fe and $Fe_3O_4$ mixed phase | 0.19 |

TABLE 7

| Examples and Comparative Examples | Kind of Iron particles and purifying agent used | Condition |
|---|---|---|
| Example 40 | Example 35 | Purifying agent |
| Example 41 | Example 36 | Purifying agent |
| Example 42 | Example 37 | Purifying agent |
| Example 43 | Example 37 | Purifying agent |
| Example 44 | Example 38 | Iron particles |
| Example 45 | Example 38 | Iron particles |
| Example 46 | Example 39 | Purifying agent |
| Example 47 | Example 39 | Purifying agent |
| Comparative Example 15 | Comparative Example 13 | Purifying agent |
| Comparative Example 16 | Comparative Example 13 | Purifying agent |
| Comparative Example 17 | Comparative Example 14 | Purifying agent |
| Comparative Example 18 | Comparative Example 14 | Purifying agent |

| Examples and Comparative Examples | Object to be treated | TCB residual percentage (%) |
|---|---|---|
| Example 40 | Soil | 22.2 |
| Example 41 | Soil | 23.7 |
| Example 42 | Soil | 21.6 |
| Example 43 | Ground water | 22.7 |
| Example 44 | Soil | 26.1 |
| Example 45 | Ground water | 28.0 |
| Example 46 | Soil | 22.3 |
| Example 47 | Ground water | 22.8 |
| Comparative Example 15 | Soil | 48.7 |
| Comparative Example 16 | Ground water | 49.2 |
| Comparative Example 17 | Soil | 70.2 |
| Comparative Example 18 | Ground water | 70.8 |

TABLE 8

| Examples and Comparative Examples | Kind of goethite particles used | Heat-dehydrating temperature (°C.) | Average particle diameter of hematite (μm) |
|---|---|---|---|
| Example 48 | Goethite particles 5 | 300 | 0.25 |
| Example 49 | Goethite particles 5 | 300 | 0.25 |
| Example 50 | Goethite particles 5 | 350 | 0.24 |
| Example 51 | Goethite particles 5 | 280 | 0.26 |

TABLE 8-continued

| Example | | | |
|---|---|---|---|
| Example 52 | Goethite particles 6 | 330 | 0.27 |
| Example 53 | Goethite particles 6 | 260 | 0.28 |
| Example 54 | Goethite particles 6 | 350 | 0.26 |
| Example 55 | Goethite particles 6 | — | — |
| Comparative Example 19 | Goethite particles 5 | 300 | 0.25 |

| Examples and Comparative Examples | Amount of sulfuric acid added (ml/kg) | S content (ppm) | Reducing temperature (° C.) |
|---|---|---|---|
| Example 48 | 10 | 3,300 | 400 |
| Example 49 | 10 | 3,300 | 450 |
| Example 50 | 21 | 6,600 | 500 |
| Example 51 | 21 | 6,600 | 450 |
| Example 52 | 12 | 7,800 | 400 |
| Example 53 | 12 | 7,800 | 360 |
| Example 54 | — | 4,500 | 500 |
| Example 55 | — | 4,500 | 370 |
| Comparative Example 19 | 10 | 3,300 | 250 |

| Examples and Comparative Examples | Retention time in water (day) | Condition |
|---|---|---|
| Example 48 | 0 | Iron particles |
| Example 49 | 0 | Purifying agent |
| Example 50 | 4 | Purifying agent |
| Example 51 | 30 | Purifying agent |
| Example 52 | 0 | Iron particles |
| Example 53 | 0 | Purifying agent |
| Example 54 | 4 | Purifying agent |
| Example 55 | 30 | Purifying agent |
| Comparative Example 19 | 0 | Purifying agent |

TABLE 9

| Examples and Comparative Examples | Properties of iron particles | | |
|---|---|---|---|
| | Average particle diameter (μm) | BET specific surface area (m²/g) | S content (ppm) |
| Example 48 | 0.08 | 28 | 4,000 |
| Example 49 | 0.10 | 24 | 4,000 |
| Example 50 | 0.15 | 8 | 8,000 |
| Example 51 | 0.11 | 26 | 8,000 |
| Example 52 | 0.12 | 18 | 9,500 |
| Example 53 | 0.10 | 30 | 9,500 |
| Example 54 | 0.17 | 7 | 5,500 |
| Example 55 | 0.12 | 27 | 5,500 |
| Comparative Example 19 | 0.15 | 61 | 4,000 |
| Comparative Example 20 | 0.25 | 54 | 5,500 |

| Examples and Comparative Examples | Properties of iron particles | | |
|---|---|---|---|
| | Crystallite size($D_{110}$) B Method (Å) | Saturation magnetization ($\sigma s$) Am²/kg | emu/g |
| Example 48 | 290 | 160 | 160 |
| Example 49 | 298 | 167 | 167 |
| Example 50 | 309 | 169 | 169 |
| Example 51 | 280 | 140 | 140 |
| Example 52 | 302 | 161 | 161 |
| Example 53 | 205 | 97 | 97 |
| Example 54 | 301 | 171 | 171 |
| Example 55 | 201 | 96 | 96 |
| Comparative Example 19 | 184 | 81 | 81 |
| Comparative Example 20 | — | 78 | 78 |

| Examples and Comparative Examples | Properties of iron particles | | |
|---|---|---|---|
| | Fe content (wt. %) | α-Fe content (wt. %) | Crystal phase |
| Example 48 | 85.2 | 95.7 | α-Fe and $Fe_3O_4$ mixed phase |
| Example 49 | 86.0 | 97.4 | α-Fe and $Fe_3O_4$ mixed phase |
| Example 50 | 90.7 | 99.0 | α-Fe and $Fe_3O_4$ mixed phase |
| Example 51 | 77.4 | 87.2 | α-Fe and $Fe_3O_4$ mixed phase |
| Example 52 | 81.8 | 95.1 | α-Fe and $Fe_3O_4$ mixed phase |
| Example 53 | 67.2 | 43.3 | α-Fe and $Fe_3O_4$ mixed phase |
| Example 54 | 92.4 | 99.0 | α-Fe and $Fe_3O_4$ mixed phase |
| Example 55 | 66.8 | 40.9 | α-Fe and $Fe_3O_4$ mixed phase |
| Comparative Example 19 | 65.4 | 27.0 | α-Fe and $Fe_3O_4$ mixed phase |
| Comparative Example 20 | 63.8 | — | $Fe_3O_4$ single phase |

| Examples and Comparative Examples | Properties of iron particles | |
|---|---|---|
| | X-ray diffraction intensity ratio ($D_{110}/(D_{311} + D_{110})$) | Condition |
| Example 48 | 0.91 | Iron particles |
| Example 49 | 0.94 | Purifying agent |
| Example 50 | 0.97 | Purifying agent |
| Example 51 | 0.78 | Purifying agent |
| Example 52 | 0.90 | Iron particles |
| Example 53 | 0.32 | Purifying agent |
| Example 54 | 0.97 | Purifying agent |
| Example 55 | 0.30 | Purifying agent |
| Comparative Example 19 | 0.19 | Purifying agent |
| Comparative Example 20 | — | Iron particles |

TABLE 10

| Examples and Comparative Examples | Kind of Iron particles and purifying agent used | Condition |
|---|---|---|
| Example 56 | Example 49 | Iron particles |
| Example 57 | Example 50 | Purifying agent |
| Example 58 | Example 51 | Purifying agent |
| Example 59 | Example 52 | Purifying agent |
| Example 60 | Example 53 | Iron particles |
| Example 61 | Example 54 | Purifying agent |
| Example 62 | Example 55 | Purifying agent |
| Example 63 | Example 56 | Purifying agent |
| Comparative Example 21 | Comparative Example 19 | Purifying agent |
| Comparative Example 22 | Comparative Example 20 | Iron particles |

| Examples and Comparative Examples | Treatment of contaminated soil | |
|---|---|---|
| | Contaminants | residual percentage (%) |
| Example 56 | Trichloroethylene | 2.7 |
| Example 57 | Trichlorobenzene | 15.1 |

TABLE 10-continued

| | | |
|---|---|---|
| Example 58 | Trichlorobenzene | 11.3 |
| Example 59 | Trichloroethylene | 2.3 |
| Example 60 | Trichlorobenzene | 14.7 |
| Example 61 | Trichloroethylene | 4.8 |
| Example 62 | Trichloroethylene | 0.5 |
| Example 63 | Trichlorobenzene | 18.9 |
| Comparative Example 21 | Trichloroethylene | 34.4 |
| Comparative Example 22 | Trichloroethylene | 83.7 |

| Examples and Comparative Examples | Treatment of contaminated ground water | |
|---|---|---|
| | Contaminants | Residual percentage (%) |
| Example 56 | Trichloroethylene | 3.1 |
| Example 57 | Trichlorobenzene | 16.6 |
| Example 58 | Trichlorobenzene | 13.0 |
| Example 59 | Trichloroethylene | 2.6 |
| Example 60 | Trichlorobenzene | 16.2 |
| Example 61 | Trichloroethylene | 5.0 |
| Example 62 | Trichloroethylene | 0.8 |
| Example 63 | Trichlorobenzene | 19.9 |
| Comparative Example 21 | Trichloroethylene | 35.8 |
| Comparative Example 22 | Trichloroethylene | 85.2 |

TABLE 11

| Iron particles | Kind of goethite particles used | Heat-dehydrating temperature (°C.) | Average particle diameter of hematite (μm) |
|---|---|---|---|
| Iron particles 1 | Goethite particles 7 | 330 | 0.25 |
| Iron particles 2 | Goethite particles 7 | 350 | 0.24 |
| Iron particles 3 | Goethite particles 7 | 300 | 0.25 |
| Iron particles 4 | Goethite particles 7 | 330 | 0.25 |
| Iron particles 5 | Goethite particles 8 | 350 | 0.24 |

| Iron particles | Amount of sulfuric acid added (ml/kg) | S content (ppm) | Reducing temperature (°C.) |
|---|---|---|---|
| Iron particles 1 | 4 | 2,100 | 450 |
| Iron particles 2 | 4 | 2,100 | 480 |
| Iron particles 3 | 2 | 1,500 | 400 |
| Iron particles 4 | 4 | 2,100 | 370 |
| Iron particles 5 | — | 2,200 | 500 |

TABLE 12

| Examples | Kind of iron particles used | Content of iron particles (wt. %) |
|---|---|---|
| Example 64 | Iron particles 2 | 25 |
| Example 65 | Iron particles 2 | 30 |
| Example 66 | Iron particles 3 | 25 |
| Example 67 | Iron particles 4 | 30 |
| Example 68 | Iron particles 5 | 30 |

TABLE 12-continued

| | Coarse pulverization | |
|---|---|---|
| Examples | Apparatus | Treating method |
| Example 64 | T. K. Homodisper | 3,600 rpm; 60 min |
| Example 65 | T. K. Homodisper | 3,600 rpm; 30 min |
| Example 66 | T. K. Homodisper | 3,600 rpm; 30 min |
| Example 67 | T. K. Homodisper | 3,600 rpm; 30 min |
| Example 68 | T. K. Homodisper | 3,600 rpm; 30 min |

| | Minute pulverization | |
|---|---|---|
| Examples | Apparatus | Treating method |
| Example 64 | T. K. Homomic Line Mill | 5,000 rpm |
| Example 65 | T. K. Homomic Line Mill | 4,000 rpm |
| Example 66 | T. K. Homomic Line Mill | 4,000 rpm |
| Example 67 | T. K. Homomic Line Mill | 4,000 rpm |
| Example 68 | T. K. Homomic Line Mill | 4,000 rpm |

| | Fine pulverization | |
|---|---|---|
| Examples | Apparatus | Treating method |
| Example 64 | Sand grinder | 700 rpm |
| Example 65 | Sand grinder | 500 rpm |
| Example 66 | Sand grinder | 500 rpm |
| Example 67 | Sand grinder | 500 rpm |
| Example 68 | Sand grinder | 500 rpm |

TABLE 13

| Examples | Specific gravity of purifying agent (—) | Solid content of purifying agent (wt. %) |
|---|---|---|
| Example 64 | 1.21 | 25 |
| Example 65 | 1.25 | 30 |
| Example 66 | 1.21 | 25 |
| Example 67 | 1.25 | 30 |
| Example 68 | 1.25 | 30 |

| | Particle size distribution | | | |
|---|---|---|---|---|
| Examples | Number of peak (—) | Median diameter ($D_{50}$) (μm) | Ratio of $D_{90}/D_{10}$ (—) | Distribution width ($D_{84} - D_{16}$) (μm) |
| Example 64 | 1 | 1.95 | 2.22 | 1.21 |
| Example 65 | 1 | 2.31 | 1.89 | 1.13 |
| Example 66 | 1 | 1.88 | 2.23 | 1.18 |
| Example 67 | 1 | 2.12 | 1.84 | 1.13 |
| Example 68 | 1 | 2.55 | 1.95 | 1.24 |

| | Size of primary particles | | | |
|---|---|---|---|---|
| Examples | Average major axis diameter (μm) | Aspect ratio (—) | BET specific surface area (m²/g) | Shape (—) |
| Example 64 | 0.15 | 1.5:1 | 22 | Rice grain-shaped |
| Example 65 | 0.15 | 1.5:1 | 23 | Rice grain-shaped |
| Example 66 | 0.10 | 1.7:1 | 25 | Rice grain-shaped |
| Example 67 | 0.11 | 1.7:1 | 29 | Rice grain-shaped |
| Example 68 | 0.17 | 1.4:1 | 8 | Rice grain-shaped |

TABLE 14

Properties of iron particles contained in purifying agent

| Examples | S content (ppm) | Crystallite size ($D_{110}$) B Method (Å) |
|---|---|---|
| Example 64 | 2,900 | 299 |
| Example 65 | 2,900 | 300 |
| Example 66 | 1,900 | 287 |
| Example 67 | 2,900 | 295 |
| Example 68 | 3,100 | 301 |

Properties of iron particles contained in purifying agent

| Examples | Saturation magnetization ($\sigma s$) Am²/kg | emu/g | Fe content (wt. %) | α-Fe content (wt. %) |
|---|---|---|---|---|
| Example 64 | 160 | 160 | 86.4 | 97.9 |
| Example 65 | 161 | 161 | 87.0 | 98.4 |
| Example 66 | 143 | 143 | 78.4 | 90.0 |
| Example 67 | 115 | 115 | 69.9 | 54.7 |
| Example 68 | 169 | 169 | 90.2 | 98.4 |

Properties of iron particles contained in purifying agent

| Examples | Crystal phase | X-ray diffraction intensity ratio ($D_{110}/(D_{311} + D_{110})$) |
|---|---|---|
| Example 64 | α-Fe and $Fe_3O_4$ mixed phase | 0.95 |
| Example 65 | α-Fe and $Fe_3O_4$ mixed phase | 0.96 |
| Example 66 | α-Fe and $Fe_3O_4$ mixed phase | 0.82 |
| Example 67 | α-Fe and $Fe_3O_4$ mixed phase | 0.42 |
| Example 68 | α-Fe and $Fe_3O_4$ mixed phase | 0.96 |

TABLE 15

Treatment of contaminated soil

| Examples | Kind of purifying agent used | Contaminants | Residual percentage (%) |
|---|---|---|---|
| Example 69 | Example 65 | Trichloroethylene | 2.4 |
| Example 70 | Example 66 | Trichlorobenzene | 16.8 |
| Example 71 | Example 67 | Trichlorobenzene | 19.2 |
| Example 72 | Example 68 | Trichloroethylene | 4.3 |
| Example 73 | Example 69 | Trichloroethylene | 2.1 |

Treatment of contaminated ground water

| Examples | Contaminants | Residual percentage (%) |
|---|---|---|
| Example 69 | Trichloroethylene | 3.2 |
| Example 70 | Trichlorobenzene | 17.7 |
| Example 71 | Trichlorobenzene | 20.8 |
| Example 72 | Trichloroethylene | 5.0 |
| Example 73 | Trichloroethylene | 2.9 |

TABLE 16

| Examples | Kind of goethite particles used | Heat-dehydrating temperature (° C.) | Average particle diameter of hematite (μm) |
|---|---|---|---|
| Example 74 | Goethite particles 7 | 360 | 0.24 |
| Example 75 | Goethite particles 7 | 310 | 0.26 |
| Example 76 | Goethite particles 7 | 320 | 0.25 |
| Example 77 | Goethite particles 8 | 340 | 0.23 |
| Example 78 | Goethite particles 8 | — | — |

| Examples | Amount of sulfuric acid added (ml/kg) | S content (ppm) | Reducing temperature (° C.) |
|---|---|---|---|
| Example 74 | 4 | 2,100 | 480 |
| Example 75 | 2 | 1,500 | 410 |
| Example 76 | 4 | 2,100 | 370 |
| Example 77 | — | 2,200 | 500 |
| Example 78 | — | 2,200 | 440 |

TABLE 17

Properties of iron particles

| Examples | Average particle diameter (μm) | BET specific surface area (m²/g) | S content (ppm) |
|---|---|---|---|
| Example 74 | 0.15 | 23 | 2,900 |
| Example 75 | 0.10 | 26 | 1,900 |
| Example 76 | 0.12 | 29 | 2,900 |
| Example 77 | 0.17 | 9 | 3,100 |
| Example 78 | 0.14 | 19 | 3,100 |

Properties of iron particles

| Examples | Crystallite size ($D_{110}$) B Method (Å) | Saturation magnetization ($\sigma s$) Am²/kg | emu/g |
|---|---|---|---|
| Example 74 | 301 | 162 | 162 |
| Example 75 | 286 | 143 | 143 |
| Example 76 | 295 | 115 | 115 |
| Example 77 | 302 | 169 | 169 |
| Example 78 | 295 | 159 | 159 |

Properties of iron particles

| Examples | Fe content (wt. %) | α-Fe content (wt. %) | Crystal phase |
|---|---|---|---|
| Example 74 | 87.3 | 98.4 | α-Fe and $Fe_3O_4$ mixed phase |
| Example 75 | 78.4 | 89.3 | α-Fe and $Fe_3O_4$ mixed phase |
| Example 76 | 69.8 | 54.7 | α-Fe and $Fe_3O_4$ mixed phase |
| Example 77 | 92.5 | 99.0 | α-Fe and $Fe_3O_4$ mixed phase |
| Example 78 | 85.9 | 97.4 | α-Fe and $Fe_3O_4$ mixed phase |

Properties of iron particles

| Examples | X-ray diffraction intensity ratio ($D_{110}/(D_{311} + D_{110})$) | Condition |
|---|---|---|
| Example 74 | 0.96 | Iron particles |

TABLE 17-continued

| | | |
|---|---|---|
| Example 75 | 0.81 | Purifying agent |
| Example 76 | 0.42 | Purifying agent |
| Example 77 | 0.97 | Purifying agent |
| Example 78 | 0.94 | Iron particles |

TABLE 18

Results of elution test of iron particles

| Examples | Cadmium elution (mg/l) | Whole cyanogen elution (mg/l) | Lead elution (mg/l) |
|---|---|---|---|
| Example 74 | >0.001 | Not detected | >0.001 |
| Example 75 | >0.001 | Not detected | >0.001 |
| Example 76 | >0.001 | Not detected | >0.001 |
| Example 77 | >0.001 | Not detected | >0.001 |
| Example 78 | >0.001 | Not detected | >0.001 |

Results of elution test of iron particles

| Examples | Chromium (VI) elution (mg/l) | Arsenic elution (mg/l) | Whole mercury elution (mg/l) |
|---|---|---|---|
| Example 74 | >0.001 | >0.001 | >0.0005 |
| Example 75 | >0.001 | >0.001 | >0.0005 |
| Example 76 | >0.001 | >0.001 | >0.0005 |
| Example 77 | >0.001 | >0.001 | >0.0005 |
| Example 78 | >0.001 | >0.001 | >0.0005 |

Results of elution test of iron particles

| Examples | Selenium elution (mg/l) | Fluorine elution (mg/l) | Boron elution (mg/l) |
|---|---|---|---|
| Example 74 | >0.001 | >0.5 | >0.1 |
| Example 75 | >0.001 | >0.5 | >0.1 |
| Example 76 | >0.001 | >0.5 | >0.1 |
| Example 77 | >0.001 | >0.5 | >0.1 |
| Example 78 | >0.001 | >0.5 | >0.1 |

TABLE 19

| Examples | Kind of iron particles and purifying agent used | Condition |
|---|---|---|
| Example 79 | Example 75 | Iron particles |
| Example 80 | Example 76 | Purifying agent |
| Example 81 | Example 77 | Purifying agent |
| Example 82 | Example 78 | Purifying agent |
| Example 83 | Example 79 | Iron particles |

Treatment of contaminated soil

| Examples | Contaminants | Residual percentage (%) |
|---|---|---|
| Example 79 | Trichloroethylene | 2.5 |
| Example 80 | Trichlorobenzene | 19.1 |
| Example 81 | Trichloroethylene | 4.1 |
| Example 82 | Trichloroethylene | 2.5 |
| Example 83 | Trichlorobenzene | 18.8 |

Treatment of contaminated ground water

| Examples | Contaminants | Residual percentage (%) |
|---|---|---|
| Example 79 | Trichloroethylene | 3.5 |
| Example 80 | Trichlorobenzene | 20.8 |
| Example 81 | Trichloroethylene | 4.9 |
| Example 82 | Trichloroethylene | 3.9 |
| Example 83 | Trichlorobenzene | 19.8 |

TABLE 20

| Examples and Comparative Examples | Kind of goethite particles used | Heat-dehydrating temperature (° C.) | Average particle diameter of hematite (μm) |
|---|---|---|---|
| Example 84 | Goethite particles 5 | 300 | 0.24 |
| Example 85 | Goethite particles 5 | 300 | 0.24 |
| Example 86 | Goethite particles 5 | 350 | 0.23 |
| Example 87 | Goethite particles 5 | 280 | 0.25 |
| Example 88 | Goethite particles 6 | 330 | 0.28 |
| Example 89 | Goethite particles 6 | 260 | 0.29 |
| Example 90 | Goethite particles 6 | 350 | 0.27 |
| Example 91 | Goethite particles 6 | — | — |
| Comparative Example 23 | Goethite particles 5 | 300 | 0.25 |

| Examples and Comparative Examples | Amount of sulfuric acid added (ml/kg) | S content (ppm) | Reducing temperature (° C.) |
|---|---|---|---|
| Example 84 | 10 | 3,100 | 400 |
| Example 85 | 10 | 3,100 | 450 |
| Example 86 | 21 | 6,400 | 500 |
| Example 87 | 21 | 6,400 | 450 |
| Example 88 | 12 | 7,700 | 400 |
| Example 89 | 12 | 7,700 | 360 |
| Example 90 | — | 4,400 | 500 |
| Example 91 | — | 4,400 | 370 |
| Comparative Example 23 | 10 | 3,300 | 230 |

| Examples and Comparative Examples | Retention time in water (day) | Condition |
|---|---|---|
| Example 84 | 0 | Iron particles |
| Example 85 | 0 | Purifying agent |
| Example 86 | 4 | Purifying agent |
| Example 87 | 30 | Purifying agent |
| Example 88 | 0 | Iron particles |
| Example 89 | 0 | Purifying agent |
| Example 90 | 4 | Purifying agent |
| Example 91 | 30 | Purifying agent |
| Comparative Example 23 | 0 | Purifying agent |

TABLE 21

Properties of iron particles

| Examples and Comparative Examples | Average particle diameter (μm) | BET specific surface area (m²/g) | S content (ppm) |
|---|---|---|---|
| Example 84 | 0.07 | 29 | 3,800 |
| Example 85 | 0.10 | 25 | 3,800 |
| Example 86 | 0.14 | 7 | 7,800 |
| Example 87 | 0.11 | 26 | 7,800 |
| Example 88 | 0.13 | 17 | 9,300 |
| Example 89 | 0.11 | 32 | 9,300 |
| Example 90 | 0.18 | 6 | 5,400 |
| Example 91 | 0.12 | 27 | 5,400 |

TABLE 21-continued

| | | | |
|---|---|---|---|
| Comparative Example 23 | 0.09 | 28 | 3,800 |

Properties of iron particles

| Examples and Comparative Examples | Crystallite size($D_{110}$) B Method (Å) | Saturation magnetization ($\sigma s$) Am²/kg | emu/g |
|---|---|---|---|
| Example 84 | 287 | 158 | 158 |
| Example 85 | 297 | 166 | 166 |
| Example 86 | 306 | 170 | 170 |
| Example 87 | 275 | 137 | 137 |
| Example 88 | 304 | 162 | 162 |
| Example 89 | 207 | 96 | 96 |
| Example 90 | 300 | 169 | 169 |
| Example 91 | 202 | 95 | 95 |
| Comparative Example 23 | 181 | 79 | 79 |

Properties of iron particles

| Examples and Comparative Examples | Fe content (wt. %) | α-Fe content (wt. %) | Crystal phase |
|---|---|---|---|
| Example 84 | 82.9 | 95.1 | α-Fe and $Fe_3O_4$ mixed phase |
| Example 85 | 84.0 | 96.2 | α-Fe and $Fe_3O_4$ mixed phase |
| Example 86 | 91.8 | 99.0 | α-Fe and $Fe_3O_4$ mixed phase |
| Example 87 | 77.8 | 84.3 | α-Fe and $Fe_3O_4$ mixed phase |
| Example 88 | 82.1 | 95.1 | α-Fe and $Fe_3O_4$ mixed phase |
| Example 89 | 68.3 | 42.1 | α-Fe and $Fe_3O_4$ mixed phase |
| Example 90 | 87.1 | 98.4 | α-Fe and $Fe_3O_4$ mixed phase |
| Example 91 | 67.8 | 40.9 | α-Fe and $Fe_3O_4$ mixed phase |
| Comparative Example 23 | 65.9 | 21.6 | α-Fe and $Fe_3O_4$ mixed phase |

Properties of iron particles

| Examples and Comparative Examples | X-ray diffraction intensity ratio ($D_{110}/(D_{311} + D_{110})$) | Condition |
|---|---|---|
| Example 84 | 0.90 | Iron particles |
| Example 85 | 0.92 | Purifying agent |
| Example 86 | 0.97 | Purifying agent |
| Example 87 | 0.74 | Purifying agent |
| Example 88 | 0.90 | Iron particles |
| Example 89 | 0.31 | Purifying agent |
| Example 90 | 0.96 | Purifying agent |
| Example 91 | 0.30 | Purifying agent |
| Comparative Example 23 | 0.15 | Purifying agent |

TABLE 22

| Examples and Comparative Examples | Kind of iron particles and purifying agent used | Condition | Purification treatment of contaminated soil Contaminants |
|---|---|---|---|
| Example 92 | Example 85 | Iron particles | Cd, Pb, $Cr^{6+}$, As, Se, CN |
| Example 93 | Example 86 | Purifying agent | Cd, Pb, $Cr^{6+}$, As, Se, CN |
| Example 94 | Example 87 | Purifying agent | Cd, Pb, $Cr^{6+}$, As, Se, CN |
| Example 95 | Example 88 | Purifying agent | Cd, Pb, $Cr^{6+}$, As, Se, CN |
| Example 96 | Example 89 | Iron particles | Cd, Pb, $Cr^{6+}$, As, Se, CN |
| Example 97 | Example 90 | Purifying agent | Cd, Pb, $Cr^{6+}$, As, Se, CN |
| Example 98 | Example 91 | Purifying agent | Cd, Pb, $Cr^{6+}$, As, Se, CN |
| Example 99 | Example 92 | Purifying agent | Cd, Pb, $Cr^{6+}$, As, Se, CN |
| Comparative Example 24 | Comparative Example 23 | Purifying agent | Cd, Pb, $Cr^{6+}$, As, Se, CN |

| Examples and Comparative Examples | Purification treatment of contaminated soil Amount of elements contained in treated solution (mg/l) | | | | | |
|---|---|---|---|---|---|---|
| | Cd | Pb | $Cr^{6+}$ | As | Se | CN |
| Example 92 | >0.001 | >0.005 | >0.004 | >0.001 | >0.002 | Not detected |
| Example 93 | >0.001 | >0.005 | >0.004 | >0.001 | >0.002 | Not detected |
| Example 94 | >0.001 | >0.005 | >0.004 | >0.001 | >0.002 | Not detected |
| Example 95 | >0.001 | >0.005 | >0.004 | >0.001 | >0.002 | Not detected |
| Example 96 | >0.001 | >0.005 | >0.004 | >0.001 | >0.002 | Not detected |
| Example 97 | >0.001 | >0.005 | >0.004 | >0.001 | >0.002 | Not detected |
| Example 98 | >0.001 | >0.005 | >0.004 | >0.001 | >0.002 | Not detected |
| Example 99 | >0.001 | >0.005 | >0.004 | >0.001 | >0.002 | Not detected |
| Comparative Example 24 | 2.2 | 2.0 | 1.9 | 2.4 | 3.0 | 3.5 |

| Examples and Comparative Examples | Purification treatment of contaminated soil Amount of elements re-eluted from solid (mg/l) | | | | | |
|---|---|---|---|---|---|---|
| | Cd | Pb | $Cr^{6+}$ | As | Se | CN |
| Example 92 | >0.001 | >0.005 | >0.004 | >0.001 | >0.002 | Not detected |
| Example 93 | >0.001 | >0.005 | >0.004 | >0.001 | >0.002 | Not detected |
| Example 94 | >0.001 | >0.005 | >0.004 | >0.001 | >0.002 | Not detected |
| Example 95 | >0.001 | >0.005 | >0.004 | >0.001 | >0.002 | Not detected |
| Example 96 | >0.001 | >0.005 | >0.004 | >0.001 | >0.002 | Not detected |
| Example 97 | >0.001 | >0.005 | >0.004 | >0.001 | >0.002 | Not detected |
| Example 98 | >0.001 | >0.005 | >0.004 | >0.001 | >0.002 | Not detected |
| Example 99 | >0.001 | >0.005 | >0.004 | >0.001 | >0.002 | Not detected |
| Comparative Example 24 | 1.1 | 0.9 | 0.4 | 0.3 | 0.9 | 1.2 |

TABLE 23

| Examples and Comparative Examples | Kind of iron particles and purifying agent used | Condition | Purification treatment of contaminated ground water Contaminants |
|---|---|---|---|
| Example 92 | Example 85 | Iron particles | Cd, Pb, $Cr^{6+}$, As, Se, CN |
| Example 93 | Example 86 | Purifying agent | Cd, Pb, $Cr^{6+}$, As, Se, CN |

TABLE 23-continued

| Examples and Comparative Examples | | | |
|---|---|---|---|
| Example 94 | Example 87 | Purifying agent | Cd, Pb, Cr$^{6+}$, As, Se, CN |
| Example 95 | Example 88 | Purifying agent | Cd, Pb, Cr$^{6+}$, As, Se, CN |
| Example 96 | Example 89 | Iron particles | Cd, Pb, Cr$^{6+}$, As, Se, CN |
| Example 97 | Example 90 | Purifying agent | Cd, Pb, Cr$^{6+}$, As, Se, CN |
| Example 98 | Example 91 | Purifying agent | Cd, Pb, Cr$^{6+}$, As, Se, CN |
| Example 99 | Example 92 | Purifying agent | Cd, Pb, Cr$^{6+}$, As, Se, CN |
| Comparative Example 24 | Comparative Example 23 | Purifying agent | Cd, Pb, Cr$^{6+}$, As, Se, CN |

Purification treatment of contaminated ground water
Amount of elements contained in treated solution (mg/l)

| Examples | Cd | Pb | Cr$^{6+}$ | As | Se | CN |
|---|---|---|---|---|---|---|
| Example 92 | >0.001 | >0.005 | >0.004 | >0.001 | >0.002 | Not detected |
| Example 93 | >0.001 | >0.005 | >0.004 | >0.001 | >0.002 | Not detected |
| Example 94 | >0.001 | >0.005 | >0.004 | >0.001 | >0.002 | Not detected |
| Example 95 | >0.001 | >0.005 | >0.004 | >0.001 | >0.002 | Not detected |
| Example 96 | >0.001 | >0.005 | >0.004 | >0.001 | >0.002 | Not detected |
| Example 97 | >0.001 | >0.005 | >0.004 | >0.001 | >0.002 | Not detected |
| Example 98 | >0.001 | >0.005 | >0.004 | >0.001 | >0.002 | Not detected |
| Example 99 | >0.001 | >0.005 | >0.004 | >0.001 | >0.002 | Not detected |
| Comparative Example 24 | 2.1 | 2.3 | 1.8 | 2.3 | 2.9 | 3.3 |

Purification treatment of contaminated ground water
Amount of elements re-eluted from solid (mg/l)

| Examples | Cd | Pb | Cr$^{6+}$ | As | Se | CN |
|---|---|---|---|---|---|---|
| Example 92 | >0.001 | >0.005 | >0.004 | >0.001 | >0.002 | Not detected |
| Example 93 | >0.001 | >0.005 | >0.004 | >0.001 | >0.002 | Not detected |
| Example 94 | >0.001 | >0.005 | >0.004 | >0.001 | >0.002 | Not detected |
| Example 95 | >0.001 | >0.005 | >0.004 | >0.001 | >0.002 | Not detected |
| Example 96 | >0.001 | >0.005 | >0.004 | >0.001 | >0.002 | Not detected |
| Example 97 | >0.001 | >0.005 | >0.004 | >0.001 | >0.002 | Not detected |
| Example 98 | >0.001 | >0.005 | >0.004 | >0.001 | >0.002 | Not detected |
| Example 99 | >0.001 | >0.005 | >0.004 | >0.001 | >0.002 | Not detected |
| Comparative Example 24 | 1.5 | 0.6 | 0.9 | 0.7 | 1.2 | 1.0 |

TABLE 24

| Examples | Kind of iron particles and purifying agent used | Condition | Purification treatment of contaminated soil Contaminants |
|---|---|---|---|
| Example 101 | Example 2 | Iron particles | Cd, Pb, Cr$^{6+}$, As, Se, CN |
| Example 102 | Example 3 | Iron particles | Cd, Pb, Cr$^{6+}$, As, Se, CN |
| Example 103 | Example 5 | Iron particles | Cd, Pb, Cr$^{6+}$, As, Se, CN |
| Example 104 | Example 6 | Purifying agent | Cd, Pb, Cr$^{6+}$, As, Se, CN |

Purification treatment of contaminated soil
Amount of elements contained in treated solution (mg/l)

| Examples | Cd | Pb | Cr$^{6+}$ | As | Se | CN |
|---|---|---|---|---|---|---|
| Example 101 | >0.001 | >0.005 | >0.004 | >0.001 | >0.002 | Not detected |
| Example 102 | >0.001 | >0.005 | >0.004 | >0.001 | >0.002 | Not detected |
| Example 103 | >0.001 | >0.005 | >0.004 | >0.001 | >0.002 | Not detected |
| Example 104 | >0.001 | >0.005 | >0.004 | >0.001 | >0.002 | Not detected |

Purification treatment of contaminated soil
Amount of elements re-eluted from solid (mg/l)

| Examples | Cd | Pb | Cr$^{6+}$ | As | Se | CN |
|---|---|---|---|---|---|---|
| Example 101 | >0.001 | >0.005 | >0.004 | >0.001 | >0.002 | Not detected |
| Example 102 | >0.001 | >0.005 | >0.004 | >0.001 | >0.002 | Not detected |
| Example 103 | >0.001 | >0.005 | >0.004 | >0.001 | >0.002 | Not detected |
| Example 104 | >0.001 | >0.005 | >0.004 | >0.001 | >0.002 | Not detected |

TABLE 25

| Examples | Kind of iron particles and purifying agent used | Condition | Purification treatment of contaminated ground water Contaminants |
|---|---|---|---|
| Example 101 | Example 2 | Iron particles | Cd, Pb, Cr$^{6+}$, As, Se, CN |
| Example 102 | Example 3 | Iron particles | Cd, Pb, Cr$^{6+}$, As, Se, CN |
| Example 103 | Example 5 | Iron particles | Cd, Pb, Cr$^{6+}$, As, Se, CN |
| Example 104 | Example 6 | Purifying agent | Cd, Pb, Cr$^{6+}$, As, Se, CN |

Purification treatment of contaminated ground water
Amount of elements contained in treated solution (mg/l)

| Examples | Cd | Pb | Cr$^{6+}$ | As | Se | CN |
|---|---|---|---|---|---|---|
| Example 101 | >0.001 | >0.005 | >0.004 | >0.001 | >0.002 | Not detected |
| Example 102 | >0.001 | >0.005 | >0.004 | >0.001 | >0.002 | Not detected |
| Example 103 | >0.001 | >0.005 | >0.004 | >0.001 | >0.002 | Not detected |
| Example 104 | >0.001 | >0.005 | >0.004 | >0.001 | >0.002 | Not detected |

TABLE 25-continued

Purification treatment of contaminated ground water
Amount of elements re-eluted from solid (mg/l)

| Examples | Cd | Pb | $Cr^{6+}$ | As | Se | CN |
|---|---|---|---|---|---|---|
| Example 101 | >0.001 | >0.005 | >0.004 | >0.001 | >0.002 | Not detected |
| Example 102 | >0.001 | >0.005 | >0.004 | >0.001 | >0.002 | Not detected |
| Example 103 | >0.001 | >0.005 | >0.004 | >0.001 | >0.002 | Not detected |
| Example 104 | >0.001 | >0.005 | >0.004 | >0.001 | >0.002 | Not detected |

TABLE 26

| Examples | Kind of Iron particles and purifying agent used | Condition |
|---|---|---|
| Example 105 | Example 101 | Iron particles |
| Example 106 | Example 102 | Iron particles |
| Example 107 | Example 103 | Iron particles |
| Example 108 | Example 104 | Purifying agent |

Treatment of contaminated soil

| Examples | Contaminants | Residual percentage (%) |
|---|---|---|
| Example 105 | Trichlorobenzene | 21.8 |
| Example 106 | Trichlorobenzene | 16.4 |
| Example 107 | Trichlorobenzene | 19.2 |
| Example 108 | Trichloroethylene | 1.3 |

Treatment of contaminated ground water

| Examples | Contaminants | Residual percentage (%) |
|---|---|---|
| Example 105 | Trichlorobenzene | 23.0 |
| Example 106 | Trichlorobenzene | 18.5 |
| Example 107 | Trichlorobenzene | 19.9 |
| Example 108 | Trichloroethylene | 1.4 |

What is claimed is:

1. A method for purifying soil or ground water contaminated with harmful substances, comprising:
   mixing and contacting iron particles comprising a mixed phase of α-Fe phase and $Fe_3O_4$ phase, and having a BET specific surface area of 5 to 60 $m^2/g$, an Fe content of not less than 75% by weight based on the weight of the iron particles and a sulfur content of not less than 1,000 ppm with the soil or ground water contaminated with harmful substances.

2. The method according to claim 1, wherein the iron particles have an average particle diameter of 0.05 to 0.50 μm.

3. The method according to claim 2, wherein the iron particles have a sulfur content of not less than 2,000 ppm, a saturation magnetization value of 60 to 190 $Am^2/kg$, a BET specific surface area of 5 to 50 $m^2/g$, a crystallite size $D_{110}$ of (110) plane of α-Fe of 220 to 480 Å and an Fe content of 75 to 98% by weight based on the weight of the iron particles.

4. The method according to claim 2, wherein the iron particles have an average article diameter of 0.05 to 0.30 μm.

5. The method according to claim 1, wherein the iron particles have a sulfur content of 3,500 to 10,000 ppm.

6. The method according to claim 5, wherein the iron particles have a saturation magnetization value of 90 to 190 $Am^2/kg$ and a crystallite size $D_{110}$ of (110) plane of α-Fe of 200 to 400 Å.

7. The method according to claim 5, wherein the iron particles have an α-Fe content of 40 to 99% by weight based on the weight of the iron particles, a sulfur content of 3,800 to 10,000 ppm, a ratio of a diffraction intensity $D_{110}$ of (110) plane of α-Fe to a sum of a diffraction intensity $D_{311}$ of (311) plane of magnetite and the diffraction intensity $D_{110}$ ($D_{110}/(D_{311}+D_{110})$) of 0.30:1 to 0.98:1 when measured from X-ray diffraction spectrum thereof, a saturation magnetization value of 95 to 190 $Am^2/kg$, a crystallite size $D_{110}$ of (110) plane of α-Fe of 200 to 350 Å, an average particle diameter of 0.05 to 0.30 μm, and a BET specific surface area of 7 to 55 $m^2/g$.

8. The method according to claim 1, wherein the iron particles exhibit a cadmium elution of not more than 0.01 mg/liter, no detected elution of whole cyanogen, a lead elution of not more than 0.01 mg/liter, a chromium (VI) elution of not more than 0.05 mg/liter, an arsenic elution of not more than 0.01 mg/liter, a whole mercury elution of not more than 0.0005 mg/liter, a selenium elution of not more than 0.01 mg/liter, a fluorine elution of not more than 0.8 mg/liter and a boron elution of not more than 1 mg/liter, and have an α-Fe content of 30 to 99% by weight based on the weight of the iron particles.

9. The method according to claim 8, wherein the iron particles have an α-Fe content of 35 to 99% by weight based on the weight of the iron particles, a ratio of a diffraction intensity $D_{110}$ of (110) plane of α-Fe to a sum of a diffraction intensity $D_{311}$ of (311) plane of magnetite and the diffraction intensity $D_{110}$ ($D_{110}/(D_{311}+D_{110})$) of 0.30:1 to 0.98:1 when measured from X-ray diffraction spectrum thereof, a saturation magnetization value of 95 to 190 $Am^2/kg$, a crystallite size $D_{110}$ of (110) plane of α-Fe of 200 to 350 Å, an average particle diameter of 0.05 to 0.30 μm, and a BET specific surface area of 7 to 55 $m^2/g$.

10. The method according to claim 1, in which the iron particles have a ratio of a diffraction intensity $D_{110}$ of (110) plane of α-Fe to a sum of a diffraction intensity $D_{311}$ of (311) plane of magnetite and the diffraction intensity $D_{110}$ ($D_{110}/(D_{311}+D_{110})$) when measured from X-ray diffraction spectrum thereof of 0.20:1 to 0.98:1.

11. The method according to claim 1, in which the iron particles have a saturation magnetization value of 60 to 200 $Am^2/kg$ and a crystallite size $D_{110}$ of (110) plane of α-Fe of 200 to 500 Å.

12. The method according to claim 1, in which the iron particles contain substantially no Cd, Pb, As and Hg, and have an α-Fe content of 30 to 99% by weight based on the weight of the iron particles.

13. The method according to claim 1, wherein the iron particles have a sulfur content of not less than 1,500 ppm.

14. The method according to claim 1, wherein the iron particles have a BET specific surface area of 5 to 50 $m^2/g$, and contain small particles having a particle diameter of 0.05 to 0.50 μm in an amount of not less than 20% by volume based on the volume of the iron particles and large particles having a particle diameter of 0.5 to 5.0 μm in an amount of less than 80% by volume based on the volume of the iron particles.

15. A method for purifying soil or ground water contaminated with harmful substances, comprising:
   mixing and contacting a water suspension containing iron particles comprising a mixed phase of α-Fe phase and $Fe_3O_4$ phase, and having a BET specific surface area of 5 to 60 m²/g, an Fe content of not less than 75% by weight based on the weight of the iron particles and a sulfur content of not less than 1,000 ppm with the soil or ground water contaminated with harmful substances.

16. The method according to claim 15, wherein the iron particles have an average particle diameter of 0.05 to 0.50 μm.

17. The method according to claim 16, wherein the iron particles have a sulfur content of not less than 2,000 ppm, a saturation magnetization value of 60 to 190 Am²/kg, a BET specific surface area of 5 to 50 m²/g, a crystallite size $D_{110}$ of (110) plane of α-Fe of 220 to 480 Å and an Fe content of 75 to 98% by weight based on the weight of the iron particles.

18. The method according to claim 16, wherein the iron particles have an average article diameter of 0.05 to 0.30 μm.

19. The method according to claim 15, wherein the iron particles have a sulfur content of 3,500 to 10,000 ppm.

20. The method according to claim 19, wherein the iron particles have a saturation magnetization value of 90 to 190 Am²/kg and a crystallite size $D_{110}$ of (110) plane of α-Fe of 200 to 400 Å.

21. The method according to claim 19, wherein the iron particles have an α-Fe content of 40 to 99% by weight based on the weight of the iron particles, a sulfur content of 3,800 to 10,000 ppm, a ratio of a diffraction intensity $D_{110}$ of (110) plane of α-Fe to a sum of a diffraction intensity $D_{311}$ of (311) plane of magnetite and the diffraction intensity $D_{110}$ ($D_{110}/(D_{311}+D_{110})$) of 0.30:1 to 0.98:1 when measured from X-ray diffraction spectrum thereof, a saturation magnetization value of 95 to 190 Am²/kg, a crystallite size $D_{110}$ of (110) plane of α-Fe of 200 to 350 Å, an average particle diameter of 0.05 to 0.30 μm, and a BET specific surface area of 7 to 55 m²/g.

22. The method according to claim 15, wherein the iron particles exhibit a cadmium elution of not more than 0.01 mg/liter, no detected elution of whole cyanogen, a lead elution of not more than 0.01 mg/liter, a chromium (VI) elution of not more than 0.05 mg/liter, an arsenic elution of not more than 0.01 mg/liter, a whole mercury elution of not more than 0.0005 mg/liter, a selenium elution of not more than 0.01 mg/liter, a fluorine elution of not more than 0.8 mg/liter and a boron elution of not more than 1 mg/liter, and have an α-Fe content of 30 to 99% by weight based on the weight of the iron particles.

23. The method according to claim 22, wherein the iron particles have an α-Fe content of 35 to 99% by weight based on the weight of the iron particles, a ratio of a diffraction intensity $D_{110}$ of (110) plane of α-Fe to a sum of a diffraction intensity $D_{311}$ of (311) plane of magnetite and the diffraction intensity $D_{110}$ ($D_{110}/(D_{110}+D_{110})$) of 0.30:1 to 0.98:1 when measured from X-ray diffraction spectrum thereof, a saturation magnetization value of 95 to 190 Am²/kg, a crystallite size $D_{110}$ of (110) plane of α-Fe of 200 to 350 Å, an average particle diameter of 0.05 to 0.30 μm, and a BET specific surface area of 7 to 55 m²/g.

24. The method according to claim 15, in which the iron particles have a ratio of a diffraction intensity $D_{110}$ of (110) plane of α-Fe to a sum of a diffraction intensity $D_{311}$ of (311) plane of magnetite and the diffraction intensity $D_{110}$ ($D_{110}/(D_{311}+D_{110})$) when measured from X-ray diffraction spectrum thereof of 0.20:1 to 0.98:1.

25. The method according to claim 15, in which the iron particles have a saturation magnetization value of 60 to 200 Am²/kg and a crystallite size $D_{110}$ of (110) plane of α-Fe of 200 to 500 Å.

26. The method according to claim 15, in which the iron particles contain substantially no Cd, Pb, As and Hg, and have an α-Fe content of 30 to 99% by weight based on the weight of the iron particles.

27. The method according to claim 15, wherein the iron particles have a sulfur content of not less than 1,500 ppm.

28. The method according to claim 15, wherein the iron particles have a BET specific surface area of 5 to 50 m²/g, and contain small particles having a particle diameter of 0.05 to 0.50 μm in an amount of not less than 20% by volume based on the volume of the iron particles and large particles having a particle diameter of 0.5 to 5.0 μm in an amount of less than 80% by volume based on the volume of the iron particles.

* * * * *